United States Patent
Passot et al.

(10) Patent No.: US 9,792,546 B2
(45) Date of Patent: Oct. 17, 2017

(54) HIERARCHICAL ROBOTIC CONTROLLER APPARATUS AND METHODS

(71) Applicant: BRAIN CORPORATION, San Diego, CA (US)

(72) Inventors: Jean-Baptiste Passot, La Jolla, CA (US); Oleg Sinyavskiy, San Diego, CA (US); Filip Ponulak, San Diego, CA (US); Patryk Laurent, San Diego, CA (US); Borja Ibarz Gabardos, San Diego, CA (US); Eugene Izhikevich, San Diego, CA (US); Vadim Polonichko, San Diego, CA (US)

(73) Assignee: Brain Corporation, San Diego, CA (US)

( * ) Notice: Subject to any disclaimer, the term of this patent is extended or adjusted under 35 U.S.C. 154(b) by 271 days.

(21) Appl. No.: 13/918,298

(22) Filed: Jun. 14, 2013

(65) Prior Publication Data

US 2014/0371912 A1    Dec. 18, 2014

(51) Int. Cl.
*B25J 9/16*    (2006.01)
*G06N 3/04*    (2006.01)
*G06N 3/00*    (2006.01)

(52) U.S. Cl.
CPC .............. *G06N 3/049* (2013.01); *G06N 3/008* (2013.01)

(58) Field of Classification Search
CPC .......... G06N 3/008; G06N 3/02; G06N 3/049; G06N 3/08–3/088; B25J 9/161
See application file for complete search history.

(56) References Cited

U.S. PATENT DOCUMENTS 3,920,972 A    11/1975  Corwin, Jr. et al.
4,468,617 A     8/1984  Ringwall
(Continued)

FOREIGN PATENT DOCUMENTS

CN    102226740      10/2011
EP      2384863 A2   11/2011
(Continued)

OTHER PUBLICATIONS

Abbott et al. (2000), "Synaptic plasticity: taming the beast", Nature Neuroscience, 3, 1178-1183.
(Continued)

*Primary Examiner* — Adam Mott
(74) *Attorney, Agent, or Firm* — Gazdzinski & Associates, P.C.

(57) ABSTRACT

A robot may be trained by a user guiding the robot along target trajectory using a control signal. A robot may comprise an adaptive controller. The controller may be configured to generate control commands based on the user guidance, sensory input and a performance measure. A user may interface to the robot via an adaptively configured remote controller. The remote controller may comprise a mobile device, configured by the user in accordance with phenotype and/or operational configuration of the robot. The remote controller may detect changes in the robot phenotype and/or operational configuration. The remote controller may comprise multiple control elements configured to activate respective portions of the robot platform. Based on training, the remote controller may configure composite controls configured based two or more of control elements. Activation of a composite control may enable the robot to perform a task.

16 Claims, 15 Drawing Sheets

(56) References Cited

U.S. PATENT DOCUMENTS

| | | | |
|---|---|---|---|
| 4,617,502 A | 10/1986 | Sakaue et al. |
| 4,638,445 A | 1/1987 | Mattaboni |
| 4,706,204 A | 11/1987 | Hattori |
| 4,763,276 A | 8/1988 | Perreirra et al. |
| 4,852,018 A | 7/1989 | Grossberg |
| 5,063,603 A | 11/1991 | Burt |
| 5,092,343 A | 3/1992 | Spitzer |
| 5,121,497 A | 6/1992 | Kerr et al. |
| 5,245,672 A | 9/1993 | Wilson |
| 5,303,384 A | 4/1994 | Rodriguez et al. |
| 5,355,435 A | 10/1994 | DeYong |
| 5,388,186 A | 2/1995 | Bose |
| 5,408,588 A | 4/1995 | Ulug |
| 5,467,428 A | 11/1995 | Ulug |
| 5,579,440 A | 11/1996 | Brown |
| 5,602,761 A | 2/1997 | Spoerre et al. |
| 5,612,883 A | 3/1997 | Shaffer et al. |
| 5,638,359 A | 6/1997 | Peltola |
| 5,673,367 A | 9/1997 | Buckley |
| 5,687,294 A | 11/1997 | Jeong |
| 5,719,480 A | 2/1998 | Bock |
| 5,739,811 A | 4/1998 | Rosenberg et al. |
| 5,841,959 A | 11/1998 | Guiremand |
| 5,875,108 A | 2/1999 | Hoffberg |
| 5,994,864 A | 11/1999 | Inoue et al. |
| 6,009,418 A | 12/1999 | Cooper |
| 6,014,653 A | 1/2000 | Thaler |
| 6,169,981 B1 | 1/2001 | Werbos |
| 6,218,802 B1 | 4/2001 | Onoue et al. |
| 6,243,622 B1 | 6/2001 | Yim et al. |
| 6,259,988 B1 | 7/2001 | Galkowski et al. |
| 6,272,479 B1 | 8/2001 | Farry et al. |
| 6,363,369 B1 | 3/2002 | Liaw |
| 6,366,293 B1 | 4/2002 | Hamilton |
| 6,442,451 B1 | 8/2002 | Lapham |
| 6,458,157 B1 | 10/2002 | Suaning |
| 6,489,741 B1 | 12/2002 | Genov |
| 6,493,686 B1 | 12/2002 | Francone et al. |
| 6,545,705 B1 | 4/2003 | Sigel |
| 6,545,708 B1 | 4/2003 | Tamayama et al. |
| 6,546,291 B2 | 4/2003 | Merfeld |
| 6,581,046 B1 | 6/2003 | Ahissar |
| 6,601,049 B1 | 7/2003 | Cooper |
| 6,636,781 B1 | 10/2003 | Shen |
| 6,643,627 B2 | 11/2003 | Liaw |
| 6,697,711 B2 | 2/2004 | Yokono |
| 6,703,550 B2 | 3/2004 | Chu |
| 6,760,645 B2 | 7/2004 | Kaplan et al. |
| 6,961,060 B1 | 11/2005 | Mochizuki et al. |
| 7,002,585 B1 | 2/2006 | Watanabe |
| 7,024,276 B2 | 4/2006 | Ito |
| 7,243,334 B1 | 7/2007 | Berger et al. |
| 7,324,870 B2 | 1/2008 | Lee |
| 7,342,589 B2 | 3/2008 | Miserocchi |
| 7,395,251 B2 | 7/2008 | Linsker |
| 7,398,259 B2 | 7/2008 | Nugent |
| 7,426,501 B2 | 9/2008 | Nugent |
| 7,426,920 B1 | 9/2008 | Petersen |
| 7,668,605 B2 | 2/2010 | Braun |
| 7,672,920 B2 | 3/2010 | Ito |
| 7,752,544 B2 | 7/2010 | Cheng |
| 7,849,030 B2 | 12/2010 | Ellingsworth |
| 8,015,130 B2 | 9/2011 | Matsugu |
| 8,145,355 B2 | 3/2012 | Danko |
| 8,214,062 B2 | 7/2012 | Eguchi et al. |
| 8,271,134 B2 | 9/2012 | Kato et al. |
| 8,315,305 B2 | 11/2012 | Petre |
| 8,364,314 B2 | 1/2013 | Abdallah et al. |
| 8,380,652 B1 | 2/2013 | Francis, Jr. |
| 8,419,804 B2 | 4/2013 | Herr et al. |
| 8,452,448 B2 | 5/2013 | Pack et al. |
| 8,467,623 B2 | 6/2013 | Izhikevich |
| 8,509,951 B2 | 8/2013 | Glenger |
| 8,571,706 B2 | 10/2013 | Zhang et al. |
| 8,639,644 B1 | 1/2014 | Hickman et al. |
| 8,655,815 B2 | 2/2014 | Palmer et al. |
| 8,751,042 B2 | 6/2014 | Lee |
| 8,793,205 B1 | 7/2014 | Fisher |
| 8,924,021 B2 | 12/2014 | Dariush et al. |
| 8,958,912 B2 | 2/2015 | Blumberg et al. |
| 8,972,315 B2 | 3/2015 | Szatmary et al. |
| 8,990,133 B1 | 3/2015 | Ponulak et al. |
| 9,008,840 B1 | 4/2015 | Ponulak et al. |
| 9,015,092 B2 | 4/2015 | Sinyavskiy et al. |
| 9,015,093 B1 | 4/2015 | Commons |
| 9,047,568 B1 | 6/2015 | Fisher et al. |
| 9,056,396 B1 | 6/2015 | Linnell |
| 9,070,039 B2 | 6/2015 | Richert |
| 9,082,079 B1 | 7/2015 | Coenen |
| 9,104,186 B2 | 8/2015 | Sinyavskiy et al. |
| 9,122,994 B2 | 9/2015 | Piekniewski et al. |
| 9,144,907 B2 | 9/2015 | Summer et al. |
| 9,186,793 B1 | 11/2015 | Meier |
| 9,189,730 B1 | 11/2015 | Coenen et al. |
| 9,193,075 B1 | 11/2015 | Cipollini et al. |
| 9,195,934 B1 | 11/2015 | Hunt et al. |
| 9,213,937 B2 | 12/2015 | Ponulak |
| 9,242,372 B2 | 1/2016 | Laurent et al. |
| 2001/0045809 A1 | 11/2001 | Mukai |
| 2002/0038294 A1 | 3/2002 | Matsugu |
| 2002/0103576 A1 | 8/2002 | Takamura et al. |
| 2002/0158599 A1 | 10/2002 | Fujita et al. |
| 2002/0169733 A1 | 11/2002 | Peters |
| 2002/0175894 A1* | 11/2002 | Grillo ................. G06F 3/03549 345/156 |
| 2002/0198854 A1 | 12/2002 | Berenji et al. |
| 2003/0023347 A1 | 1/2003 | Konno |
| 2003/0050903 A1 | 3/2003 | Liaw |
| 2003/0108415 A1 | 6/2003 | Hosek et al. |
| 2003/0144764 A1 | 7/2003 | Yokono et al. |
| 2003/0220714 A1 | 11/2003 | Nakamura et al. |
| 2004/0030449 A1 | 2/2004 | Solomon |
| 2004/0036437 A1* | 2/2004 | Ito ............. B25J 9/163 318/568.12 |
| 2004/0051493 A1 | 3/2004 | Furuta |
| 2004/0128028 A1 | 7/2004 | Miyamoto et al. |
| 2004/0131998 A1 | 7/2004 | Marom et al. |
| 2004/0136439 A1 | 7/2004 | Dewberry |
| 2004/0158358 A1 | 8/2004 | Anezaki et al. |
| 2004/0162638 A1 | 8/2004 | Solomon |
| 2004/0167641 A1 | 8/2004 | Kawai et al. |
| 2004/0172168 A1 | 9/2004 | Watanabe et al. |
| 2004/0193670 A1 | 9/2004 | Langan |
| 2004/0267404 A1 | 12/2004 | Danko |
| 2005/0004710 A1 | 1/2005 | Shimomura |
| 2005/0008227 A1 | 1/2005 | Duan et al. |
| 2005/0015351 A1 | 1/2005 | Nugent |
| 2005/0036649 A1 | 2/2005 | Yokono |
| 2005/0049749 A1 | 3/2005 | Watanabe et al. |
| 2005/0054381 A1 | 3/2005 | Lee et al. |
| 2005/0065651 A1 | 3/2005 | Ayers |
| 2005/0069207 A1 | 3/2005 | Zakrzewski et al. |
| 2005/0113973 A1 | 5/2005 | Endo et al. |
| 2005/0119791 A1 | 6/2005 | Nagashima |
| 2005/0125099 A1* | 6/2005 | Mikami ................. G06N 3/008 700/245 |
| 2005/0283450 A1 | 12/2005 | Matsugu |
| 2006/0069448 A1 | 3/2006 | Yasui |
| 2006/0082340 A1 | 4/2006 | Watanabe et al. |
| 2006/0094001 A1 | 5/2006 | Torre |
| 2006/0129277 A1 | 6/2006 | Wu et al. |
| 2006/0129506 A1 | 6/2006 | Edelman et al. |
| 2006/0149489 A1 | 7/2006 | Joublin et al. |
| 2006/0161218 A1 | 7/2006 | Danilov |
| 2006/0161300 A1 | 7/2006 | Gonzalez-Banos et al. |
| 2006/0167530 A1 | 7/2006 | Flaherty et al. |
| 2006/0181236 A1 | 8/2006 | Bogardh |
| 2006/0189900 A1 | 8/2006 | Flaherty et al. |
| 2006/0207419 A1 | 9/2006 | Okazaki et al. |
| 2006/0230140 A1* | 10/2006 | Aoyama ................. G06N 3/08 709/224 |
| 2006/0250101 A1 | 11/2006 | Khatib et al. |
| 2007/0022068 A1 | 1/2007 | Linsker |
| 2007/0074177 A1 | 3/2007 | Kurita et al. |

(56) References Cited

U.S. PATENT DOCUMENTS

| | | |
|---|---|---|
| 2007/0100780 A1 | 5/2007 | Fleischer et al. |
| 2007/0112700 A1 | 5/2007 | Den Haan et al. |
| 2007/0151389 A1 | 7/2007 | Prisco et al. |
| 2007/0176643 A1 | 8/2007 | Nugent |
| 2007/0200525 A1 | 8/2007 | Kanaoka |
| 2007/0208678 A1 | 9/2007 | Matsugu |
| 2007/0250464 A1 | 10/2007 | Hamilton |
| 2007/0255454 A1 | 11/2007 | Dariush |
| 2007/0260356 A1 | 11/2007 | Kock |
| 2008/0024345 A1 | 1/2008 | Watson |
| 2008/0040040 A1 | 2/2008 | Goto et al. |
| 2008/0097644 A1 | 4/2008 | Kaznov |
| 2008/0100482 A1 | 5/2008 | Lazar |
| 2008/0112596 A1 | 5/2008 | Rhoads et al. |
| 2008/0133052 A1 | 6/2008 | Jones |
| 2008/0140257 A1 | 6/2008 | Sato et al. |
| 2008/0154428 A1 | 6/2008 | Nagatsuka |
| 2008/0162391 A1 | 7/2008 | Izhikevich |
| 2008/0294074 A1 | 11/2008 | Tong et al. |
| 2008/0319929 A1 | 12/2008 | Kaplan et al. |
| 2009/0037033 A1* | 2/2009 | Phillips ................ G05D 1/0088 701/2 |
| 2009/0037351 A1* | 2/2009 | Kristal ................... G09B 7/06 706/12 |
| 2009/0043722 A1 | 2/2009 | Nugent |
| 2009/0069943 A1 | 3/2009 | Akashi et al. |
| 2009/0105786 A1 | 4/2009 | Fetz et al. |
| 2009/0231359 A1 | 9/2009 | Bass, II et al. |
| 2009/0234501 A1 | 9/2009 | Ishizaki |
| 2009/0265036 A1 | 10/2009 | Jamieson et al. |
| 2009/0272585 A1 | 11/2009 | Nagasaka |
| 2009/0287624 A1 | 11/2009 | Rouat |
| 2009/0299751 A1 | 12/2009 | Jung |
| 2009/0312817 A1 | 12/2009 | Hogle et al. |
| 2010/0036457 A1 | 2/2010 | Sarpeshkar |
| 2010/0081958 A1 | 4/2010 | She |
| 2010/0086171 A1 | 4/2010 | Lapstun |
| 2010/0119214 A1 | 5/2010 | Shimazaki |
| 2010/0152896 A1 | 6/2010 | Komatsu et al. |
| 2010/0152899 A1 | 6/2010 | Chang et al. |
| 2010/0166320 A1 | 7/2010 | Paquier |
| 2010/0169098 A1 | 7/2010 | Patch |
| 2010/0198765 A1 | 8/2010 | Fiorillo |
| 2010/0222924 A1 | 9/2010 | Gienger |
| 2010/0225824 A1 | 9/2010 | Lazar |
| 2010/0228264 A1 | 9/2010 | Robinson et al. |
| 2010/0286824 A1 | 11/2010 | Solomon |
| 2010/0292835 A1 | 11/2010 | Sugiura et al. |
| 2010/0299101 A1 | 11/2010 | Shimada |
| 2010/0305758 A1 | 12/2010 | Nishi et al. |
| 2010/0312730 A1 | 12/2010 | Weng et al. |
| 2011/0010006 A1 | 1/2011 | Tani et al. |
| 2011/0016071 A1 | 1/2011 | Guillen |
| 2011/0026770 A1 | 2/2011 | Brookshire |
| 2011/0035052 A1 | 2/2011 | McLurkin |
| 2011/0035188 A1 | 2/2011 | Martinez-Heras et al. |
| 2011/0040405 A1 | 2/2011 | Lim et al. |
| 2011/0060460 A1 | 3/2011 | Oga et al. |
| 2011/0060461 A1 | 3/2011 | Velliste et al. |
| 2011/0067479 A1 | 3/2011 | Davis et al. |
| 2011/0071676 A1 | 3/2011 | Sanders et al. |
| 2011/0107270 A1 | 5/2011 | Wang et al. |
| 2011/0110006 A1 | 5/2011 | Meyer et al. |
| 2011/0119214 A1 | 5/2011 | Breitwisch |
| 2011/0119215 A1 | 5/2011 | Elmegreen |
| 2011/0144802 A1 | 6/2011 | Jang |
| 2011/0158476 A1* | 6/2011 | Fahn et al. .................... 382/103 |
| 2011/0160741 A1 | 6/2011 | Asano et al. |
| 2011/0160906 A1 | 6/2011 | Orita et al. |
| 2011/0160907 A1 | 6/2011 | Orita |
| 2011/0196199 A1 | 8/2011 | Donhowe |
| 2011/0208350 A1 | 8/2011 | Eliuk et al. |
| 2011/0218676 A1 | 9/2011 | Okazaki |
| 2011/0231016 A1 | 9/2011 | Goulding |
| 2011/0244919 A1 | 10/2011 | Aller et al. |
| 2011/0282169 A1 | 11/2011 | Grudic et al. |
| 2011/0296944 A1 | 12/2011 | Carter |
| 2011/0319714 A1 | 12/2011 | Roelle et al. |
| 2012/0008838 A1 | 1/2012 | Guyon et al. |
| 2012/0011090 A1 | 1/2012 | Tang |
| 2012/0011093 A1 | 1/2012 | Aparin et al. |
| 2012/0017232 A1 | 1/2012 | Hoffberg et al. |
| 2012/0036099 A1 | 2/2012 | Venkatraman et al. |
| 2012/0045068 A1* | 2/2012 | Kim et al. .................... 381/58 |
| 2012/0053728 A1 | 3/2012 | Theodorus |
| 2012/0071752 A1 | 3/2012 | Sewell et al. |
| 2012/0079670 A1 | 4/2012 | Yoon et al. |
| 2012/0109866 A1 | 5/2012 | Modha |
| 2012/0143495 A1 | 6/2012 | Dantu |
| 2012/0144242 A1 | 6/2012 | Vichare et al. |
| 2012/0150777 A1 | 6/2012 | Setoguchi et al. |
| 2012/0150781 A1 | 6/2012 | Arthur |
| 2012/0173021 A1 | 7/2012 | Tsusaka |
| 2012/0185092 A1 | 7/2012 | Ku |
| 2012/0197439 A1 | 8/2012 | Wang |
| 2012/0209428 A1 | 8/2012 | Mizutani |
| 2012/0209432 A1 | 8/2012 | Fleischer |
| 2012/0221147 A1 | 8/2012 | Goldberg et al. |
| 2012/0296471 A1 | 11/2012 | Inaba et al. |
| 2012/0303091 A1 | 11/2012 | Izhikevich |
| 2012/0303160 A1 | 11/2012 | Ziegler et al. |
| 2012/0308076 A1 | 12/2012 | Piekniewski |
| 2012/0308136 A1 | 12/2012 | Izhikevich |
| 2013/0000480 A1 | 1/2013 | Komatsu et al. |
| 2013/0006468 A1 | 1/2013 | Koehrsen et al. |
| 2013/0019325 A1 | 1/2013 | Deisseroth |
| 2013/0066468 A1 | 3/2013 | Choi et al. |
| 2013/0073080 A1 | 3/2013 | Ponulak |
| 2013/0073484 A1 | 3/2013 | Izhikevich |
| 2013/0073491 A1 | 3/2013 | Izhikevich |
| 2013/0073492 A1 | 3/2013 | Izhikevich |
| 2013/0073493 A1 | 3/2013 | Modha |
| 2013/0073495 A1 | 3/2013 | Izhikevich |
| 2013/0073496 A1 | 3/2013 | Szatmary |
| 2013/0073498 A1 | 3/2013 | Izhikevich |
| 2013/0073499 A1 | 3/2013 | Izhikevich |
| 2013/0073500 A1 | 3/2013 | Szatmary |
| 2013/0096719 A1 | 4/2013 | Sanders |
| 2013/0116827 A1 | 5/2013 | Inazumi |
| 2013/0151442 A1 | 6/2013 | Suh et al. |
| 2013/0151448 A1 | 6/2013 | Ponulak |
| 2013/0151449 A1 | 6/2013 | Ponulak |
| 2013/0151450 A1 | 6/2013 | Ponulak |
| 2013/0172906 A1 | 7/2013 | Olson et al. |
| 2013/0173060 A1 | 7/2013 | Yoo et al. |
| 2013/0206170 A1 | 8/2013 | Svendsen et al. |
| 2013/0218339 A1 | 8/2013 | Maisonnier et al. |
| 2013/0218821 A1 | 8/2013 | Szatmary |
| 2013/0245829 A1 | 9/2013 | Ohta et al. |
| 2013/0251278 A1 | 9/2013 | Izhikevich |
| 2013/0274924 A1 | 10/2013 | Chung et al. |
| 2013/0297541 A1 | 11/2013 | Piekniewski et al. |
| 2013/0297542 A1 | 11/2013 | Piekniewski |
| 2013/0310979 A1 | 11/2013 | Herr et al. |
| 2013/0325244 A1 | 12/2013 | Wang |
| 2013/0325766 A1 | 12/2013 | Petre et al. |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy et al. |
| 2013/0325775 A1 | 12/2013 | Sinyavskiy |
| 2013/0325776 A1 | 12/2013 | Ponulak |
| 2013/0325777 A1 | 12/2013 | Petre |
| 2013/0345718 A1 | 12/2013 | Crawford et al. |
| 2013/0346347 A1 | 12/2013 | Patterson et al. |
| 2014/0012788 A1 | 1/2014 | Piekniewski |
| 2014/0016858 A1 | 1/2014 | Richert |
| 2014/0025613 A1 | 1/2014 | Ponulak |
| 2014/0027718 A1 | 1/2014 | Zhao |
| 2014/0032458 A1 | 1/2014 | Sinyavskiy et al. |
| 2014/0032459 A1 | 1/2014 | Sinyavskiy et al. |
| 2014/0052679 A1 | 2/2014 | Sinyavskiy et al. |
| 2014/0081895 A1 | 3/2014 | Coenen |
| 2014/0089232 A1 | 3/2014 | Buibas |
| 2014/0114479 A1 | 4/2014 | Okazaki |

(56) References Cited

U.S. PATENT DOCUMENTS

| | | |
|---|---|---|
| 2014/0122397 A1 | 5/2014 | Richert et al. |
| 2014/0122398 A1 | 5/2014 | Richert |
| 2014/0156574 A1 | 6/2014 | Piekniewski et al. |
| 2014/0163729 A1 | 6/2014 | Shi et al. |
| 2014/0187519 A1 | 7/2014 | Cooke et al. |
| 2014/0193066 A1 | 7/2014 | Richert |
| 2014/0222739 A1 | 8/2014 | Ponulak |
| 2014/0229411 A1 | 8/2014 | Richert et al. |
| 2014/0244557 A1 | 8/2014 | Piekniewski et al. |
| 2014/0277718 A1 | 9/2014 | Izhikevich |
| 2014/0277744 A1 | 9/2014 | Coenen |
| 2014/0298212 A1* | 10/2014 | Wen .................... G06F 3/04847 715/762 |
| 2014/0309659 A1 | 10/2014 | Roh et al. |
| 2014/0350723 A1 | 11/2014 | Prieto et al. |
| 2014/0358284 A1 | 12/2014 | Laurent et al. |
| 2014/0358828 A1 | 12/2014 | Phillipps et al. |
| 2014/0369558 A1 | 12/2014 | Holz |
| 2014/0371907 A1 | 12/2014 | Passot et al. |
| 2014/0371912 A1 | 12/2014 | Passot et al. |
| 2015/0032258 A1 | 1/2015 | Passot et al. |
| 2015/0066479 A1* | 3/2015 | Pasupalak ............... G06F 17/27 704/9 |
| 2015/0094850 A1 | 4/2015 | Passot et al. |
| 2015/0094852 A1 | 4/2015 | Laurent et al. |
| 2015/0120128 A1 | 4/2015 | Rosenstein et al. |
| 2015/0127149 A1 | 5/2015 | Sinyavskiy et al. |
| 2015/0127154 A1 | 5/2015 | Passot et al. |
| 2015/0127155 A1 | 5/2015 | Passot et al. |
| 2015/0148956 A1 | 5/2015 | Negishi |
| 2015/0185027 A1 | 7/2015 | Kikkeri et al. |
| 2015/0204559 A1 | 7/2015 | Hoffberg et al. |
| 2015/0283701 A1 | 10/2015 | Izhikevich et al. |
| 2015/0283702 A1 | 10/2015 | Izhikevich et al. |
| 2015/0283703 A1 | 10/2015 | Izhikevich et al. |
| 2015/0306761 A1 | 10/2015 | O'Connor et al. |
| 2015/0317357 A1 | 11/2015 | Harmsen et al. |
| 2015/0338204 A1 | 11/2015 | Richert et al. |
| 2015/0339589 A1 | 11/2015 | Fisher |
| 2015/0339826 A1 | 11/2015 | Buibas et al. |
| 2015/0341633 A1 | 11/2015 | Richert |
| 2016/0004923 A1 | 1/2016 | Piekniewski et al. |
| 2016/0014426 A1 | 1/2016 | Richert |

FOREIGN PATENT DOCUMENTS

| | | |
|---|---|---|
| JP | 4087423 | 3/1992 |
| JP | 2003175480 | 6/2003 |
| RU | 2108612 C1 | 10/1998 |
| WO | 2008083335 | 7/2008 |
| WO | 20100136961 | 12/2010 |
| WO | WO2011039542 | 4/2011 |
| WO | WO2012151585 | 11/2012 |

OTHER PUBLICATIONS

Bartlett et al., "Convexity, Classification, and Risk Bounds" Jun. 16, 2005, pp. 1-61.
Bartlett et al., "Large margin classifiers: convex loss, low noise, and convergence rates" Dec. 8, 2003, 8 pgs.
Bohte, "Spiking Nueral Networks" Doctorate at the University of Leiden, Holland, Mar. 5, 2003, pp. 1-133 [retrieved on Nov. 14, 2012]. Retrieved from the internet: <URL: http://homepages.cwi.nl/-sbohte/publication/phdthesis.pdf>.
Brette et al., Brain: a simple and flexible simulator for spiking neural networks, The Neuromorphic Engineer, Jul. 1, 2009, pp. 1-4, doi: 10.2417/1200906.1659.
Cessac et al. "Overview of facts and issues about neural coding by spikes." Journal of Physiology, Paris 104.1 (2010): 5.
Cuntz et al., "One Rule to Grow Them All: A General Theory of Neuronal Branching and Its Paractical Application" PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Dorval et al. "Probability distributions of the logarithm of inter-spike intervals yield accurate entropy estimates from small datasets." Journal of neuroscience methods 173.1 (2008): 129.
Fidjeland et al. "Accelerated Simulation of Spiking Neural Networks Using GPUs" WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: <URL:http://www.doc.ic.ac.ukl-mpsha/IJCNN10b.pdf>.
Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.
Gewaltig et al., NEST (Neural Simulation Tool), Scholarpedia, 2007, pp. 1-15, 2( 4 ):1430, doi: 1 0.4249/scholarpedia.1430.
Gleeson et al., ) NeuroML: A Language for Describing Data Driven Models of Neurons and Networks with a High Degree of Biological Detail, PLoS Computational Biology, Jun. 2010, pp. 1-19 vol. 6 Issue 6.
Gollisch et al. "Rapid neural coding in the retina with relative spike latencies." Science 319.5866 (2008): 11 08-1111.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Izhikevich, "Polychronization: Computation with Spikes", Neural Computation, 25, 2006, 18, 245-282.
Izhikevich et al., "Relating STDP to BCM", Neural Computation (2003) 15, 1511-1523.
Izhikevich, "Simple Model of Spiking Neurons", IEEE Transactions on Neural Networks, vol. 14, No. 6, Nov. 2003, pp. 1569-1572.
Jin et al. (2010) "Implementing Spike-Timing-Dependent Plasticity on SpiNNaker Neuromorphic Hardware", WCCI 2010, IEEE World Congress on Computational Intelligence.
Karbowski et al., "Multispikes and Synchronization in a Large Neural Network with Temporal Delays", Neural Computation 12, 1573-1606 (2000)).
Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Laurent, "The Neural Network Query Language (NNQL) Reference" [retrieved on Nov. 12, 2013]. Retrieved from the Internet: <URLhttps://code.google.com/p/nnql/issues/detail?id=1>.
Laurent, "Issue 1—nnql—Refactor Nucleus into its own file—Neural Network Query Language" [retrieved on Nov. 12, 2013]. Retrieved from the Internet: <URL:https:1/code.google.com/p/nnql/issues/detail?id=1 >.
Lazar et al. "A video time encoding machine", in Proceedings of the 15th IEEE International Conference on Image Processing (ICIP '081, 2008, pp. 717-720.
Lazar et al. "Consistent recovery of sensory stimuli encoded with MIMO neural circuits." Computational intelligence and neuroscience (2010): 2.
Lazar et al. "Multichannel time encoding with integrate-and-fire neurons." Neurocomputing 65 (2005): 401-407.
Masquelier, Timothee. "Relative spike time coding and STOP-based orientation selectivity in the early visual system in natural

(56) References Cited

OTHER PUBLICATIONS continuous and saccadic vision: a computational model." Journal of computational neuroscience 32.3 (2012): 425-441.

Nguyen et al., "Estimating divergence functionals and the likelihood ratio by penalized convex risk minimization" 2007, pp. 1-8.

Nichols, A Reconfigurable Computing Architecture for Implementing Artificial Neural Networks on FPGA, Master's Thesis, The University of Guelph, 2003, pp. 1-235.

Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].

Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.

Sato et al., "Pulse interval and width modulation for video transmission." Cable Television, IEEE Transactions on 4 (1978): 165-173.

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.

Simulink® model [online], [Retrieved on Dec. 10, 2013] Retrieved from <URL: http://www.mathworks.com/products/simulink/index.html>.

Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8.

Szatmary et al., "Spike-timing Theory of Working Memory" PLoS Computational Biology, vol. 6, Issue 8, Aug. 19, 2010 [retrieved on Dec. 30, 2013]. Retrieved from the Internet: <URL:http://www.ploscompbiol.org/article/info%3Adoi%2F10.1371%2Fjournal.pcbi.1000879#>.

Wang "The time dimension for scene analysis." Neural Networks, IEEE Transactions on 16.6 (2005): 1401-1426.

Sjostrom et al., "Spike-Timing Dependent Plasticity" Scholarpedia, 5(2):1362 (2010), pp. 1-18.

Miller III, "Real-Time Application of Neural Networks for Sensor-Based Control of Robots with Vision", IEEE Transactions on Systems, Man, and Cypernetics Jul./Aug. 1989, pp. 825-831, vol. 19, No. 4.

Walters, "Implementation of Self-Organizing Neural Networks for Visuo-Motor Control of an Industrial Robot", IEEE Transactions on Neural Networks, vol. 4, No. 1, Jan. 1993, pp. 86-95.

Froemke et al., "Temporal Modulation of Spike-Timing-Dependent Plasticity", Frontiers in Synaptic Neuroscience, vol. 2, article 19, Jun. 2010, pp. 1-16.

Grollman et al., 2007 "Dogged Learning for Robots" IEEE International Conference on Robotics and Automation (ICRA).

PCT International Search Report for PCT/US2014/040407 dated Oct. 17, 2014.

PCT International Search Report for International Application PCT/US2013/026738 dated Jul. 21, 2014.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <http://msc.berkely.edu/wjchen/publications/DSC12_8726_FI.pdf>.

Bouganis et al., Training a Spiking Neural Network to Control a 4-DoF Robotic Arm based on Spiking Timing-Dependent Plasticity in WCCI 2010 IEEE World Congress on Computational Intelligence Jul. 2010 [Retrieved on Jun. 24, 2014] Retrieved from internet: http://www.doc.ic.ac.uk/~mpsha/IJCNN10a.pdf>.

Kasabov, "Evolving Spiking Neural Networks for Spatio-and Spectro-Temporal Pattern Recognition", IEEE 6th International Conference Intelligent Systems' 2012 [Retrieved on Jun. 24, 2014], Retrieved from internet: <http://ncs.ethz.ch/projects/evospike/publications/evolving-spiking-neural-networks for-spatio-and-spectro-temporal-pattern-recognition-plenary-talk-ieee-is>.

PCT International Search Report and Written Opinion for PCT/US14/48512 dated Jan. 23, 2015, pp. 1-14.

Lazar et al. "Consistent recovery of sensory stimuli encoded with MIMO neural circuits." Computational intelligence and neuroscience (2009): 2.

Alvarez, 'Review of approximation techniques', PhD thesis, chapter 2, pp. 7-14, University of Bradford, 2000.

Makridakis et al., 'Evaluating Accuracy (or Error) Measures', INSEAD Technical Report, 1995/18/TM.

Chung Hyuk Park, et al., Transfer of Skills between Human Operators through Haptic Training with Robot Coordination. International Conference on Robotics and Automation Anchorage Convention District, 2010,Anchorage, Alaska, USA, pp. 229-235 [Online] [retrieved Dec. 3, 2015]. Retrieved from Internet: <URL:https://smartech.gatech.edu/bitstream/handle/1853/38279/IEE_2010_ICRA_002.pdf>.

http://www.braincorporation.com/specs/BStem_SpecSheet_Rev_Nov11_2013.pdf.

Specification, figures and EFS receipt of U.S. Appl. No. 14/265,113, filed Apr. 29, 2014 and entitled "Trainable convolutional network apparatus and methods for operating a robotic vehicle" (71 pages).

Specification, figures and EFS receipt of U.S. Appl. No. 14/285,385, filed May 22, 2014 and entitled "Apparatus and methods for real time estimation of differential motion in live video" (42 pages).

Specification, figures and EFS receipt of U.S. Appl. No. 14/285,414, filed May 22, 2014 and entitled "Apparatus and methods for distance estimation using multiple image sensors" (63 pages).

Specification, figures and EFS receipt of U.S. Appl. No. 14/285,466, filed May 22, 2014 and entitled "Apparatus and methods for robotic operation using video imagery" (64 pages).

Specification, figures and EFS receipt of U.S. Appl. No. 14/321,736, filed Jul. 1, 2014 and entitled "Optical detection apparatus and methods" (49 pages).

Specification, figures and EFS receipt of U.S. Appl. No. 14/326,374, filed Jul. 8, 2014 and entitled "Apparatus and methods for distance estimation using stereo imagery" (75 pages).

Specification, figures and EFS receipt of U.S. Appl. No. 14/489,242, filed Sep. 17, 2014 and entitled "Apparatus and methods for remotely controlling robotic devices" (100 pages).

Specification, figures and EFS receipt of U.S. Appl. No. 14/542,391, filed Nov. 14, 2014 and entitled "Feature detection apparatus and methods for training of robotic navigation" (83 pages).

Specification, figures and EFS receipt of U.S. Appl. No. 14/637,138, filed Mar. 3, 2015 and entitled "Salient features tracking apparatus and methods using visual initialization" (66 pages).

Specification, figures and EFS receipt of U.S. Appl. No. 14/637,164, filed Mar. 3, 2015 and entitled "Apparatus and methods for tracking salient features" (66 pages).

Specification, figures and EFS receipt of U.S. Appl. No. 14/637,191, filed Mar. 3, 2015 and entitled "Apparatus and methods for saliency detection based on color occurrence analysis" (66 pages).

Specification, figures and EFS receipt of U.S. Appl. No. 14/244,888, filed Apr. 3, 2014 and entitled "Learning apparatus and methods for control of robotic devices via spoofing" (100 pages).

Specification, figures and EFS receipt of U.S. Appl. No. 14/244,890, filed Apr. 3, 2014 and entitled "Apparatus and methods for remotely controlling robotic devices" (91 pages).

Specification, figures and EFS receipt of U.S. Appl. No. 14/244,892, filed Apr. 3, 2014 entitled "Spoofing remote control apparatus and methods" (95 pages).

Specification, figures and EFS receipt of U.S. Appl. No. 14/588,168, filed Dec. 31, 2014 and entitled "Apparatus and methods for training robots" (101 pages).

Specification, figures and EFS receipt of U.S. Appl. No. 14/705,487, filed May 6, 2015 and entitled "Persistent predictor apparatus and methods for task switching" (119 pages).

(56) References Cited

OTHER PUBLICATIONS

Branca, A Neural Network for Ego-motion Estimation from Optical Flow, publ. 1995.
Hatsopoulos, Visual Navigation With a Neural Network, publ. 1991.
Huang, Fall Detection Using Modular Neural Networks with Back-Projected Optical Flow, publ. 2007.
Zhou, Computation of Optical Flow Using a Neural Network, publ. 1988.
Graham The Surf Hippo User Manual Version 3.0 B". Unite de Neurosciences Integratives et Computationnelles Institut Federatif de Neurobiologie Alfred Fessard CNRS. France. Mar. 2002 [retrieved Jan. 16, 2014]. [retrieved biomedical.univ-paris5.fr ]".

* cited by examiner

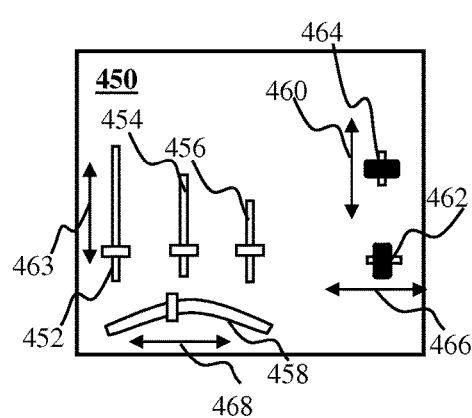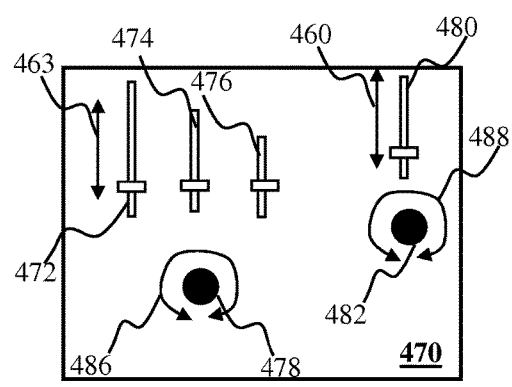
FIG. 4B  FIG. 4C
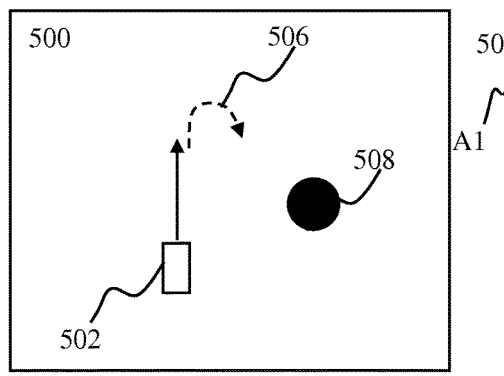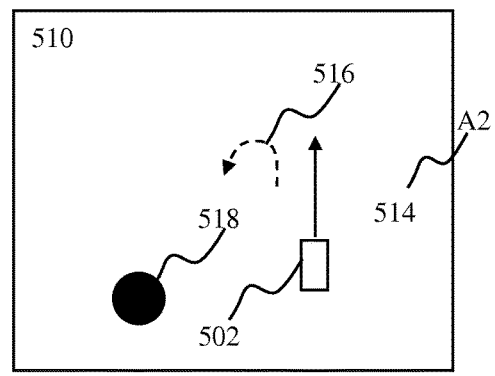
FIG. 5

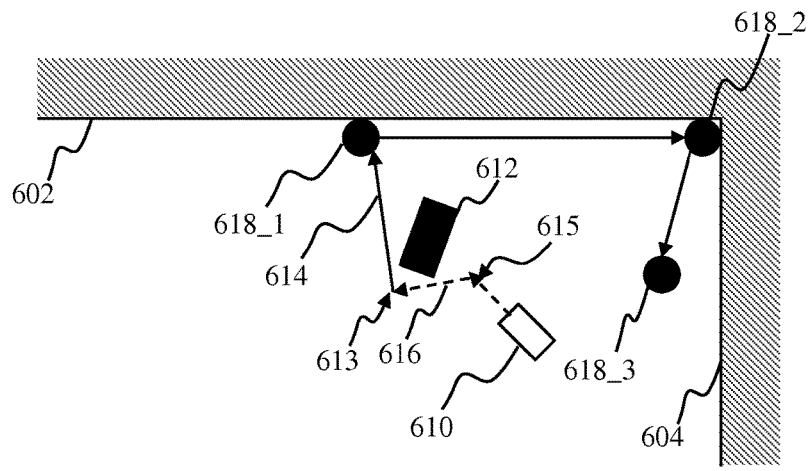
FIG. 6C
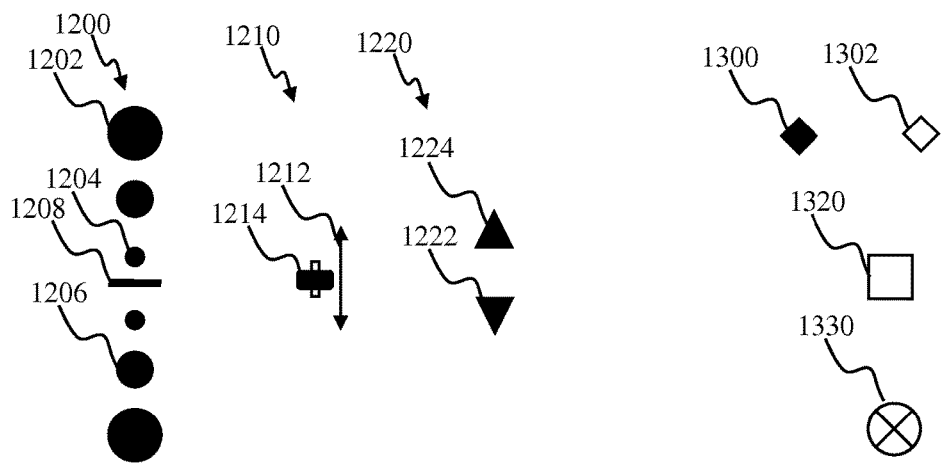
FIG. 12                                FIG. 13

HIERARCHICAL ROBOTIC CONTROLLER APPARATUS AND METHODS

CROSS-REFERENCE TO RELATED APPLICATIONS

This application is related to co-pending and co-owned U.S. patent application Ser. No. 13/918,338 entitled "ROBOTIC TRAINING APPARATUS AND METHODS", filed herewith, U.S. patent application Ser. No. 13/918,620 entitled "PREDICTIVE ROBOTIC CONTROLLER APPARATUS AND METHODS", filed herewith, U.S. patent application Ser. No. 13/907,734 entitled "ADAPTIVE ROBOTIC INTERFACE APPARATUS AND METHODS", filed May 31, 2013, U.S. patent application Ser. No. 13/842,530 entitled "ADAPTIVE PREDICTOR APPARATUS AND METHODS", filed Mar. 15, 2013, U.S. patent application Ser. No. 13/842,562 entitled "ADAPTIVE PREDICTOR APPARATUS AND METHODS FOR ROBOTIC CONTROL", filed Mar. 15, 2013, U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, U.S. patent application Ser. No. 13/842,647 entitled "MULTI-CHANNEL ROBOTIC CONTROLLER APPARATUS AND METHODS", filed Mar. 15, 2013, and U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to adaptive control and training of robotic devices.

Background

Robotic devices are used in a variety of applications, such as manufacturing, medical, safety, military, exploration, and/or other applications. Some existing robotic devices (e.g., manufacturing assembly and/or packaging) may be programmed in order to perform desired functionality. Some robotic devices (e.g., surgical robots) may be remotely controlled by humans, while some robots (e.g., iRobot Roomba®) may learn to operate via exploration.

Programming robots may be costly and remote control may require a human operator. Furthermore, changes in the robot model and/or environment may require changes in the programming code. Remote control typically relies on user experience and/or agility that may be inadequate when dynamics of the control system and/or environment (e.g., an unexpected obstacle appears in path of a remotely controlled vehicle) change rapidly.

SUMMARY

One aspect of the disclosure relates to a method of a non-transitory computer readable medium having instructions embodied thereon. The instructions may be executable by a processor to perform a method for controlling a robotic platform. The method may comprise: based on a detection of a sequence of control actions comprising two or more activations of the robotic platform, generating a composite control element, the composite control element being configured to execute the sequence.

In some implementations, the sequence may be configured to cause the robotic platform to execute a target task. Individual ones of the two or more activations may be based on a user issuing two or more control commands via a remote control interface. The composite control element may be configured to execute the task responsive to a single activation of the composite control element by the user.

In some implementations, individual ones of the two or more control commands may comprise multiple instances of a given control operation effectuated based on multiple activations of a first control element associated with the remote control interface.

In some implementations, individual ones of the two or more control commands may comprise one or more instances of two or more control operation effectuated based on activations of a first control element and a second control element associated with the remote control interface. The single activation may be configured to obviate the activations of the first control element and the second control element by the user.

In some implementations, the user comprises a human. The detection may be configured based on a request by the user.

In some implementations, individual ones of the sequence of control actions may be configured based on a control signal generated by a controller of the robotic platform based on a sensory context and user input. The control signal generation may be effectuated by a learning process comprising adjusting a learning parameter based on a performance measure. The performance measure may be configured based on individual ones of the sequence of control actions and the target action. The detection may be effectuated based on an indication provided by the learning process absent user request.

In some implementations, the platform may comprise at least one actuator. The activation may comprise activating the least one actuator at two or more instances of time. The instances may be separated by a time period.

In some implementations, the learning process may comprise execution of multiple trials. Individual ones of the multiple trials may be characterized by trial duration. Individual ones of the sequence of control actions may correspond to an execution of a given trial of the multiple trials. The time period may correspond to the trial duration.

In some implementations, the robotic platform may comprise two or more individually controllable actuators. The activation may comprise activating individual ones of the two or more actuators.

Another aspect of the disclosure relates to a remote control apparatus of a robot. The apparatus may comprise a processor, a sensor, a user interface, and a remote communications interface. The processor may be configured to operate a learning process. The sensor may be coupled to the processor. The user interface may be configured to present one or more human perceptible control elements. The remote communications interface may be configured to communicate to the robot a plurality of control commands configured by the learning process based on an association between the sensor input and individual ones of a plurality of user inputs provided via one or more of the one or more human perceptible control elements. The communication to the robot of the plurality of control command may be configured to cause the robot to execute a plurality of actions. The learning process may be configured based on a performance measure between a target action and individual ones of the plurality of actions. The association between the sensor input and individual ones of a plurality of actions may be configured to cause generation of one or more of control primitives. Individual ones of the plurality of control primitives may be configured to cause execution of a respective action of the plurality of actions.

In some implementations, the learning process may be configured to generate a composite control based on a detection of the provision of individual ones of a plurality of user inputs. An individual action of the plurality of actions may correspond to execution of the task.

In some implementations, the learning process may be configured to generate a composite control based on a request by the user. The composite control may be configured to actuate the plurality of actions thereby causing an execution of the target action responsive to a single activation by the user.

In some implementations, the learning parameter adjustment may be configured based on a supervised learning process. The supervised learning process may be configured based on the sensory context and a combination of the control signal and the user input.

In some implementations, the composite control generation may comprise presenting an additional human perceptible control element configured to cause activation of the composite control by the use. Activation of the composite control may be configured based on detecting one or more of an audio signal, a touch signal, and an electrical signal by the user interface.

In some implementations, provision of individual ones of the plurality of user inputs may be configured based on the user issuing an audible tag or a touch indication to the user interface.

In some implementations, the audio signal may be configured based on an audible tag issued by the user. The tag may have a characteristic associated therewith. The detecting one or more of the audio signal, the touch signal, and the electrical signal by the user interface may be configured based on a match between the characteristic and a parameter associated with the generation of the composite control.

In some implementations, the target action may be characterized by a plurality of terms in a human language. The audible tag may comprise a voice command that is not required to have a common meaning as individual ones of the plurality of terms.

In some implementations, the audible tag may comprise one or more of a voice command or a clap sequence. The parameter may comprise a spectrogram.

In some implementations, the user interface may comprise a touch sensitive interface. The touch signal may be configured based on a pattern provided by the user via the touch interface.

In some implementations, the user interface may comprise a camera. The electrical signal may be configured based on capturing a representation of the user by the camera.

Yet another aspect of the disclosure relates to a method for controlling a robot to execute a task. The method may comprise: based on a first indication received from a user, executing a plurality of actions, individual ones of the plurality of actions being configured based on sensory input and a given user input of a plurality of user inputs; and based on a second indication received from a user, associating a control component with the task, the control component being characterized by provision of a user discernible representation. The execution of the plurality of actions may be configured to effectuate execution of the task by the robot. Activation by the user of the control component using the user discernible representation may be configured to cause the robot to execute the task.

In some implementations, the provision of the user discernible representation may comprise: disposing an icon on a display; and configuring a user interface device to receive input based on the user action configured in accordance with the icon.

In another aspect of the present disclosure, a non-transitory computer readable medium is disclosed. In one embodiment, the non-transitory computer readable medium has instructions embodied thereon, where the instructions are configured to, when executed by a physical processor, cause the physical processor to: based on a detection of a sequence of discrete control actions comprising two or more activations of a robotic apparatus by a user, generate a composite control element, the composite control element being configured to execute the sequence of discrete control actions in an order of execution provided by one or more parameters associated with at least one of the sequence of discrete control actions; and when the execution of the sequence of discrete control actions is within an expected performance value assign the generated composite control element to a tag, the tag associated with a user interface control element; wherein: an invocation of the tag is configured to execute the sequence of discrete control actions in accordance with the determined order of execution; the robotic apparatus comprises a controller configured to generate a control signal, individual ones of the sequence of discrete control actions being configured based on the control signal, the generation of the control signal being effectuated by a learning process; the learning process comprises execution of multiple training trials, individual ones of the multiple training trials being characterized by a trial duration; individual ones of the sequence of discrete control actions correspond to an execution of a given training trial of the multiple training trials; and the two or more activations of the robotic apparatus comprise activations of at least one actuator at two or more instances of time, the two or more instances of time being separated by a time period, the time period corresponding to the trial duration.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 4B is a graphical illustration depicting user interface controllers configured of the apparatus of FIG. 4A, according to one or more implementations.

FIG. 4C is a graphical illustration depicting user interface controllers configured of the apparatus of FIG. 4A, according to one or more implementations.

FIG. 5 is a graphical illustration operation of a robotic controller, comprising an adaptive predictor of, e.g., FIGS. 2C, 3A-3B configured to develop an association between control action and sensory context, according to one or more implementations.

FIG. 6C is a graphical illustration depicting training a robot to perform a target approach and obstacle avoidance tasks, according to one or more implementations.

FIG. 12 is a graphical illustration depicting robotic controller comprising a hierarchy of control elements, according to one or more implementations.

FIG. 13 is a graphical illustration depicting robotic controller comprising composite control elements, according to one or more implementations.

Figure 1:
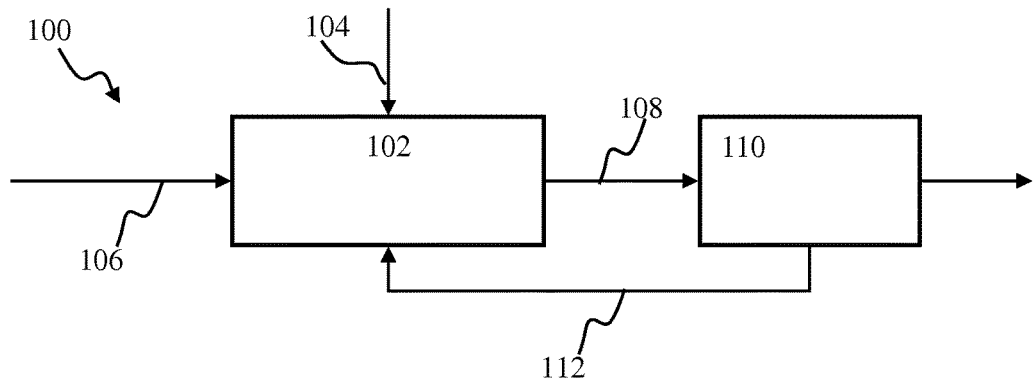
FIG. 1 is a block diagram illustrating a robotic apparatus, according to one or more implementations.

All Figures disclosed herein are © Copyright 2013 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting;

rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables (e.g., a membrane potential, firing threshold and/or other) used to describe state of a network node.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

FIG. 1 illustrates one implementation of an adaptive robotic apparatus for use with the robot training methodology described hereinafter. The apparatus 100 of FIG. 1 may comprise an adaptive controller 102 and a plant (e.g., robotic platform) 110. The controller 102 may be configured to generate control output 108 for the plant 110. The output 108 may comprise one or more motor commands (e.g., pan camera to the right), sensor acquisition parameters (e.g., use high resolution camera mode), commands to the wheels, arms, and/or other actuators on the robot, and/or other parameters. The output 108 may be configured by the controller 102 based on one or more sensory inputs 106. The input 106 may comprise data used for solving a particular control task. In one or more implementations, such as those involving a robotic arm or autonomous robot, the signal 106 may comprise a stream of raw sensor data and/or preprocessed data. Raw sensor data may include data conveying information associated with one or more of proximity, inertial, terrain imaging, and/or other information. Preprocessed data may include data conveying information associated with one or more of velocity, information extracted from accelerometers, distance to obstacle, positions, and/or other information. In some implementations, such as that involving object recognition, the signal 106 may comprise an array of pixel values in the input image, or preprocessed data. Pixel data may include data conveying information associated with one or more of RGB, CMYK, HSV, HSL, grayscale, and/or other information. Preprocessed data may include data conveying information associated with one or more of levels of activations of Gabor filters for face recognition, contours, and/or other information. In one or more implementations, the input signal 106 may comprise a target motion trajectory. The motion trajectory may be used to predict a future state of the robot on the basis of a current state and the target state. In one or more implementations, the signals in FIG. 1 may be encoded as spikes.

The controller 102 may be operable in accordance with a learning process (e.g., reinforcement learning and/or supervised learning). In one or more implementations, the controller 102 may optimize performance (e.g., performance of the system 100 of FIG. 1) by minimizing average value of a performance function as described in detail in co-owned U.S. patent application Ser. No. 13/487,533, entitled "SYSTEMS AND APPARATUSES FOR IMPLEMENTING TASK-SPECIFIC LEARNING USING SPIKING NEURONS", incorporated herein by reference in its entirety.

Learning process of adaptive controller (e.g., 102 of FIG. 1) may be implemented using a variety of methodologies. In some implementations, the controller 102 may comprise an artificial neuron network e.g., spiking neuron network described in U.S. patent application Ser. No. 13/487,533, entitled "SYSTEMS AND APPARATUSES FOR IMPLEMENTING TASK-SPECIFIC LEARNING USING SPIKING NEURONS", filed Jun. 4, 2012, incorporated supra, configured to control, for example, a robotic rover.

Individual spiking neurons may be characterized by internal state q. The internal state q may, for example, comprise a membrane voltage of the neuron, conductance of the membrane, and/or other parameters. The neuron process may be characterized by one or more learning parameter which may comprise input connection efficacy, output connection efficacy, training input connection efficacy, response generating (firing) threshold, resting potential of the neuron, and/or other parameters. In one or more implementations, some learning parameters may comprise probabilities of signal transmission between the units (e.g., neurons) of the network.

In some implementations, the training input (e.g., 104 in FIG. 1) may be differentiated from sensory inputs (e.g., inputs 106) as follows. During learning: data (e.g., spike events) arriving to neurons of the network via input 106 may cause changes in the neuron state (e.g., increase neuron membrane potential and/or other parameters). Changes in the neuron state may cause the neuron to generate a response (e.g., output a spike). Teaching data arriving to neurons of the network may cause (i) changes in the neuron dynamic model (e.g., modify parameters a, b, c, d of Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 20, 2012, incorporated herein by reference in its entirety); and/or (ii) modification of connection efficacy, based, for example, on timing of input spikes, teacher spikes, and/or output spikes. In some implementations, teaching data may trigger neuron output in order to facilitate learning. In some implementations, teaching signal may be communicated to other components of the control system.

During operation (e.g., subsequent to learning): data (e.g., spike events) arriving to neurons of the network may cause changes in the neuron state (e.g., increase neuron membrane potential and/or other parameters). Changes in the neuron state may cause the neuron to generate a response (e.g., output a spike). Teaching data may be absent during operation, while input data are required for the neuron to generate output.

In one or more implementations, such as object recognition, and/or obstacle avoidance, the input 106 may comprise a stream of pixel values associated with one or more digital images. In one or more implementations of e.g., video, radar, sonography, x-ray, magnetic resonance imaging, and/or other types of sensing, the input may comprise electromagnetic waves (e.g., visible light, IR, UV, and/or other types of electromagnetic waves) entering an imaging sensor array. In some implementations, the imaging sensor array may comprise one or more of RGCs, a charge coupled device (CCD), an active-pixel sensor (APS), and/or other sensors. The input signal may comprise a sequence of images and/or image frames. The sequence of images and/or image frame may be received from a CCD camera via a receiver apparatus and/or downloaded from a file. The image may comprise a two-dimensional matrix of RGB values refreshed at a 25 Hz frame rate. It will be appreciated by those skilled in the art that the above image parameters are merely exemplary, and many other image representations (e.g., bitmap, CMYK, HSV, HSL, grayscale, and/or other representations) and/or frame rates are equally useful with the present invention. Pixels and/or groups of pixels associated with objects and/or features in the input frames may be encoded using, for example, latency encoding described in U.S. patent application Ser. No. 12/869,583, filed Aug. 26, 2010 and entitled "INVARIANT PULSE LATENCY CODING SYSTEMS AND METHODS"; U.S. Pat. No. 8,315,305, issued Nov. 20, 2012, entitled "SYSTEMS AND METHODS FOR INVARIANT PULSE LATENCY CODING"; U.S. patent application Ser. No. 13/152,084, filed Jun. 2, 2011, entitled "APPARATUS AND METHODS FOR PULSE-CODE INVARIANT OBJECT RECOGNITION"; and/or latency encoding comprising a temporal winner take all mechanism described U.S. patent application Ser. No. 13/757,607, filed Feb. 1, 2013 and entitled "TEMPORAL WINNER TAKES ALL SPIKING NEURON NETWORK SENSORY PROCESSING APPARATUS AND METHODS", each of the foregoing being incorporated herein by reference in its entirety.

In one or more implementations, object recognition and/or classification may be implemented using spiking neuron classifier comprising conditionally independent subsets as described in co-owned U.S. patent application Ser. No. 13/756,372 filed Jan. 31, 2013, and entitled "SPIKING NEURON CLASSIFIER APPARATUS AND METHODS USING CONDITIONALLY INDEPENDENT SUBSETS" and/or co-owned U.S. patent application Ser. No. 13/756,382 filed Jan. 31, 2013, and entitled "REDUCED LATENCY SPIKING NEURON CLASSIFIER APPARATUS AND METHODS", each of the foregoing being incorporated herein by reference in its entirety.

In one or more implementations, encoding may comprise adaptive adjustment of neuron parameters, such neuron excitability described in U.S. patent application Ser. No. 13/623,820 entitled "APPARATUS AND METHODS FOR ENCODING OF SENSORY DATA USING ARTIFICIAL SPIKING NEURONS", filed Sep. 20, 2012, the foregoing being incorporated herein by reference in its entirety.

In some implementations, analog inputs may be converted into spikes using, for example, kernel expansion techniques described in co pending U.S. patent application Ser. No. 13/623,842 filed Sep. 20, 2012, and entitled "SPIKING NEURON NETWORK ADAPTIVE CONTROL APPARATUS AND METHODS", the foregoing being incorporated herein by reference in its entirety. In one or more implementations, analog and/or spiking inputs may be processed by mixed signal spiking neurons, such as U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-pending U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, each of the foregoing being incorporated herein by reference in its entirety.

The rules may be configured to implement synaptic plasticity in the network. In some implementations, the plastic rules may comprise one or more spike-timing dependent plasticity, such as rule comprising feedback described in co-owned and co-pending U.S. patent application Ser. No. 13/465,903 entitled "SENSORY INPUT PROCESSING APPARATUS IN A SPIKING NEURAL NETWORK", filed May 7, 2012; rules configured to modify of feed forward plasticity due to activity of neighboring neurons, described in co-owned U.S. patent application Ser. No. 13/488,106, entitled "SPIKING NEURON NETWORK APPARATUS AND METHODS", filed Jun. 4, 2012; conditional plasticity rules described in U.S. patent application Ser. No. 13/541,531, entitled "CONDITIONAL PLASTICITY SPIKING NEURON NETWORK APPARATUS AND METHODS", filed Jul. 3, 2012; plasticity configured to stabilize neuron response rate as described in U.S. patent application Ser. No. 13/691,554, entitled "RATE STABILIZATION THROUGH PLASTICITY IN SPIKING NEURON NETWORK", filed Nov. 30, 2012; activity-based plasticity rules described in co-owned U.S. patent application Ser. No. 13/660,967, entitled "APPARATUS AND METHODS FOR ACTIVITY-BASED PLASTICITY IN A SPIKING NEURON NETWORK", filed Oct. 25, 2012, U.S. patent application Ser. No. 13/660,945, entitled "MODULATED PLASTICITY APPARATUS AND METHODS FOR SPIKING NEURON NETWORKS", filed Oct. 25, 2012; and U.S. patent application Ser. No. 13/774,934, entitled "APPARATUS AND METHODS FOR RATE-MODULATED PLASTICITY IN A SPIKING NEURON NETWORK", filed Feb. 22, 2013; multi-modal rules described in U.S. patent application Ser. No. 13/763,005, entitled "SPIKING NETWORK APPARATUS AND METHOD WITH BIMODAL SPIKE-TIMING DEPENDENT PLASTICITY", filed Feb. 8, 2013, each of the foregoing being incorporated herein by reference in its entirety.

In one or more implementations, neuron operation may be configured based on one or more inhibitory connections providing input configured to delay and/or depress response generation by the neuron, as described in U.S. patent application Ser. No. 13/660,923, entitled "ADAPTIVE PLASTICITY APPARATUS AND METHODS FOR SPIKING NEURON NETWORK", filed Oct. 25, 2012, the foregoing being incorporated herein by reference in its entirety Connection efficacy updated may be effectuated using a variety of applicable methodologies such as, for example, event based updates described in detail in co-owned U.S. patent application Ser. No. 13/239,255, filed Sep. 21, 2011, entitled "APPARATUS AND METHODS FOR SYNAPTIC UPDATE IN A PULSE-CODED NETWORK"; U.S. patent application Ser. No. 13/588,774, entitled "APPARATUS AND METHODS FOR IMPLEMENTING EVENT-BASED UPDATES IN SPIKING NEURON NETWORKS", filed Aug. 17, 2012; and U.S. patent application Ser. No. 13/560,891 entitled "APPARATUS AND METHODS FOR EFFICIENT UPDATES IN SPIKING NEURON NETWORK", each of the foregoing being incorporated herein by reference in its entirety.

Neuron process may comprise one or more learning rules configured to adjust neuron state and/or generate neuron output in accordance with neuron inputs.

In some implementations, the one or more learning rules may comprise state dependent learning rules described, for example, in U.S. patent application Ser. No. 13/560,902, entitled "APPARATUS AND METHODS FOR GENERALIZED STATE-DEPENDENT LEARNING IN SPIKING NEURON NETWORKS", filed Jul. 27, 2012 and/or pending U.S. patent application Ser. No. 13/722,769 filed Dec. 20, 2012, and entitled "APPARATUS AND METHODS FOR STATE-DEPENDENT LEARNING IN SPIKING NEURON NETWORKS", each of the foregoing being incorporated herein by reference in its entirety.

In one or more implementations, the one or more learning rules may be configured to comprise one or more reinforcement learning, unsupervised learning, and/or supervised learning as described in co-owned and co-pending U.S. patent application Ser. No. 13/487,499 entitled "STOCHASTIC APPARATUS AND METHODS FOR IMPLEMENTING GENERALIZED LEARNING RULES, incorporated herein by reference in its entirety.

In one or more implementations, the one or more leaning rules may be configured in accordance with focused exploration rules such as described, for example, in U.S. patent application Ser. No. 13/489,280 entitled "APPARATUS AND METHODS FOR REINFORCEMENT LEARNING IN ARTIFICIAL NEURAL NETWORKS", filed Jun. 5, 2012, the foregoing being incorporated herein by reference in its entirety.

Adaptive controller (e.g., the controller apparatus 102 of FIG. 1) may comprise an adaptable predictor block configured to, inter alia, predict control signal (e.g., 108) based on the sensory input (e.g., 106 in FIG. 1) and teaching input (e.g., 104 in FIG. 1). FIGS. 2A-3B illustrate exemplary adaptive predictor configurations in accordance with one or more implementations.

Figure 2A:
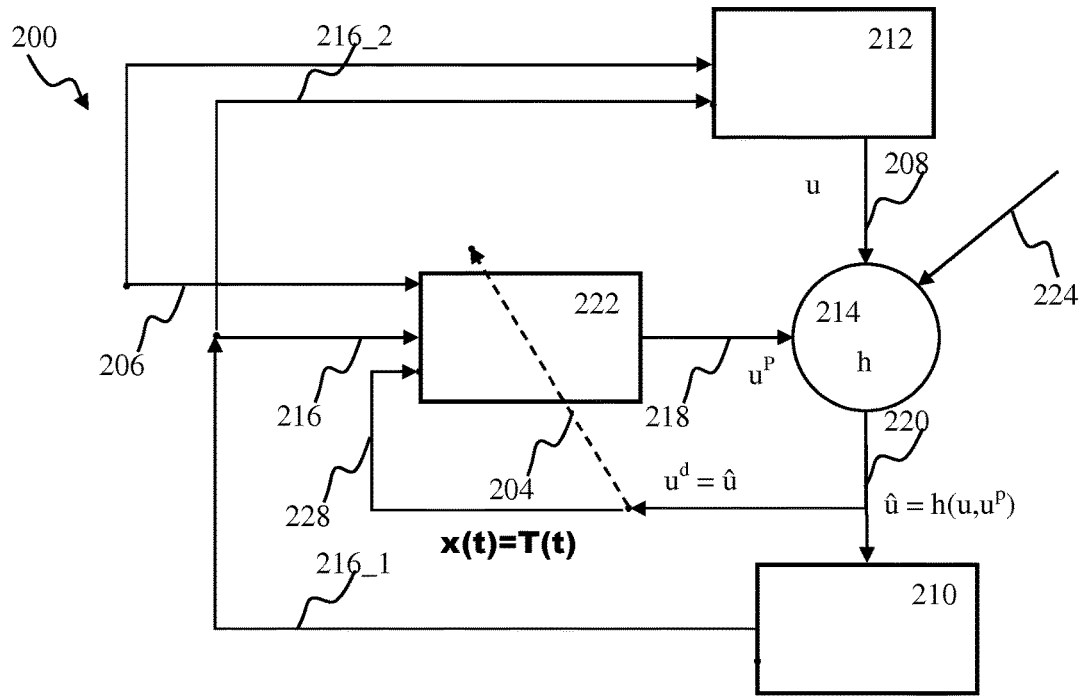
FIG. 2A is a block diagram illustrating a controller apparatus comprising an adaptable predictor block operable in accordance with a teaching signal, according to one or more implementations.

FIG. 2A illustrates an adaptive controller apparatus 200 operable in accordance with a learning process that is based on a teaching signal, according to one or more implementations. The adaptive controller apparatus 200 of FIG. 2A may comprise a control entity 212, an adaptive predictor 222, and a combiner 214. The learning process of the adaptive predictor 222 may comprise supervised learning process, reinforcement learning process, and/or a combination thereof. The control entity 212, the predictor 222 and the combiner 214 may cooperate to produce a control signal 220 for the plant 210. In one or more implementations, the control signal 220 may comprise one or more motor commands (e.g., pan camera to the right, turn right wheel forward), sensor acquisition parameters (e.g., use high resolution camera mode), and/or other parameters.

The control entity 212 may be configured to generate control signal 208 based on one or more of (i) sensory input (denoted 206 in FIG. 2A) and plant feedback 216_2. In some implementations, plant feedback may comprise proprioceptive signals, such as the readings from servo motors, joint position, and/or torque. In some implementations, the sensory input 206 may correspond to the controller sensory input 106, described with respect to FIG. 1, supra. In one or more implementations, the control entity may comprise a human trainer, communicating with the robotic controller via a remote controller and/or joystick. In one or more implementations, the control entity may comprise a computerized agent such as a multifunction adaptive controller operable using reinforcement and/or unsupervised learning and capable of training other robotic devices for one and/or multiple tasks.

The adaptive predictor 222 may be configured to generate predicted control signal $u^P$ 218 based on one or more of (i) the sensory input 206 and the plant feedback 216_1. The predictor 222 may be configured to adapt its internal parameters, e.g., according to a supervised learning rule, and/or other machine learning rules.

Predictor realizations, comprising plant feedback, may be employed in applications such as, for example, wherein (i) the control action may comprise a sequence of purposefully timed commands (e.g., associated with approaching a stationary target (e.g., a cup) by a robotic manipulator arm); and (ii) the plant may be characterized by a plant state time parameter (e.g., arm inertia, and/or motor response time) that may be greater than the rate of action updates. Parameters of a subsequent command within the sequence may depend on the plant state (e.g., the exact location and/or position of the arm joints) that may become available to the predictor via the plant feedback.

The sensory input and/or the plant feedback may collectively be referred to as sensory context. The context may be utilized by the predictor 222 in order to produce the predicted output 218. By way of a non-limiting illustration of obstacle avoidance by an autonomous rover, an image of an obstacle (e.g., wall representation in the sensory input 206) may be combined with rover motion (e.g., speed and/or direction) to generate Context_A. When the Context_A is encountered, the control output 220 may comprise one or more commands configured to avoid a collision between the rover and the obstacle. Based on one or more prior encounters of the Context_A—avoidance control output, the predictor may build an association between these events as described in detail below.

The combiner 214 may implement a transfer function h( ) configured to combine the control signal 208 and the predicted control signal 218. In some implementations, the combiner 214 operation may be expressed as described in detail in U.S. patent application Ser. No. 13/842,530 entitled "ADAPTIVE PREDICTOR APPARATUS AND METHODS", filed Mar. 15, 2013, as follows:

$$\hat{u} = h(u, u^P). \quad \text{(Eqn. 1)}$$

Various realizations of the transfer function of Eqn. 1 may be utilized. In some implementations, the transfer function may comprise an addition operation, a union, a logical 'AND' operation, and/or other operations.

In one or more implementations, the transfer function may comprise a convolution operation. In spiking network realizations of the combiner function, the convolution operation may be supplemented by use of a finite support kernel such as Gaussian, rectangular, exponential, and/or other finite support kernel. Such a kernel may implement a low pass filtering operation of input spike train(s). In some implementations, the transfer function may be characterized by a commutative property configured such that:

$$\hat{u} = h(u, u^P) = h(u^P, u). \quad \text{(Eqn. 2)}$$

In one or more implementations, the transfer function of the combiner 214 may be configured as follows:

$$h(0, u^P) = u^P. \quad \text{(Eqn. 3)}$$

In one or more implementations, the transfer function h may be configured as:

$$h(u, 0) = u. \quad \text{(Eqn. 4)}$$

In some implementations, the transfer function h may be configured as a combination of realizations of Eqn. 3-Eqn. 4 as:

$$h(0, u^P) = u^P, \text{ and } h(u, 0) = u, \quad \text{(Eqn. 5)}$$

In one exemplary implementation, the transfer function satisfying Eqn. 5 may be expressed as:

$$h(u, u^P) = (1 - u) \times (1 - u^P) - 1. \quad \text{(Eqn. 6)}$$

In one such realization, the combiner transfer function configured according to Eqn. 3-Eqn. 6, thereby implementing an additive feedback. In other words, output of the predictor (e.g., 218) may be additively combined with the control signal (208) and the combined signal 220 may be used as the teaching input (204) for the predictor. In some implementations, the combined signal 220 may be utilized as an input (context) signal 228 into the predictor 222.

In some implementations, the combiner transfer function may be characterized by a delay expressed as:

$$\hat{u}(t_{i+1}) = h(u(t_i), u^P(t_i)). \quad \text{(Eqn. 7)}$$

In Eqn. 7, $\hat{u}(t_{i+1})$ denotes combined output (e.g., 220 in FIG. 2A) at time $t+\Delta t$. As used herein, symbol $t_N$ may be used to refer to a time instance associated with individual controller update events (e.g., as expressed by Eqn. 7), for example $t_1$ denoting time of the first control output, e.g., a simulation time step and/or a sensory input frame step. In some implementations of training autonomous robotic devices (e.g., rovers, bi-pedaling robots, wheeled vehicles, aerial drones, robotic limbs, and/or other robotic devices), the update periodicity $\Delta t$ may be configured to be between 1 ms and 1000 ms.

It will be appreciated by those skilled in the arts that various other realizations of the transfer function of the combiner 214 (e.g., comprising a Heaviside step function, a sigmoidal function, such as the hyperbolic tangent, Gauss error function, or logistic function, and/or a stochastic operation) may be applicable.

Operation of the predictor 222 learning process may be aided by a teaching signal 204. As shown in FIG. 2A, the teaching signal 204 may comprise the output 220 of the combiner:

$$u^d = \hat{u}. \quad \text{(Eqn. 8)}$$

In some implementations wherein the combiner transfer function may be characterized by a delay $\tau$ (e.g., Eqn. 7), the teaching signal at time $t_i$ may be configured based on values of u, $u^P$ at a prior time $t_{i-1}$, for example as:

$$u_d(t_i) = h(u(t_{i-1}), u^P(t_{i-1})). \quad \text{(Eqn. 9)}$$

The training signal $u^d$ at time $t_i$ may be utilized by the predictor in order to determine the predicted output $u^P$ at a subsequent time $t_{i+1}$, corresponding to the context (e.g., the sensory input x) at time $t_i$;

$$u^P(t_{i+1}) = F[x_i, W(u^d(t_i))]. \quad \text{(Eqn. 10)}$$

In Eqn. 10, the function W may refer to a learning process implemented by the predictor.

Figure 2B:
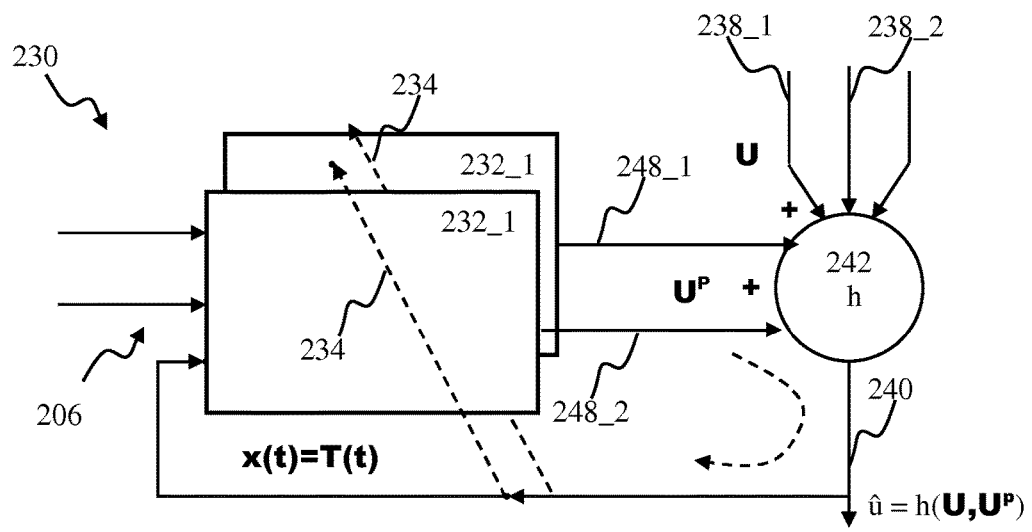
FIG. 2B is a block diagram illustrating a multichannel adaptive predictor apparatus, according to one or more implementations.

In one or more implementations, such as illustrated in FIGS. 2A-2B, the sensory input 206/306, the control signal 208/308, the predicted output 218/318, the combined output 220, 340 and/or plant feedback 216, 236 may comprise spiking signal, analog signal, and/or a combination thereof. Analog to spiking and/or spiking to analog signal conversion may be effectuated using, mixed signal spiking neuron networks, such as, for example, described in U.S. patent application Ser. No. 13/313,826 entitled "APPARATUS AND METHODS FOR IMPLEMENTING LEARNING FOR ANALOG AND SPIKING SIGNALS IN ARTIFICIAL NEURAL NETWORKS", filed Dec. 7, 2011, and/or co-pending U.S. patent application Ser. No. 13/761,090 entitled "APPARATUS AND METHODS FOR GATING ANALOG AND SPIKING SIGNALS IN ARTIFICIAL NEURAL NETWORKS", filed Feb. 6, 2013, incorporated supra.

Output 220 of the combiner e.g., 214 in FIG. 2A, may be gated. In some implementations, the gating information may be provided to the combiner by the control entity 212. In one such realization of spiking controller output, the control signal 208 may comprise positive spikes indicative of a control command and configured to be combined with the predicted control signal (e.g., 218); the control signal 208 may comprise negative spikes, where the timing of the negative spikes is configured to communicate the control command, and the (negative) amplitude sign is configured to communicate the combination inhibition information to the combiner 214 so as to enable the combiner to 'ignore' the predicted control signal 218 for constructing the combined output 220.

In some implementations of spiking signal output, the combiner 214 may comprise a spiking neuron network; and the control signal 208 may be communicated via two or more connections. One such connection may be configured to communicate spikes indicative of a control command to the combiner neuron; the other connection may be used to communicate an inhibitory signal to the combiner network. The inhibitory signal may inhibit one or more neurons of the combiner the one or more combiner input neurons of the combiner network thereby effectively removing the predicted control signal from the combined output (e.g., 220 in FIG. 2B).

The gating information may be provided to the combiner via a connection 224 from another entity (e.g., a human operator controlling the system with a remote control, and/or external controller) and/or from another output from the controller 212 (e.g. an adapting block, or an optimal controller). In one or more implementations, the gating information delivered via the connection 224 may comprise one or more of: a command, a memory address of a register storing a flag, a message, an inhibitory efficacy, a value (e.g., a weight of zero to be applied to the predicted control signal 218 by the combiner), and/or other information capable of conveying gating instructions to the combiner.

The gating information may be used by the combiner network to inhibit and/or suppress the transfer function operation. The suppression (or 'veto') may cause the combiner output (e.g., 220) to be comprised solely of the control signal portion 218, e.g., configured in accordance with Eqn. 4.

In one or more implementations, the gating signal 224 may comprise an inhibitory indication that may be configured to inhibit the output from the combiner. Zero combiner output may, in some realizations, may cause zero teaching signal (e.g., 214 in FIG. 2A) to be provided to the predictor so as to signal to the predictor a discrepancy between the target action (e.g., controller output 208) and the predicted control signal (e.g., output 218).

The gating signal 224 may be used to veto predictor output 218 based on, for example, the predicted control output 218 being away from the target output by more than a given margin. The margin may be configured based on an application and/or state of the trajectory. For example, a smaller margin may be applicable in navigation applications wherein the platform is proximate to a hazard (e.g., a cliff) and/or an obstacle. A larger error may be tolerated when approaching one (of many) targets.

By way of a non-limiting illustration, if the turn is to be completed and/or aborted (due to, for example, a trajectory change and/or sensory input change), and the predictor output may still be producing turn instruction to the plant, the gating signal may cause the combiner to veto (ignore) the predictor contribution and to pass through the controller contribution.

Predicted control signal 218 and the control input 208 may be of opposite signs. In one or more implementations, positive predicted control signal (e.g., 218) may exceed the target output that may be appropriate for performance of as task (e.g., as illustrated by data of trials 8-9 in Table 3). Control signal 208 may be configured to comprise negative signal (e.g., −10) in order to compensate for overprediction by the predictor.

Gating and/or sign reversal of controller output may be useful, for example, responsive to the predictor output being incompatible with the sensory input (e.g., navigating towards a wrong target). Rapid (compared to the predictor learning time scale) changes in the environment (e.g., appearance of a new obstacle, target disappearance), may require a capability by the controller (and/or supervisor) to 'overwrite' predictor output. In one or more implementations compensation for overprediction may be controlled by a graded form of the gating signal delivered via the connection 224.

FIG. 2B illustrates combiner apparatus configured to operate with multichannel control inputs and/or control signals. The combiner 242 of FIG. 2B may receive an M-dimensional (M>1) control input 238. The control input U may comprise a vector corresponding to a plurality of input channels (e.g., 238_1, 238_2 in FIG. 2B). Individual channels, may be configured to communicate individual dimensions (e.g., vectors) of the input U, as described in detail in U.S. patent application Ser. No. 13/842,647 entitled "MULTICHANNEL ROBOTIC CONTROLLER APPARATUS AND METHODS", filed Mar. 15, 2013, incorporated supra. The combiner output 240 may be configured to operate a plant (e.g., the plant 110, in FIG. 1 and/or the plant 210 in FIG. 2A).

In some implementations, the predictor 232 may comprise a single multichannel predictor capable of generating N-dimensional (N>1) predicted signal 248 based on a multichannel training input 234 and sensory input 36. In one or more implementations, the predictor 232 may comprise multiple individual predictor modules (232_1, 232_2) configured to generate individual components of the multichannel output (248_1, 248_2). In some implementations, individual teaching signal may be de-multiplexed into multiple teaching components (234_1, 234_2). Predictor 232 learning process may be configured to adapt predictor state based on teaching signal 234.

The predicted signal $U^P$ may comprise a vector corresponding to a plurality of output channels (e.g., 238_1, 238_2 in FIG. 2B). Individual channels 248_1, 248_2 may be configured to communicate individual dimensions (e.g., vectors) of the signal 238.

The combiner 242 may be operable in accordance with a transfer function h configured to combine signals 238, 248 and to produce single-dimensional control signal 240:

$$\hat{u}=h(U,U^P). \quad \text{(Eqn. 11)}$$

In one or more implementations, the combined control signal 240 may be provided to the predictor as the training signal. The training signal may be utilized by the predictor learning process in order to generate the predicted output 248 (e.g., as described with respect to FIG. 2A, supra).

In some implementations, a complex teaching signal may be decomposed into multiple components that may drive adaptation of multiple predictor blocks (associated with individual output channels. Prediction of a (given) teaching signal 234 may be spread over multiple predictor output channels 248. Once adapted, outputs of multiple predictor blocks 232 may be combined thereby providing prediction of the teaching signal (e.g., 234 in FIG. 2B). Such an implementation may increase the number of teaching signals that can be mediated using a finite set of control signal channels. Mapping between the control signal 238, the predictor output 248, the combiner output 240, and the teaching signal 234 may comprise various signal mapping schemes. In some implementations, mapping schemes may include one to many, many to one, some to some, many to some, and/or other schemes.

In spiking neuron networks implementations, inputs (e.g., 238, 248 of FIG. 2B) into the combiner 242 may comprise signals encoded using spike latency and/or spike rate. In some implementations, inputs into the combiner may be encoded using one encoding mechanism (e.g., rate). In one or more implementations, inputs into the combiner may be encoded using single two (or more) encoding mechanisms (e.g., rate, latency, and/or other).

The use of multiple input signals (238_1, 238_2 in FIG. 2B) and/or multiple predictor output channels (e.g., 248_1, 248_2 in FIG. 2B) to communicate a single control signal 240 (e.g., control signal U and/or predicted control signal $U^P$) may enable more robust data transmission when compared to a single channel per signal data transmission schemes. Multichannel data transmission may be advantageous in the presence of background noise and/or interference on one or more channels. In some implementations, wherein individual channels are characterized by bandwidth that may be lower than the data rate requirements for the transmitted signal (e.g., control signal U and/or predicted control signal $U^P$) multichannel data transmission may be utilized to de-multiplex the higher data rate signal onto two or more lower capacity communications channels (e.g., 248_1, 248_2 in FIG. 2B). In some implementations, the output encoding type may match the input encoding type (e.g., latency in-latency out). In some implementations, the output encoding type may differ from the input encoding type (e.g., latency in-rate out).

Combiner 242 operation, comprising input decoding-output encoding methodology, may be based on an implicit output determination. In some implementations, the implicit output determination may comprise, determining one or more input values using latency and/or rate input conversion into e.g., floating point and/or integer; updating neuron dynamic process based on the one or more input values; and encoding neuron output into rate or latency. In one or more implementations, the neuron process may comprise a deterministic realization (e.g., Izhikevich neuron model, described for example in co-owned U.S. patent application Ser. No. 13/623,842, entitled "SPIKING NEURON NETWORK ADAPTIVE CONTROL APPARATUS AND METHODS", filed Sep. 3, 2012, incorporated supra; and/or a stochastic process such as described, for example, in U.S. patent application Ser. No. 13/487,533, entitled "SYSTEMS AND APPARATUSES FOR IMPLEMENTING TASK-SPECIFIC LEARNING USING SPIKING NEURONS", incorporated supra.

In some implementations, combiner operation, comprising input decoding-output encoding methodology, may be based on an explicit output determination, such as, for example, expressed by Eqn. 4-Eqn. 9, Eqn. 14.

Figure 2C:
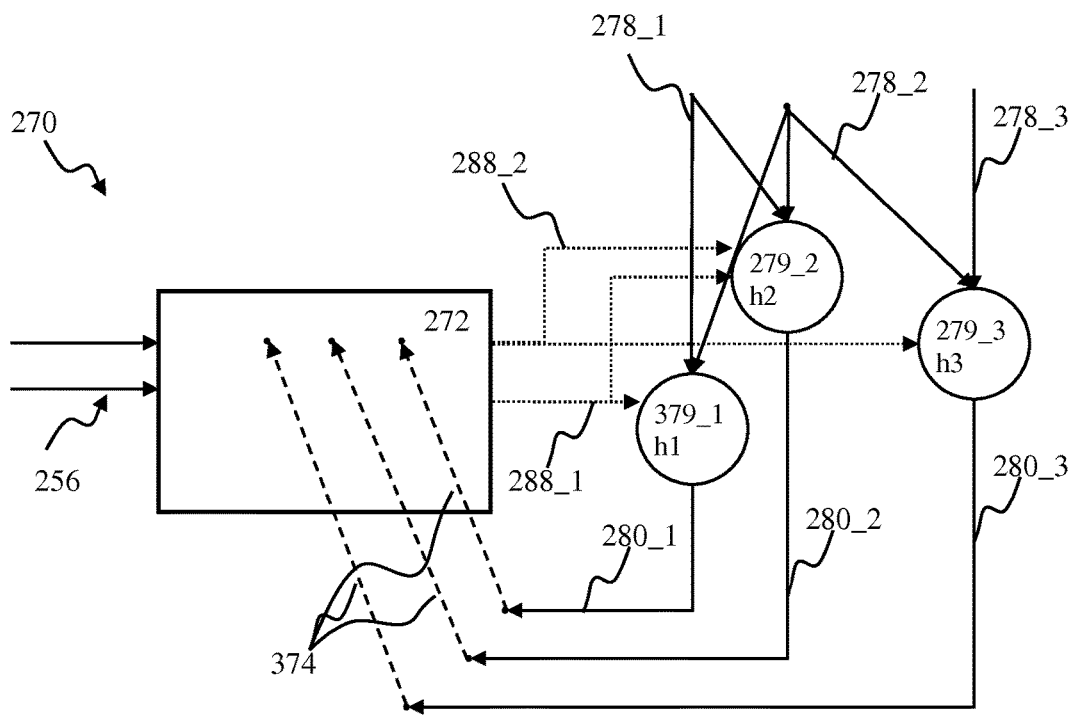
FIG. 2C is a block diagram illustrating a multiplexing adaptive predictor configured to interface to a plurality of combiner apparatus, according to one or more implementations.

In one or more implementations, a predictor may be configured to predict multiple teaching signals, as illustrated in FIG. 2C. The adaptive controller system 270 of FIG. 2C may be utilized responsive to information capacity of the predictor output channel (e.g., how much information may be encoded onto a single channel) is higher than information capacity of teaching signal. In some implementations, a combination of the above approaches (e.g., comprising two or more teaching signals and two or more predictor output channels) may be employed.

The adaptive controller system 270 may comprise a multiplexing predictor 272 and two or more combiner apparatus 279. Controller input U may be de-multiplexed into two (e.g., input 278_1 into combiners 279_1, 279_2) and/or more (input 278_2 into combiners 279_1, 279_2, 279_3). Individual combiner apparatus 279 may be configured to multiplex one (or more) controller inputs 278 and two or more predictor outputs $U^P$ 288 to form a combined signal 280. In some implementations, the predictor output for a given combiner may be spread (de-multiplexed) over multiple prediction channels (e.g., 288_1, 288_2 for combiner 279_2). In one or more implementations, teaching input to a predictor may be delivered via multiple teaching signal 274 associated with two or more combiners.

The predictor 272 may operate in accordance with a learning process configured to determine an input-output transformation such that the output of the predictor $U^P$ after learning is configured to match the output of the combiner h(U, $U^P$) prior to learning (e.g., when $U^P$ comprises a null signal).

Predictor transformation F may be expressed as follows:

$$U^P=F(\hat{U}),\hat{U}=h(U^P). \quad \text{(Eqn. 12)}$$

In some implementations, wherein dimensionality of control signal U matches dimensionality of predictor output $U^P$, the transformation of Eqn. 12 may be expressed in matrix form as:

$$U^P=F\hat{U},\hat{U}=HU^P,F=\text{inv}(H), \quad \text{(Eqn. 13)}$$

where H may denote the combiner transfer matrix composed of transfer vectors for individual combiners 279 H=[h1, h2, . . . , hn], Û=[û1, û2, . . . ûn] may denote output matrix composed of output vectors 280 of individual combiners; and F may denote the predictor transform matrix. The combiner output 280 may be provided to the predictor 272 and/or another predictor apparatus as teaching signal 274 in FIG. 2D. In some implementations, (e.g., shown in FIG. 2B), the combiner output 280 may be provided to the predictor 272 as sensory input signal (not shown in FIG. 2C).

In some implementations of multi-channel predictor (e.g., 232, 272) and/or combiner (e.g., 242, 279) various signal mapping relationships may be utilized such as, for example, one to many, many to one, some to some, many to some, and/or other relationships (e.g., one to one).

In some implementations, prediction of an individual teaching signal (e.g., 234 in FIG. 2B) may be spread over multiple prediction channels (e.g., 248 in FIG. 2B). In one or more implementations, an individual predictor output channel (e.g., 288_2 in FIG. 2C) may contain prediction of multiple teaching signals (e.g., two or more channels 274 in FIG. 2C).

Transfer function h (and or transfer matrix H) of the combiner (e.g., 242, 279 in FIGS. 2B-2C) may be configured to perform a state space transformation of the control signal (e.g., 38, 238 in FIGS. 2B-2C) and/or predicted signal (e.g., 248, 288 in FIGS. 2B-2C). In one or more implementations, the transformation may comprise one or more of a time-domain to frequency domain transformations (e.g., Fourier transform, discrete Fourier transform, discrete cosine transform, wavelet and/or other transformations), frequency domain to time domain transformations (e.g., inverse Fourier transform, inverse discrete Fourier transform, inverse discrete cosine transform, and/or other transformations), wavenumber transform, and/or other transformations. The state space transformation may comprise an application of a function to one (or both) input parameters (e.g., u, $u^P$) into the combiner. In some implementations, the function may be selected from an exponential function, logarithm function, a Heaviside step function, and/or other functions.

In implementations where the combiner is configured to perform the state-space transform (e.g., time-space to frequency space), the predictor may be configured to learn an inverse of that transform (e.g., frequency-space to time-space). Such predictor may be capable of learning to transform, for example, frequency-space input û into time-space output $u^P$.

In some implementations, predictor learning process may be configured based on one or more look-up tables (LUT). Table 1 and Table 2 illustrate use of look up tables for learning obstacle avoidance behavior (e.g., as described with respect to Table 3-Table 5 and/or FIG. 7, below).

Table 1-Table 2 present exemplary LUT realizations characterizing the relationship between sensory input (e.g., distance to obstacle d) and control signal (e.g., turn angle cc relative to current course) obtained by the predictor during training. Columns labeled N in Table 1-Table 2, present use occurrence N (i.e., how many times a given control action has been selected for a given input, e.g., distance). Responsive to a selection of a given control action (e.g., turn of 15°) based on the sensory input (e.g., distance from an obstacle of 0.7 m), the counter N for that action may be incremented. In some implementations of learning comprising opposing control actions (e.g., right and left turns shown by rows 3-4 in Table 2), responsive to a selection of one action (e.g., turn of)+15° during learning, the counter N for that action may be incremented while the counter for the opposing action may be decremented.

As seen from the example shown in Table 1, as a function of the distance to obstacle falling to a given level (e.g., 0.7 m), the controller may produce a turn command. A 15° turn is most frequently selected during training for distance to obstacle of 0.7 m. In some implementations, predictor may be configured to store the LUT (e.g., Table 1) data for use during subsequent operation. During operation, the most frequently used response (e.g., turn of) 15° may be output for a given sensory input, in one or more implementations, In some implementations, the predictor may output an average of stored responses (e.g., an average of rows 3-5 in Table 1).

TABLE 1

| d | α° | N |
|---|---|---|
| 0.9 | 0 | 10 |
| 0.8 | 0 | 10 |
| 0.7 | 15 | 12 |
| 0.7 | 10 | 4 |
| 0.7 | 5 | 1 |
| ... | | |
| 0.5 | 45 | 3 |

TABLE 2

| d | α° | N |
|---|---|---|
| 0.9 | 0 | 10 |
| 0.8 | 0 | 10 |
| 0.7 | 15 | 12 |
| 0.7 | −15 | 4 |
| ... | | |
| 0.5 | 45 | 3 |

Figure 3A:
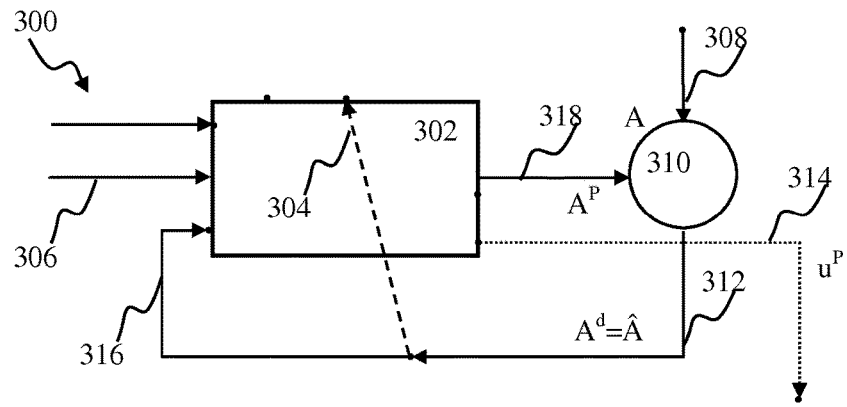
FIG. 3A is a block diagram illustrating an adaptive predictor configured to develop an association between control action and sensory context, according to one or more implementations.

FIG. 3A illustrates an adaptive predictor configured to develop an association between a control action and sensory context, according to one or more implementations. The control system 300 of FIG. 3A may comprise an adaptive predictor 302 and a combiner 312. The combiner 312 may receive an action indication 308 from a control entity (e.g., the apparatus 342 of FIG. 3B and/or 212 of FIG. 2A).

Figure 3B:
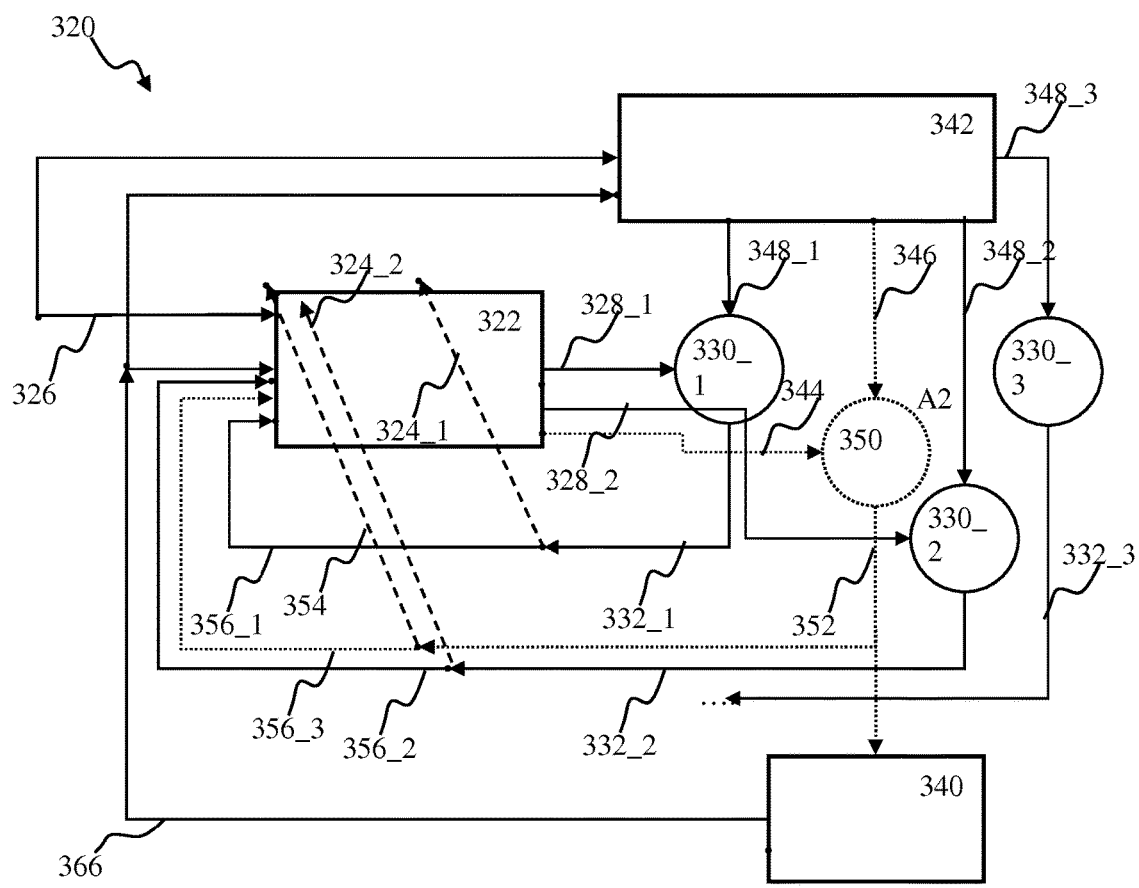
FIG. 3B is a block diagram illustrating a control system comprising an adaptive predictor configured to generate control signal based on an association between control action and sensory context, according to one or more implementations.

In some implementations of a control system, such as described with respect to FIGS. 3A-3B, the controller (e.g., 342 in FIG. 3B) may be configured to issue a higher level control directive, e.g., the action indication 308, 348, in FIGS. 3A-3B that are not directly communicated to the plant (2040) but rather are directed to the predictor (e.g., 302, 322 in FIGS. 3A-3B). As used herein the term "action indication" may be used to refer to a higher level instruction by the controller that is not directly communicated to the plant. In one or more implementations, the action indication may comprise, for example, a directive 'turn', 'move ahead'. In some implementations, the control system may utilize a hierarchy of action indications, ranging from less complex/more specific (e.g., turn, move) to more abstract: approach, avoid, fetch, park, grab, and/or other instructions.

Action indications (e.g., 308, 348 in FIGS. 3A-3B) may be configured based on sensory context (e.g., the sensory input 306, 326 in FIGS. 3A-3B). In one or more implementations, the context may correspond to presence of an object (e.g., a target and/or an obstacle), and/or object parameters (e.g., location), as illustrated in FIG. 5. Panels 500, 510 in FIG. 5 illustrate position of a robotic device 502, comprising for example, a control system (e.g., 300, 320 of FIGS. 3A-3B). The control system may comprise a controller and a predictor. The device 502 may be configured to approach a target 508, 518. The controller of the device 502 may provide an action indication A1 504, A2 514 that may be configured in accordance with the sensory context, e.g., the location of the object 508, 518 with respect to the device 502. By way of a non-limiting example, responsive to the object 508 being to the right of the device 502 trajectory (as shown in the panel 500), the action indication A1 504 may indicate an instruction "turn right". Responsive to the object 508 being to the left of the device 502 trajectory (as shown in the panel 510), the action indication A2 514 may indicate an instruction "turn left". Responsive to the sensory context and the instruction 504, the predictor of the device control system may generate low level motor commands (e.g., depicted by broken arrows 506, 516 in FIG. 5) to execute the respective 90° turns to right/left.

Returning now to FIG. 3A, the control system 300 may comprise the combiner 312 configured to receive the controller action indication A 308 and predicted action indication 318. In some implementations, the combiner 312 may be operable in accordance with any applicable methodologies, e.g., described with respect to FIGS. 2A-3C, above.

The predictor 302 may be configured to generate the predicted action indication $A^P$ 318 based on the sensory context 306 and/or training signal 304. In some implementations, the training signal 304 may comprise the combined output A.

In one or more implementations, generation of the predicted action indication 318 may be based on the combined signal A being provided as a part of the sensory input (316) to the predictor. In some implementations comprising the feedback loop 318, 312, 316 in FIG. 3A, the predictor output 318 may be combined with the controller action indication 308. The combiner 310 output signal 312 may be used as an input 316 to the predictor. Predictor realizations, comprising action indication feedback connectivity, may be employed in applications, wherein (i) the action indication may comprise a sequence of timed actions (e.g., hitting a stationary target (e.g., a nail) with a hammer by a robotic arm); (ii) the predictor learning process may be sensory driven (e.g., by the sensory input 306) in absence of plant feedback (e.g., 336 in FIG. 3B); and (iii) the plant may be characterized by a plant state time parameter that may be greater than the rate of action updates (e.g., the sequence of timed actions 308). It may be advantageous for the predictor 302 to account for a prior action within the sequence (e.g., via the feedback input 316) so as to take into account the effect of its previous state and/or previous predictions in order to make a new prediction. Such methodology may be of use in predicting a sequence of actions/behaviors at time scales where the previous actions and/or behavior may affect the next actions/behavior, e.g., when a robotic manipulator arm may be tasked to fill with coffee three cups one a tray: completion of the first action (filling one cup) may leave the plant (arm) closes to another cup rather than the starting location (e.g., coffee machine). The use of feedback may reduce coffee serving time by enabling the arm to move from one cup to another without returning to the coffee machine in between. In some implementations (not shown), action feedback (e.g., 316 in FIG. 3A) may be provided to other predictors configured to predict control input for other tasks (e.g., filling the coffee pot with water, and/or placing the pot into the coffee maker).

In some implementations, generation of the predicted action indication $A^P$ by the predictor 302 may be effectuated using any of the applicable methodologies described above (e.g., with respect to FIGS. 2A-3C). The predictor may utilize a learning process based on the teaching signal 304 in order to associate action indication A with the sensory input 306 and/or 316.

The predictor 302 may be further configured to generate the plant control signal 314 low level control commands/instructions based on the sensory context 306. The predicted control signal 314 may be interfaced to a plant. In some control implementations, such low-level commands may comprise instructions to rotate a right wheel motor by 30°, apply motor current of 100 mA, set motor torque to 10%, reduce lens diaphragm setting by 2, and/or other commands. The low-level commands may be configured in accordance with a specific implementation of the plant, e.g., number of wheels, motor current draw settings, diaphragm setting range, gear ration range, and/or other parameters.

In some implementations of target approach, such as illustrated in FIG. 5, a predictor may be configured to learn different behaviors (e.g., generate different motor output commands) based on the received sensory context. Responsive to: (i) a target appearing on right/left (with respect to the robotic plant); and (ii) 'turn' action indication the predictor may learn to associate a turn towards the target (e.g., right/left turn 506, 516 in FIG. 5). The actual configuration of the turn commands, e.g., rate of turn, timing, turn angle, may be configured by the predictor based on the plant state (platform speed, wheel position, motor torque) and/or sensory input (e.g., distance to target, target size) independent of the controller.

Responsive to the 'turn' command arriving to the predictor proximate in time to the sensory context indicative of a target, the predictor may generate right/left turn control signal in the presence of the sensory context. Time proximity may be configured based on a particular application parameters (e.g., robot speed, terrain, object/obstacle size, location distance, and/or other parameters). In some applications to garbage collecting robot, the turn command may be time locked (to within +10 ms) from the sensory context indicative of a need to turn (for example toward a target). In some realizations, a target appearing to the right of the robot in absence of obstacles may trigger the action 'turn right'.

During learning predictor may associate movement towards the target (behavior) with the action indication. Subsequently during operation, the predictor may execute the behavior (e.g., turn toward the target) based on a receipt of the action indication (e.g., the 'turn' instruction). In one or more implementations, the predictor may be configured to not generate control signal (e.g., 314 in FIG. 3A) in absence of the action tag (e.g., 308 and/or 304). In other words, the predictor may learn to execute the expected (learned) behavior responsive to the presence of the action indication (informing what action to perform, e.g., turn) and the sensory input (informing the predictor where to turn).

Such associations between the sensory input and the action indicator may form a plurality of composite motor primitive comprising an action indication (e.g., A=turn) and actual control instructions to the plant that may be configured in accordance with the plant state and sensory input.

In some implementations, the predictor may be configured to learn the action indication (e.g., the signal 308 in FIG. 3B) based on the prior associations between the sensory input and the action tag. The predictor may utilize learning history corresponding to a sensory state (e.g., sensory state x1 described with respect to Table 5) and the occurrence of the action tag contemporaneous to the sensory context x1. By way of illustration, based on two or more occurrences (prior to time t1) of the tag A='turn' temporally proximate to a target object (e.g., 508, 518 in FIG. 5) being present to one side from the robotic device 502, the predictor may (at time t1) generate the tag (e.g., signal 318) in absence of the tag input 308.

Based on learning of associations between action tag-control command; and/or learning to generate action tags, the predictor may be able to learn higher-order control composites, such as, for example, 'approach', 'fetch', 'avoid', and/or other actions, that may be associated with the sensory input.

FIG. 3B is a block diagram illustrating an control system comprising an adaptive predictor configured to generate control signal based on an association between control action and sensory context, according to one or more implementations.

The control system 320 may comprise controller 342, predictor 322, plant 340, and one or more combiners 330, 350. The controller 342 may be configured to generate action indication A 348 based on sensory input 326 and/or plant feedback 336. The controller 342 may be further configured to generate one or more low-level plant control commands (e.g., 346) based on sensory input 326 and/or plant feedback 336. In some control implementations, the low-level commands 346 may comprise instructions to rotate a right wheel motor by 30°, apply motor current of 100 mA, set motor torque to 10%, reduce lens diaphragm setting by 2, and/or other commands. The low-level commands may be configured in accordance with a specific implementation of the plant, e.g., number of wheels, motor current draw settings, diaphragm setting range, gear ration range, and/or other parameters.

One or more of the combiners of the control system of FIG. 3B (e.g., 330_1) may be configured to combine an action indication (e.g., tag A) 348_1, provided by the controller, and the predicted action tag $A^P$ from the predictor to produce a target action tag A 332_1.

One or more of the combiners (e.g., 350) may be configured to combine a control command 346, provided by the controller, and the predicted control instructions $u^P$ 344, provided by the predictor, to produce plant control instructions $\hat{u}=h(u,u^P)$ (e.g., 352).

The predictor 322 may be configured to perform prediction of (i) one or more action indications 348; and/or plant control signal $u^P$ 352 that may be associated with the sensory input 326 and/or plant feedback 336. The predictor 322 operation may be configured based on two or more training signals 324, 354 that may be associated with the action indication prediction and control command prediction, respectively. In one or more implementations, the training signals 324, 354 at time t2 may comprise outputs of the respective combiners 330, 350 at a prior time (e.g., t1=t2−dt), as described above with respect to Eqn. 7.

The predictor 322 may be operable in accordance with a learning process configured to enable the predictor to develop associations between the action indication input (e.g., 348_1) and the lower-level control signal (e.g., 352). In some implementations, during learning, this association development may be aided by plant control instructions (e.g., 346) that may be issued by the controller 342. One (or both) of the combined action indication signal (e.g., 332_1) and/or the combined control signal (e.g., 352) may be utilized as a training input (denoted in FIG. 3B by the arrows 324_1, 354, respectively) by the predictor learning process. Subsequent to learning, once the predictor has associated the action indicator with the sensory context, the low-level control signal (e.g., 346) may be withdrawn by the controller. Accordingly, the control system 320 of FIG. 3B may take configuration of the control system 300 shown in FIG. 3A.

In some implementations, the combined action indication signal (e.g., 332) and/or the combined control signal (e.g., 352) may be provided to the predictor as a portion of the sensory input, denoted by the arrows 356 in FIG. 3B.

In one or more implementations, two or more action indications (e.g., 348_1, 348_2_ may be associated with the control signal 352. By way of a non-limiting example, illustrated for example in FIG. 14, the controller apparatus 320 may be configured to operate a robotic platform. Action indication 348_1 may comprise a higher level control tag 'turn right'; the action indication 348_2 may comprise a higher level control tag 'turn left'. Responsive to receipt of sensory input 356, 326 and/or teaching input 324, 354 the predictor 322 may learn to associate, for example, 'turn right' action tag with a series of motor instructions (e.g., left wheel rotate forward right, right wheel rotate backwards) with one (or more) features (e.g., object type and location) that may be present within the sensory input. Such association s may be referred to as a composite task (e.g., comprising tag and a motor output).

Upon learning these composite tasks, the predictor 322 may be provided with a higher level action indication (e.g., 348_3). The term 'higher level' may be used to describe an action (e.g., 'approach'/'avoid') that may comprise one or more lower level actions (e.g., 348_1, 348_2, 'turn right'/ 'turn left'). In some implementations, the higher level action indication (e.g., 348_3) may be combined (by, e.g., the combiner 330_3 in FIG. 3B) with a predicted higher level action indication (not shown in FIG. 3B). The combined higher level action indication may be provided to the predictor as a teaching signal and/or sensory input (not shown in FIG. 3B. One or more levels of action indications may form a hierarchy of actions, also referred to as primitives or subtasks.

Control action separation between the predictor 302, 322 (configured to produce the plant control signal 314, 352) and the controller 342 (configured to provide the action indication 348) described above, may enable the controller (e.g., 342 in FIG. 3B) to execute multiple control actions (e.g., follow a target while avoiding obstacles) contemporaneously with one another.

Control action separation between the predictor 302, 322 (configured to produce the plant control signal 314, 352) and the controller 342 (configured to provide the action indication 348) described above, may enable the controller (e.g., 342 in FIG. 3B) to execute multiple control actions (e.g., follow a target while avoiding obstacles) contemporaneously with one another.

The controller 342 may be operable in accordance with a reinforcement learning (RL) process. In some implementations, the RL process may comprise a focused exploration methodology, described for example, in co-owned U.S. patent application Ser. No. 13/489,280 entitled "APPARATUS AND METHODS FOR REINFORCEMENT LEARNING IN ARTIFICIAL NEURAL NETWORKS", filed Jun. 5, 2012, incorporated supra.

The predictor 322 may be operable in accordance with a supervised learning (SL) process. In some implementations, the supervised learning process may be configured to cause output that is consistent with the teaching signal. Output consistency may be determined based on one or more similarity measures, such as correlation, in one or more implementations.

Reinforcement learning process of the controller may rely on one or more exploration techniques. In some implementations, such exploration may cause control signal corresponding one or more local minima of the controller dynamic state. Accordingly, small changes in the controller input (e.g., sensory input 326 in FIG. 3B) may cause substantial changes in the control signal responsive to a convergence of the controller state to another local minimum. Exploration of reinforcement learning may require coverage of a full state space associated with the controller learning process (e.g., full range of heading, tilt, elevation for a drone searching for a landing strip). State exploration by reinforcement learning may be time consuming and/or may require more substantial computational and/or memory resources when compared to supervised learning (for the same spatial and temporal resolution). Training signal used by supervised learning may limit exploration by pointing to a region within the state space where the target solution may reside (e.g., a laser pointer used for illuminating a potential target). In some implementations, the supervised learning may be faster (e.g., converge to target solution with a target precision in shorter amount of time) compared to reinforcement learning. The use of target signal during training may enable the SL process to produce a more robust (less varying) control signal for a given set of sensory input, compared to the RL control signal. For a given size/capability of a software/hardware controller platform, reinforcement learning may perform fewer tasks (a single task in some implementations) compared to supervised learning that may enable the controller platform to execute several (e.g., 2-10 in some implementations). In one or more implementations, reinforcement learning signal may be provided by human operator.

Exemplary operation of adaptive controller system (e.g., 200, 230, 270 of FIGS. 2A-2C, respectively) is now described in detail. The predictor and/or the controller of the adaptive controller system may be operated in accordance with an update process configured to be effectuated continuously and/or at discrete time intervals Δt, described above with respect to Eqn. 7.

The control signal (e.g., 208 in FIG. 2A) may be provided at a rate between 1 Hz and 1000 Hz. A time scales $T_{plant}$ describing dynamics of the respective plant (e.g., response time of a rover and/or an aerial drone platform, also referred to as the behavioral time scale) may vary with the plant type and comprise scales on the order of a second (e.g., between 0.1 s to 2 s).

The transfer function of the combiner of the exemplary implementation of the adaptive controller apparatus 200, may be configured as follows:

$$\hat{u} = h(u, u^P) = u + u^P. \quad \text{(Eqn. 14)}$$

Training of the adaptive predictor (e.g., 222 of FIG. 2A) may be effectuated via a plurality of trials. In some implementations, training of a mechanized robot and/or an autonomous rover may comprise between 5 and 50 trials. Individual trials may be configured with duration that may be sufficient to observe behavior of the plant (e.g., execute a turn and/or another maneuver), e.g., between 1 and 10 s.

In some implementations the trial duration may last longer (up to tens of second) and be determined based on a difference measure between current performance of the plant (e.g., current distance to an object) and a target performance (e.g., a target distance to the object). The performance may be characterized by a performance function as described in detail in co-owned and co-pending U.S. patent application Ser. No. 13/487,499 entitled "STOCHASTIC APPARATUS AND METHODS FOR IMPLEMENTING GENERALIZED LEARNING RULES, incorporated supra. Individual trials may be separated in time (and in space) by practically any duration commensurate with operational cycle of the plant. By way of illustration, individual trial when training a robot to approach objects and/or avoid obstacles may be separated by a time period and/or space that may be commensurate with the robot traversing from one object/obstacle to the next. In one or more implementations, the robot may comprise a rover platform, and/or a robotic manipulator arm comprising one or more joints. e.g., as shown and described with respect to FIG. 4A.

Figure 4A:
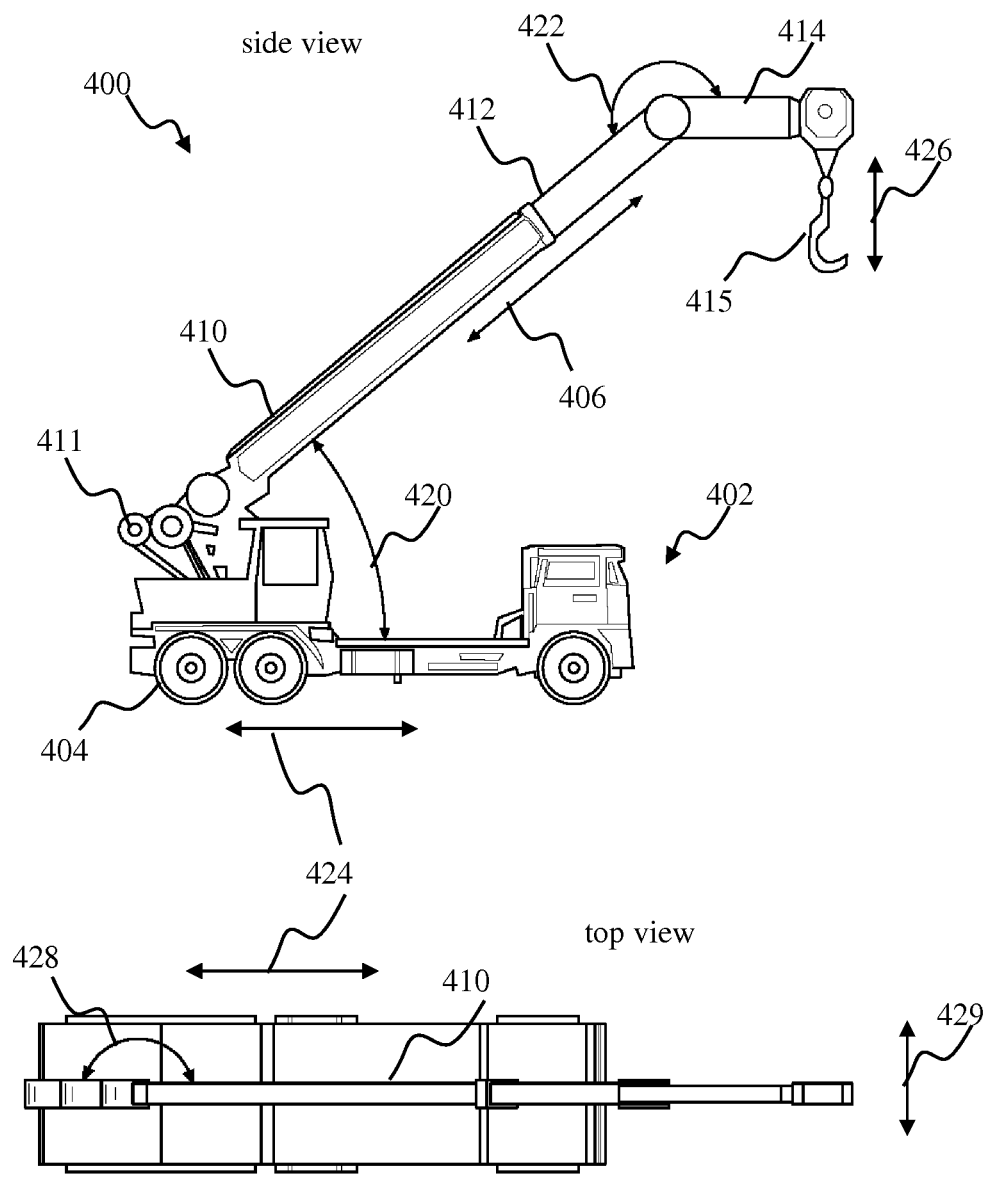
FIG. 4A is a graphical illustration depicting a robotic apparatus capable of operating in three spatial dimensions, according to one or more implementations.

FIG. 4A illustrates a robotic apparatus comprising multiple controllable components operable in two or more degrees of freedom (DoF). The apparatus 400 may comprise a platform 402 configured to traverse the robotic apparatus 400 in a direction indicated by arrow 424. In some implementations, the platform may comprise one or more motor driven wheels (e.g., 404) and/or articulated wheels.

The platform may be adapted to accept a telescopic arm 410 disposed thereupon. The arm 410 may comprise one or more portions (e.g., boom 412, portion 414) configured to be moved in directions shown by arrows 406 (telescope boom 412 in/out), 422 (rotate the portion 414 up/down), and/or other directions. A utility attachment 415 may be coupled to the arm 414. In one or more implementations, the attachment 415 may comprise a hook, a grasping device, a ball, and/or any applicable attachment. The attachment 415 may be moved in direction shown by arrow 426. The arm 410 may be configured to elevate up/down (using for example, motor assembly 411) and/or be rotated as shown by arrows 420, 428 respectively in FIG. 4A.

FIG. 4B-4C illustrate robotic controller realizations configured consistent with a phenotype of the robotic apparatus of FIG. 4A. The controller 450 of FIG. 4B may comprise a plurality of controls elements adapted to manipulate the platform 402 (e.g., controls 462, 464), and the arm 410 (e.g., the controls 452, 454, 456, 458). One or more of the controls 452, 454, 456, 458, 462, and/or 464 may comprise joystick, slider, another control type (e.g., knob 478 described with respect to FIG. 4C), and/or other controls. The control elements in FIGS. 4B-4C may comprise hardware elements and/or software control rendered, for example, on a touch screen of a portable computerized device (e.g., smartphone, tablet, and/or other portable device). In some implementations, the control elements may include the configuration of a contactless motion sensing interface system, with and/or without an explicit indication as to the current configuration. In the case of an explicit indication, for example, the configuration may be indicated by representations displayed via a screen, or via changes on a device held by the user to perform the motions, or via light projected onto the source of motion (e.g., onto the hands of the human operator).

The control elements 464, 462 may be configured to operate along directions 462, 460, respectively. The control elements 464, 462 may be configured to control two dimensional motion of the platform 402 (shown by arrows 424, 429, respectively in FIG. 4A). The control elements 456, 462, 464 may be configured to operate along direction 463. The control elements 456, 462, 464 may be configured to control vertical motion of the attachment 415, the arm 410, the boom 412, and/or other components. The control element 458 may be adapted to control the horizontal orientation of the arm 410 (e.g., as shown by the arrow 428 in FIG. 4A). Another control element(s) (not shown) may be used to control the rotation 422 of the portion 414.

In some implementations of the robotic device (e.g., the robotic apparatus 400), the portion 414 may be omitted during device configuration, and/or configured to extend and/or retract (e.g., by a telescoping action). The controller 450 interface may be configured in accordance with modification of the robotic device, by for example, providing an additional control element (not shown) to control the extension of the portion 414. In some implementations, in order to reduce the number of controls, additional control operations may be effectuated by contemporaneous motion of two or more control elements. By way of example, simultaneous motion of control elements 454, 456 may effectuate extension control of the portion 414.

The controller 457 of FIG. 4C may comprise a plurality of controls elements adapted to manipulate the platform 402 (e.g., controls 482, 480), and the arm 410 (e.g., the controls 472, 474, 476, 478). One or more of the controls 472, 474, 476, 480 may comprise joystick, slider and/or another linear motion control type. The elements 478, 482 may comprise rotary motion controls (e.g., knobs) configured to be rotates as shown by arrows 486, 488, respectively. The control elements in FIGS. 4B-4C may comprise hardware elements and/or software control rendered, for example, on a touch screen of a portable computerized device (e.g., smartphone, tablet).

Figure 6A:
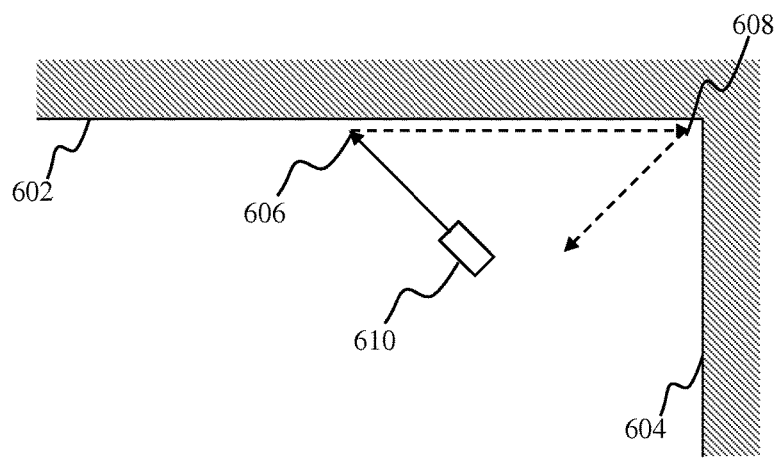
FIG. 6A is a graphical illustration depicting obstacle avoidance training of a robotic device, according to one or more implementations.

FIG. 6A illustrates an exemplary trajectory of a rover configured to learn obstacle avoidance. The rover 610 may be configured to avoid walls 602, 604. In some implementations, the avoidance policy may comprise execution of a 45° turn, e.g., 606, 608 in FIG. 6A. As used herein designators TN may be used to refer to a time of a given trial (e.g., T1 denoting time of first trial). During first trial, at time T1:

the predictor (e.g., 222 of FIGS. 2A-2B) may receive control signal u1 (e.g., turn right 45°) from control entity 212. The control signal may correspond to sensory input x1 (e.g., 206, 216 in FIG. 2A) that may be received by the controller and/or the predictor; such signal may comprise a representation of an obstacle (e.g., a wall), and/or a target (e.g., a charging dock);

the predictor may be configured to generate predicted control signal (e.g., u1$^P$=0°);

the combiner may produce combined output u1'=45°; and the plant 210 may begin to turn right in accordance with the combined output (e.g., 220).

During another trial at time T2>T1:

the predictor 222 may receive control signal u2 (e.g., still turn right 45°) from the controller 212;

the plant feedback may indicate to the predictor that the plant is executing a turn (in accordance with the prior combined output u1'); accordingly, the predictor may be configured to 'mimic' the prior combined output u1' and to generate predicted control signal (e.g., u2$^P$=10°);

the combiner may produce new combined output u2'=55°; and the plant 210 may increase the turn rate in accordance with the updated control signal u2'.

During another trial at time T3>T2:

the input x3 may indicate to the controller 212 that the plant turn rate is in excess of the target turn rate for the 40° turn; the controller 212 may reduce control signal to u3=35°;

based on the input x3, indicative of e.g., the plant turn rate for u2'=55°, the predictor may be configured to increase its prediction to e.g., u3$^P$=20°; and the combiner (e.g., 210 of FIG. 2A) may receive control signal u3 (e.g., turn right) 35° from the controller 212; the combiner may produce the combined output u3'=55°.

During other trials at times Ti>T3 the predictor output may be increased to the target plant turn of 45° and the control signal 208 may be reduced to zero. In some implementations, the outcome of the above operational sequence may be referred to as (gradual) transfer of the control signal to the predictor output. A summary of one implementation of the training process described above may be summarized using data shown in Table 1:

TABLE 3

| Trial # | Control signal u [deg] | Predicted signal u$^P$ [deg] | Combined signal û [deg] | Error (û − u) [deg] |
|---|---|---|---|---|
| 1 | 45 | 0 | 45 | 0 |
| 2 | 45 | 10 | 55 | 10 |
| 3 | 35 | 20 | 55 | 10 |
| 4 | 25 | 35 | 60 | 15 |
| 5 | 25 | 50 | 60 | 15 |
| 6 | 0 | 55 | 55 | 10 |
| 7 | 0 | 55 | 55 | 10 |
| 8 | −10 | 55 | 45 | 0 |
| 9 | −10 | 50 | 40 | −5 |
| 10 | 0 | 45 | 45 | 0 |

As seen from Table 3, when the predictor is capable to producing the target output (e.g., trial #10), the control signal (e.g., 208 in FIG. 2A) may be withdrawn (removed). The output of the combiner (e.g., 214) in such realizations may comprise the predictor output in accordance with, for example, Eqn. 14.

In some implementations, the control entity (e.g., 212 in FIG. 2A) may comprise a human trainer of the robot. In one or more implementations, the control entity may comprise an adaptive system operable in accordance with a learning process. In one or more implementations, the learning process of the controller may comprise one or more reinforcement learning, unsupervised learning, supervised learning, and/or a combination thereof, as described in co-owned and co-pending U.S. patent application Ser. No. 13/487,499 entitled "STOCHASTIC APPARATUS AND METHODS FOR IMPLEMENTING GENERALIZED LEARNING RULES", incorporated supra.

In one or more implementations, the training steps outlined above (e.g., trials summarized in Table 3) may occur over two or more trials wherein individual trial extend over behavioral time scales (e.g., one second to tens of seconds).

In some implementations, the training steps may occur over two or more trials wherein individual trials may be characterized by control update scales (e.g., 1 ms to 1000 ms).

In some implementations, the operation of an adaptive predictor (e.g., 222 in FIG. 2A) may be characterized by predictor learning within a given trial as illustrated and described with respect to Table 4.

Figure 6B:
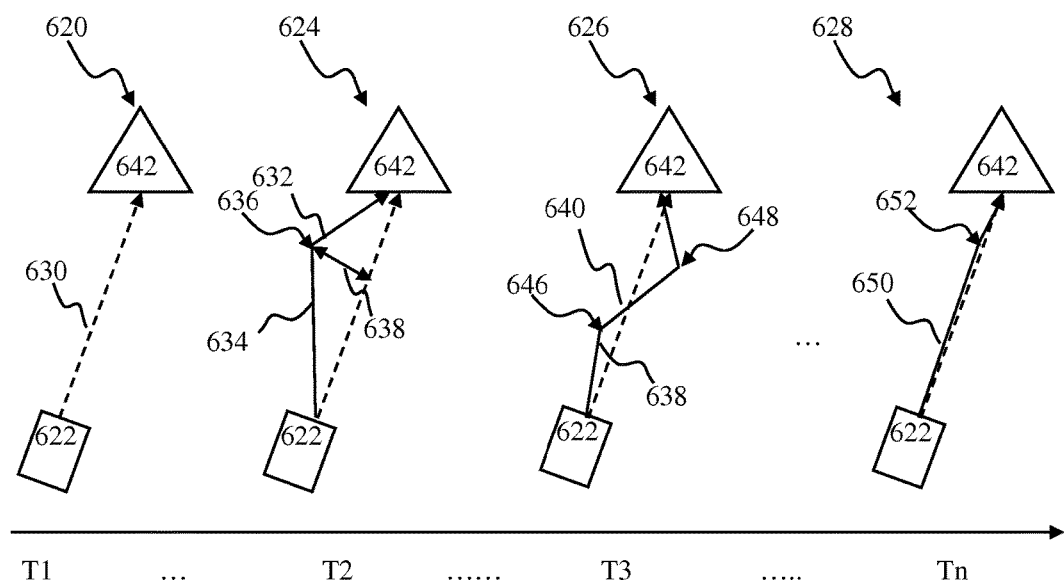
FIG. 6B is a graphical illustration depicting training a robot to perform a target approach task, according to one or more implementations.

FIG. 6B illustrates training of a robotic rover device to approach a target. The robot 622 in FIG. 6B may be configured to approach the target 642 (e.g., a ball, a charging station, and/or other target). Training may comprise a plurality of trials 620, 664, 626, 628 wherein a teacher may train the rover to perform a target approach along a target trajectory (e.g., depicted by broken line arrow 630). As used herein designators TN may be used to refer to a time of a given trial (e.g., T1 denoting time off trial 620). In some implementations, the teacher may comprise a human trainer. The robot may comprise an adaptive controller, e.g., the controller 200 of FIG. 2A. During one or more initial trials (e.g., 630 in FIG. 6B) the teacher may direct the robot 622 along the target trajectory 630. In some implementations, the teacher may employ a demonstration using teleoperation, using one or more applicable user interfaces. Such interfaces may include one or more of: a remote controller (e.g. joystick, nunchuck, and/or other devices), voice commands (e.g., go forward, go left or right, and/or other voice commands), a gesture recognition system (e.g., Kinect), and/or other interfaces.

In one or more implementations, the teacher may employ a demonstration with so-called kinesthetic teaching, wherein the robot is physically guided (e.g., 'dragged') through the trajectory by the teacher. In this approach, the adaptive controller learning process may comprise an inverse model of the robotic platform. The adaptive controller may be configured to translate the changes in the observed robot sensory space to the motor actions that would result in the same sensory space.

In one or more implementations, the robot may employ learning by a mimicking methodology. The robot may be configured to observe a demonstrator performing the desired task and may learn to perform the same task on its own.

While following the target trajectory, a learning process of the robot controller may learn (e.g., via adaptation of learning parameters) an interrelationship between the sensory input, the controller state, and/or the teaching input. In the realization illustrated in FIG. 6B, the sensory input may comprise data related to robot motion parameters (position, orientation, speed, acceleration and/or other parameters) and/or target information (distance to, color, shape, and/or other information). The teaching input may comprise a motion directive (e.g., joystick forward and/or other directive), motor control commands (e.g., rotate left wheel clockwise and/or other commands) and/or other teaching input. In some implementations, during the teacher-guided trials (e.g., 620), the motor control output (e.g., 220 in FIG. 2A) may be configured solely on the control input from the teacher in accordance with Eqn. 4.

Upon completion of one or more teacher-guided trials, the robot 622 may be configured to perform one or more teacher-assisted trials (e.g., the trials 624, 626, 628 in FIG. 6B). During a teacher-assisted trial the adaptive controller of the robot 622 may be configured to generate a predicted control signal (e.g., 218 in FIG. 2A). The predicted control signal may be combined with the user input using any of the methodologies described herein and/or other methodologies. During the trial 624, the robot may process along trajectory portion 634. In some implementations, the user may withdraw its guidance during the traversal of the trajectory portion 634 by the robot so as to assess an ability of the robot to navigate the target trajectory. The trajectory portion 634 may deviate from the target trajectory 630. Upon determining that the trajectory deviation (denoted by the arrow 638) exceeds a maximum deviation for the task, the user may assist the controller of the robot by providing user input. In some implementations, the user input may be configured to assist the robot by providing a correction (e.g., turn right by 110°, indicted by the arrow 636). In one or more implementations, the user input may comprise reward/penalty signals to the robot. The reward/penalty signal may be based on the robot entering given states (e.g., reward for robot orienting itself towards the target, penalty for orienting away from the target, and/or other states); and/or taking certain actions while traversing a trajectory. In some implementations, the user input may comprise a warning and/or a correction signal (e.g., more to the right).

The teacher may utilize a reset signal configured to reset to a base state configuration of the learning process. In some implementations, such reset may be used to reset neuron states and/or connection weights of a predictor based on predictor generating predicted signal that may be inconsistent (e.g., guides the robot away from a target in target approach task) with the target action.

In some implementations, the learning process may be configured to store intermediate learning stages corresponding to one or more portions of the trajectory traversal. By way of illustration, the trajectory portions 638, 640 in FIG. 6B may be stored as individual learning stages (partitions) based on an occurrence of a tag signal. The tag signal may be received from the teacher and/or generated internally by the controller based on one or more criteria (e.g., rate of change of motion, distance from target, performance measure and/or other measure). A reset signal may be utilized to reset (clear) learning data associated with the portion 640, while the data related to the portion 638 may remain intact. In some implementations, the adaptive controller may be configured to store its state at the time of the tag signal. Upon receiving a reset signal at a subsequent time, the controller may be configured to retain learning data occurring prior to the tag, while resetting data occurred subsequent to the tag.

During individual trials 624, 626, 628 user assistance may be provided one or more times, as illustrated by arrows 636, 646, 648 in FIG. 6B.

While following a trajectory during trials 624, 626, 628, a learning process of the robot controller may learn (e.g., via adaptation of learning parameters) an interrelationship between the sensory input, the controller state (e.g., predicted control signal), and/or the teaching input.

During successive trials 624, 626, 628 the performance of the robot may improve as determined based on a performance measure. In some implementations, the performance measure may comprise a discrepancy measure between the actual robot trajectory (e.g., 632, 634) and the target trajectory. The discrepancy measure may comprise one or more of maximum deviation, maximum absolute deviation, average absolute deviation, mean absolute deviation, mean difference, root mean squatter error, cumulative deviation, and/or other measures.

Upon completion of one or more teacher-assisted trials (e.g., 624, 628), the robot 622 may be configured to navigate the target trajectory absent user input (not shown in FIG. 6B). The learning by the robot during previous trials may enable navigation of the target trajectory by the robot that is within the training performance margin. It is noteworthy that, during user-assisted training trials, the user and the robot may cooperate with one another (e.g., via the use of the combiners 310, 330 of FIGS. 3A-3B) in order to accomplish target action (e.g., navigate the trajectory 630 of FIG. 6B).

Learning by the adaptive controller apparatus (e.g., 200 FIG. 2) may enable transfer of information ('knowledge') from the user (e.g., control signal e.g., 208 in FIG. 2A) to the robot (e.g., predicted control output (e.g., 218 in FIG. 2A) of the adaptive controller). As used herein the term 'knowledge' may refer to changes to the adaptive controller state needed to reproduce, in its predictions (e.g., 218 in FIG. 2A), the signals previously produced by the control signal (e.g., 208 in FIG. 2A), but in the absence of continued control signal.

It is noteworthy that, in accordance with the principles of the present disclosure, the information transfer (such as described with respect to FIG. 6B) may occur not instantaneously but gradually on time scales that are in excess of the robot adaptive controller update intervals. Initially (e.g., at time T1 in FIG. 6A), the user may be capable of controlling the robot in accordance with the target trajectory. Subsequently (e.g., at time T>Tn in FIG. 6B), the adaptive controller may be capable of controlling the robot in accordance with the target trajectory. There may exist an intermediate state (e.g., T2, T3, Tn in FIG. 6B) wherein: (i) both the adaptive controller and the user are attempting to operate the robot in accordance with the target trajectory (e.g., the user provides the control signal 208, the adaptive controller generates the predicted control signal 218; (ii) the combined output (e.g., 220) is inadequate (either too large or too small) to achieve the target trajectory within the performance bounds; and/or other states.

In one or more implementations, the adaptive controller may be configured to generate the predicted signal $u^P$ such that it closely reproduces the initial control signal u. This is shown in Table 3, where predicted signal at trial 10 matches the initial control signal at trial 1.

In one or more implementations, such as described in owned U.S. patent application Ser. No. 13/842,530 entitled "ADAPTIVE PREDICTOR APPARATUS AND METHODS", filed Mar. 15, 2013, the adaptive controller may be configured to predict cumulative (e.g., integrated over the trial duration) outcome of the control action.

FIG. 6C illustrates training of a robotic device (e.g., the rover 610) to follow a target using results of prior training to avoid obstacles and approach targets (e.g., as that described with respect to FIGS. 6A-6B, respectively).

The rover 610 in FIG. 6C may be configured to approach/follow a ball 618, while avoiding obstacles (e.g., 612) and/or the walls 602, 604 in FIG. 6C. The environment of FIG. 6C may comprise three individual targets (e.g., balls shown by circles 618_1, 618_2, 618_3). In some implementations, the circles 618_1, 618_2, 618_3 may correspond to individual positions of a ball that may be moving (e.g., by a trainer) within the environment. The trainer may utilize a remote control apparatus in order to provide training input to the rover, e.g., as indicated by arrows 613, 615 in FIG. 6C. In one or more implementations, the remote control apparatus may comprise an adaptive controller configured based on rover's hardware and/or operational characteristics, e.g., as described in U.S. patent application Ser. No. 13/907,734 entitled "ADAPTIVE ROBOTIC INTERFACE APPARATUS AND METHODS", filed May 31, 2013, incorporated supra. In one or more implementations, the remote control apparatus may comprise a clicker apparatus, and training may comprise determination of a cost-function, e.g., as described in U.S. patent application Ser. No. 13/841,980 entitled "ROBOTIC TRAINING APPARATUS AND METHODS", filed Mar. 15, 2013, the forgoing being incorporated herein by reference in its entirety. By way of a non-limiting illustration, based on the user input 615, the rover may respond by altering its trajectory to segment 616 thereby avoiding the obstacle 612. Based on the user input 613, the rover may respond by altering its trajectory to segment 614 thereby effectuating approach to the target 618_1. Responsive to movement of the target, the rover may continue target approach maneuvers. In some implementations, during the approach to the targets 618_2, 618_3, the user input may diminish with time. In one or more implementations, the user input may comprise modulated input shown and described with respect to FIGS. 7A-7G, below.

Task execution (e.g. target approach and/or obstacle avoidance) may comprise development of hierarchical control functionality, e.g., described with respect to FIGS. 12-13 below. The interfaces illustrated in FIGS. 12-13 may be utilized, for example, for controlling robotic rover 610 of FIGS. 6A, 6C, robotic apparatus 400 of FIG. 4A, and/or apparatus 1160 of FIG. 11. FIG. 12 illustrates development of a hierarchy of control elements, in accordance with one or more implementations. The control group 1200 may comprise one or more control elements denoted by circles (e.g., 1202). The control elements of the group 1200 disposed to one side of zero mark 1208 (e.g., 1202, 1204) may be used to control forward motion of a robotic platform (e.g., 402 in FIG. 4A) and/or arm 410 in FIG. 4A. The control elements of the group 1200 disposed to another side of zero mark 1208 (e.g., 1208) may be used to control reverse motion of the robotic apparatus. A larger size control element (e.g., 1202) may effectuate motion of greater magnitude (e.g., speed, displacement, and/or acceleration). Control operations corresponding to individual control elements of the group 1200 may be referred to as primitives of a given (e.g., first) hierarchy level. One or more implementations of hierarchy development is described with respect to FIG. 14, below. Control elements of group 1200 may utilize control primitives of a lower hierarchy (e.g., individual motor activations 1420, 1422 in FIG. 14). It will be appreciated that controlling a robotic device comprising multiple controllable elements (e.g., the apparatus 400 of FIG. 4A) using the interface comprising multiple control primitives (e.g., the element of the group 1200) may require heightened attention from a user and/or sufficient real estate on the remote controller. Upon completing training of a robotic device to perform the functionality associated with individual controls of the group 1200, the robotic controller interface may be configured to implement a higher-level primitives, as shown by the controls 1210, 1220 in FIG. 12. In one or more implementations, the interface configuration may be performed by a user using a library of customizable control elements. In some implementations, the interface configuration may be performed adaptively, e.g., based on a user request and/or upon completion of the training. The control primitive 1210 may comprise a joystick and/or a rocker 1214 configured to be moved in the direction shown by the arrow 1212. Magnitude of the control displacement along the direction 1212 may encode the magnitude of the control input, in some implementations. The control primitive 1220 may comprise a pair of control elements 1222, 1224 (e.g., soft buttons). Activating individual buttons 1222, 1224 may cause forward/backward displacement of the controller entity. Duration of the button activation may encode the magnitude of the control input, in some implementations. In one or more implementations, the magnitude of the control input may be determined by the adaptive controller based on prior experience obtained during learning. In one or more implementations, the prior experience may be based on developed associations between sensory context and user control input.

FIG. 13 illustrates a higher hierarchy level (e.g., compared to the elements shown in FIG. 12) control primitives, in accordance with one or more implementations. The control elements 1300, 1302 may correspond, for example, to commands to the robot to approach target and avoid obstacle, respectively. The controls 1300, 1302 may utilize one or more primitives of a lower level (e.g., control element shown in FIG. 12 and/or other control elements). Activating control primitive 1320 may be utilized to enable a toy robot to engage in a game of fetch. In one or more implementations, the fetch activity may comprise following and/or retrieving a target (e.g., a ball) while avoiding obstacles (e.g., walls, and or furniture). Activating control primitive 1330 may be utilized to enable a mine disposal robot to condense mine disposal activity robot to engage in a game of fetch. In one or more implementations, the disposal may comprise detecting and/or approaching the mine, disposing a disposal charge, retreating while avoiding obstacles (e.g., rocks, craters, and/or other mines), and/or other actions.

Higher level primitives of the hierarchy may be developed based on a user request. In some implementations, the user may utilize one or more tags indicating, e.g., an operating sequence configured to be implemented as a higher hierarchy level control. By way of illustration, a user may transmit a start tag, perform one or more control operations, (e.g., manipulate the controls 452, 454, 456 of FIG. 4B to reach for a target using the arm 410), and/or perform other actions. Responsive to receipt of a stop tag, the controller may generate a higher level control (e.g., 1222 configured to perform control actions between the start and the stop tags). In one or more implementations, the higher level primitives of the hierarchy may be developed proactively based on a feedback from the controller. By way of an illustration, responsive to a detection of use of several lower level controls (e.g., the forward controls 1202, 1204 in FIG. 12), the controller may prompt a user as to generation of a higher level 'forward' control is to be performed. Responsive to a detection of multiple activations of the same control (e.g., the control 1204 in order to move farther forward), the controller may prompt a user as to generation of a higher level 'high-speed forward' control is to be performed.

A hierarchy of control elements and/or primitives, e.g., as described above with respect to FIGS. 12-13) may be utilized to implement a fused control of a robotic apparatus comprising multiple controllable elements (e.g., the apparatus 400 of FIG. 4A). In some implementations, activating forward and/or backward motion control (e.g., 1224, 1222) may cause operation of the arm elements over multiple controllable degrees of freedom (e.g., shown by arrows 420, 406, 422 in FIG. 4A). The control primitives 1224, 1222 may replace multiple control elements configured to control individual degrees of freedom (e.g., the elements 452, 454, 456 in FIG. 4B). In one or more implementations of a controller for the robotic apparatus 400 of FIG. 4A, activating the primitive 1224 may enable reaching of a target object by the utility attachment 415 of the arm 410. The object reaching may be based on activating forward motion of the platform 402 and/or forward motion of one or more arm elements 410, 412, 414.

The higher-level (e.g., composite) controls (e.g., 1300, 1320, 1330) may comprise audio commands, gestures, eye tracking, brain-machine interface and/or other communication methodologies. In some implementations, a user may associate an audio command tag with a specific task. For example, an audio tag such as 'forward' or 'fetch' may be associated with commanding the robot to move forward or play fetch, respectively. In some implementations, the robotic controller may comprise an audio processing block configured to store a characteristic (e.g., a spectrogram) associated with the command tag (e.g., word 'fetch'). As a part of generating a given higher-level control primitive, the controller may accept user input comprising a tag associated with the given higher-level control primitive. The tag may comprise an audio tag (e.g., voice command, clap, and/or other audio tag), a clicker sequence, a pattern (e.g., gesture, touch, eye movement, and/or other pattern), and/or other tag. Such an approach may alleviate a need for implementing recognition functionality (e.g., voice or gesture recognition) within the robotic device thereby enabling reduction of cost and/or complexity of the robot. The voice tag approach may be utilized by a user whose native language (e.g., English) may differ from that of the robot designer or manufacturer (e.g., Japanese) so as obviating a need to follow phonetic and pronunciation particulars of the designer's language. It will be appreciated by those skilled in the art that command tags may not need to relate to the task subject. The user may select to use arbitrary commands (e.g., 'one', 'two') in order to command the robot to move forward, backward. The tag provision may be prompted by the controller (e.g., via a prompt "How would you like to term the new control?"). The tag may be associated with a visible control element disposed on the control interface (e.g., say 'one' for action 1, say 'two' for action 2, and/or other visible control element). Upon accepting a user tag, the controller may store a tag characteristic (e.g., spectrogram, a pattern template, and/or another characteristic) for future tag detection. In one or more implementations, the tag detection may be effectuated based on a template matching approach, e.g., based on a cross correlation of user input and tag template (e.g., spectrogram). In some implementations, the tag detection may be effectuated based on a classification approach, for example, as described in U.S. patent application Ser. No. 13/756,372 entitled "SPIKING NEURON CLASSIFIER APPARATUS AND METHODS USING CONDITIONALLY INDEPENDENT SUBSETS", filed Jan. 31, 2013, the foregoing being incorporated herein by reference in its entirety.

Figure 14:
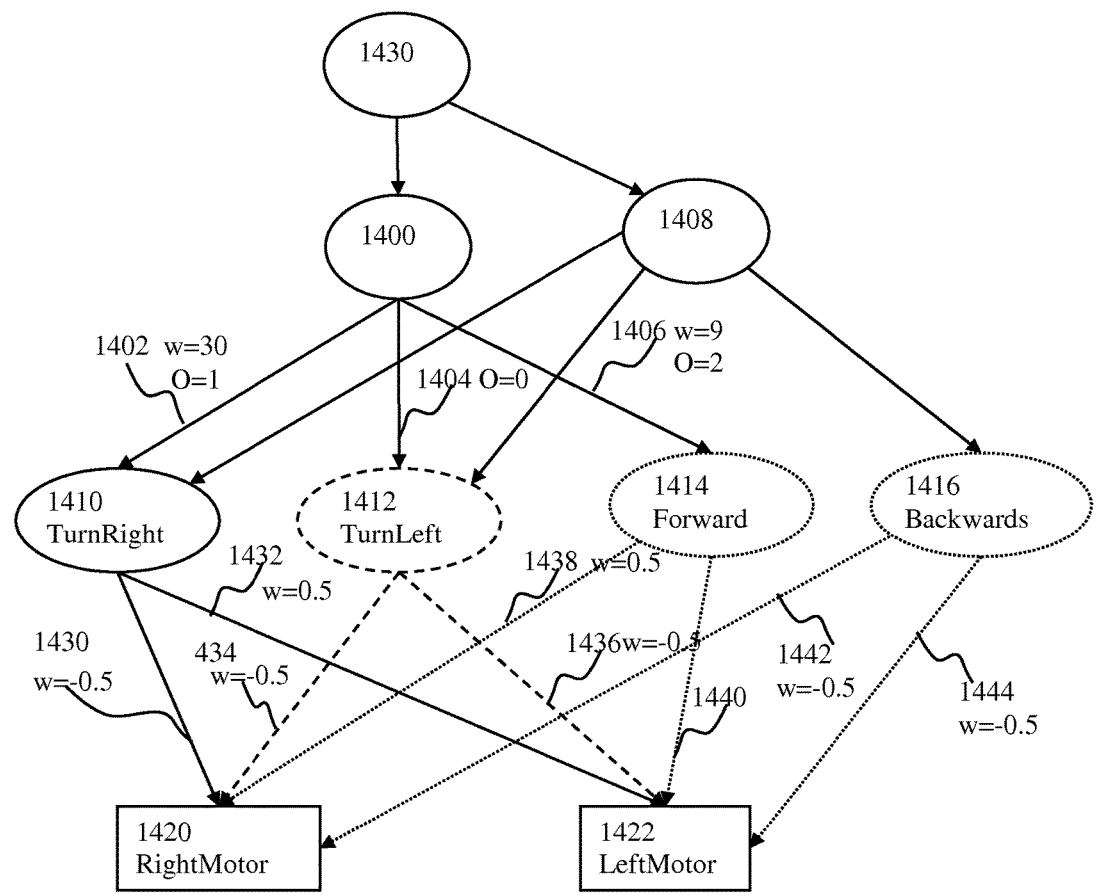
FIG. 14 is a graphical illustration depicting a hierarchy of control actions for use with an adaptive control system of e.g., FIGS. 3A-3B, according to one or more implementations.

FIG. 14 illustrates one example of a hierarchy of actions for use with, for example, controller of FIG. 3B. An action indication 1400 may correspond to a higher level composite action, e.g., 'approach', 'avoid', 'fetch', and/or other action. The composite action indication 1400 may be configured to trigger execution of or more actions 1410, 1412, 1414 (also referred to as subtasks). The subtasks 1410, 1412, 1414 may correspond to lower level actions (in the hierarchy of FIG. 14), such as 'turn right', 'turn left', 'go forward', respectively.

The subtasks (e.g., 1410, 1412, 1414 in FIG. 14) may be associated with one (or more) control signal instructions, e.g., signal 352 described with respect to FIG. 3B, supra. Individual second level subtasks (e.g., 1410, 1412, 1414 in FIG. 14) may be configured to invoke one or more lower level subtasks (e.g., third in FIG. 14). Subtasks 1420, 1422 may correspond to instructions configured to activate right/left motors of the robotic platform. In some implementations, subtasks that may be invoked by one or more higher level tasks and/or that may be configured to generate motor control instructions may be referred to as the motor-primitives (e.g., 1420, 1422 in FIG. 14).

Subtasks of a given level (e.g., 1400, 1408 and/or 1410, 1412, 1414 in FIG. 14) may comprise one or more activation parameters associated with lower level subtasks (e.g., 1410, 1412, 1414, and/or 1420, 1422 respectively in FIG. 14). The parameters (e.g., 1402, 1404, 1406) may comprise one or more of an execution order, weight, turn angle, motion duration, rate of change, torque setting, drive current, shutter speed, aperture setting, and/or other parameters consistent with the hardware and/or software configuration.

As illustrated in FIG. 14, the task 1400 (e.g., approach target) may comprise a 30° right turn followed by a 9 second forward motion. The parameters 1402, 1404, 1406 may be configured as follows:
O=1, w=30;
O=0; and
O=2, w=9; respectively.

The task 1408 may correspond to avoid target and may invoke right/left turn and/or backwards motion tasks 1410, 1412, 1416, respectively.

Individual tasks of the second level (e.g., 1410, 1412, 1414, 1416 in FIG. 14) may cause execution of one or more third level tasks (1420, 1422). The parameters 1430, 1432, 1434, 1436, 1438, 1440 may be configured as follows:
 to execute right turn: rotate forward left motor with torque of 0.5; (w=0.5), rotate right motor backwards with torque of 0.5; (w=−0.5);
 to execute left turn: rotate right motor backwards with torque of 0.5; (w=−0.5), rotate forward right motor with torque of 0.5; (w=0.5);

to move forward: rotate forward left motor with torque of 0.5; (w=0.5), rotate forward right motor with torque of 0.5; (w=0.5); and to move backwards: rotate left motor backwards with torque of 0.5; (w=−0.5), rotate right motor backwards with torque of 0.5; (w=−0.5).

The hierarchy illustrated in FIG. 14 may comprise another level (e.g., 1430) that may be configured to implement pursue functionality. In one or more implementations, the pursue functionality may trigger target approach task 1400 and/or obstacle avoidance task 1408.

In one or more implementations wherein the predictor comprises a spiking neuron network, learning a given behavior (e.g., obstacle avoidance and/or target approach) may be effectuated by storing an array of efficacies of connections within the predictor network. In some implementations, the efficacies may comprise connection weights, adjusted during learning using any applicable methodologies. In some implementations, connection plasticity (e.g., efficacy adjustment) may be implemented based on the teaching input as follows:

based on a teaching input (e.g., spike) and absence of neuron output spike connections delivering input spikes into the neuron (active connection) that precede the teaching spike (within a plasticity window), may be potentiated; and/or based on neuron output spike in absence of teaching input, active connections delivering input spikes into the neuron (active connection)) that precede the output spike (within a duration specified by plasticity window), may be depressed.

In some implementations wherein the sensory input may be updated at 40 ms intervals and/or control signal may be updated at a rate of 1-1000 Hz, the duration of the plasticity window may be selected between 1 ms and 1000 ms. Upon learning a behavior, network configuration (e.g., an array of weights) may be stored for future use by the predictor.

Individual network portions may be configured to implement individual adaptive predictor realizations. In some implementations, one network portion may implement object approach predictor while another network portion may implement obstacle avoidance predictor. Another network portion may implement a task predictor (e.g., fetch). In some implementations, predictors implemented by individual network portions may form a hierarchy of predictors. Lower-level predictors may be configured to produce control (e.g., motor) primitives (also referred to as the pre-action and/or pre-motor output). Higher level predictors may provide output comprising predicted obstacle avoidance/target approach instructions (e.g., approach, avoid).

In some implementations of a fetch task (comprising for example target approach and/or obstacle avoidance), the lower level predictors may predict execution of basic actions (so called, motor primitives), e.g., rotate left with v=0.5 rad/s for t=10 s.

Predictors of a higher level within the hierarchy, may be trained to specify what motor primitive to run and with what parameters (e.g., v, t).

At a higher level of hierarchy, the predictor may be configured to plan a trajectory and/or predict an optimal trajectory for the robot movement for the given context.

At yet another higher level of the hierarchy, a controller may be configured to determine a behavior that is to be executed at a given time, e.g. now to execute the target approach and/or to avoid the obstacle.

In some implementations, a hierarchy actions may be expressed as:

top level=behavior selection;
2nd level=select trajectory;
3rd level=activate motor primitives to execute given trajectory; and
4th level=issue motor commands (e.g. PWM signal for motors) to execute the given motor primitives.

In one or more implementations of hierarchy of predictors, lower level predictors may provide inputs to higher level predictors. Such configuration may advantageously alleviate the higher level predictor from performing all of the functionality that may be required in order to implement target approach and/or obstacle avoidance functionality.

The hierarchical predictor configuration described herein may be utilized for teaching a robotic device to perform a new task (e.g., behavior B3 comprised of reaching a target (behavior B1) while avoiding obstacles (behavior B2). The hierarchical predictor realization may enable a teacher (e.g., a human and/or computerized operator) to divide the composite behavior B3 into two or more subtasks (B1, B2). In one or more implementations, performance of the subtasks may be characterized by lower processing requirements by the processing block associated with the respective predictor; and/or may require less time in order to arrive at a target level of performance during training, compared to an implementation wherein all of the behaviors (B1, B2, B3) are learned concurrently with one another. Predictors of lower hierarchy may be trained to perform subtasks B1, B2 in a shorter amount of time using fewer computational and/or memory resources, compared to time/resource budget that may be required for training a single predictor to perform behavior B3.

When training a higher hierarchy predictor to perform new task (e.g., B3 acquire a target), the approach described above may enable reuse of the previously learnt task/primitives (B1/B2) and configured the predictor to implement learning of additional aspects that may be associated with the new task B3, such as B3a reaching and/or B3b grasping.

If another behavior is to be added to the trained behavior list (e.g., serving a glass of water), previously learned behavior(s) (e.g., reaching, grasping, and/or others, also referred to as the primitives) may be utilized in order to accelerate learning compared to implementations of the prior art.

Reuse of previously learned behaviors/primitives may enable reduction in memory and/or processing capacity (e.g., number of cores, core clock speed, and/or other parameters), compared to implementations wherein all behaviors are learned concurrently. These advantages may be leveraged to increase processing throughput (for a given neuromorphic hardware resources) and/or perform the same processing with a reduced complexity and/or cost hardware platform.

Learning of behaviors and/or primitives may comprise determining an input/output transformation (e.g., the function F in Eqn. 10, and/or a matrix F of Eqn. 13) by the predictor. In some implementations, learning a behavior may comprise determining a look-up table and/or an array of weights of a network as described above. Reuse of previously learned behaviors/primitives may comprise restoring/copying stored LUTs and/or weights into predictor realization configured for implementing learned behavior. FIGS. 7A-7G depict various user input waveforms useful for training of robotic devices during trials, such as show and described with respect to FIGS. 6A-6B, above.

Figure 7A:
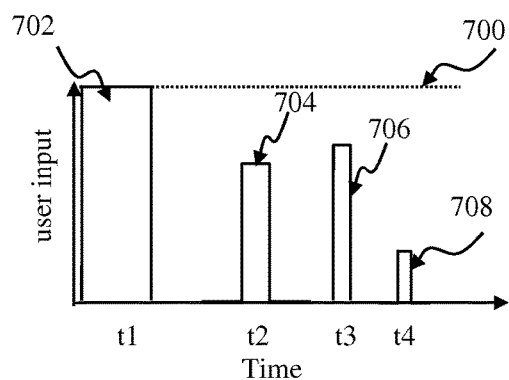
FIG. 7A is a plot depicting modulated user input provided to a robotic device during one or more training trials for use, for example, with the target approach training of FIG. 6B, according to one or more implementations.

FIG. 7A depicts modulated user input provided to a robotic device during one or more training trials for use, for example, with the target approach training of FIG. 6B, according to one or more implementations. The user input of FIG. 7A may comprise a plurality of user inputs (e.g., pulses 702, 704, 706, 708) at times t1, t2, t3, t4, t5. The signal modulation of FIG. 7A may comprise one or more of: a pulse width modulation (e.g., pulses 702, 706) having different duration; a pulse amplitude modulation (e.g., pulses 702, 706) having different amplitude; and/or a pulse position modulation (e.g., pulses 702, 704 and 706, 708) occurring at different intervals. In one or more implementations, individual pulses 702, 704, 706, 708 may correspond to user input during respective training trials (e.g., 624, 626 and other in FIG. 6B). In some implementations, the pulses 702, 704, 706, 708 may correspond to user input during a given training trial (e.g., 624 in FIG. 6B).

By way of non-limiting illustration, the waveforms of FIG. 7A may be utilized as follows: during an initial trial (e.g., 624) the user may provide user input 702 of a sustained duration and full magnitude 700 (e.g., joystick on full forward for 10 second). At a subsequent trial, the user may provide input 704 of a shorter duration and lower magnitude (e.g., turn slightly right, compared to the initial input 702.

Figure 7B:
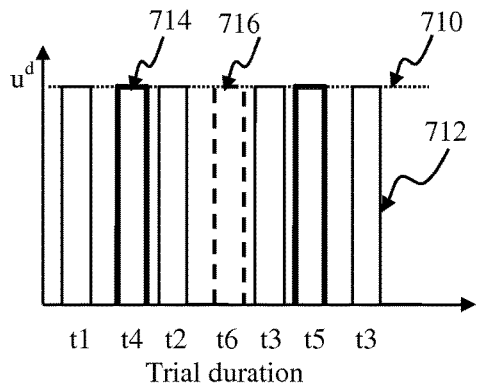
FIG. 7B is a plot depicting pulse frequency modulated user input provided to a robotic device during one or more training trials for use, for example, with the target approach training of FIG. 6B, according to one or more implementations.

FIG. 7B illustrates pulse frequency modulated user input provided to a robotic device during one or more training trials for use, for example, with the target approach training of FIG. 6B, according to one or more implementations. Pulses depicted by lines of different styles may correspond to different trials. By way of non-limiting illustration, the waveforms of FIG. BA may be utilized as follows: at an initial trial (pulses depicted by thin line e.g., 712 in FIG. 7B) user may provide more frequent inputs as compared to inputs during subsequent trials, depicted by thick line pulses (e.g., 714). Individual user inputs in FIG. 7B implementation (e.g., pulses 712, 714, 716) may comprise pulses of fixed amplitude 710 and/or fixed duration.

Figure 7C:
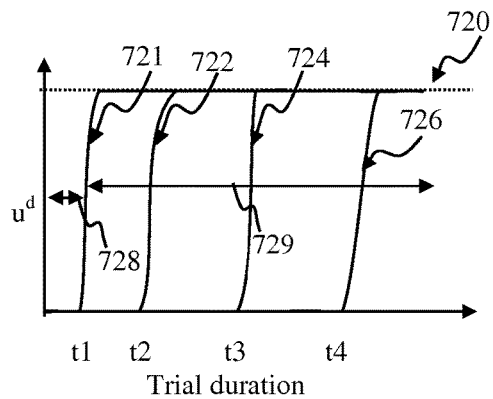
FIG. 7C is a plot depicting ramp-up modulated user input provided to a robotic device during one or more training trials for use, for example, with the target approach training of FIG. 6B, according to one or more implementations.

FIG. 7C illustrates ramp-up modulated user input provided to a robotic device during one or more training trials for use, for example, with the target approach training of FIG. 6B, according to one or more implementations. As used herein, the terms "ramp-up modulated user input" and/or "ramp-down modulated user input" may be used to describe user input characterized by a parameter that may progressively increase and/or decrease, respectively. In none or more implementations, the parameter may comprise input magnitude, frequency, duration, and/or other parameters.

Individual curves 721, 722, 723, 724, 726 may depict user input during individual trials (e.g., 620, 624, 626, in FIG. 6B). By way of a non-limiting illustration, the waveforms of FIG. 7C may be utilized as follows: at an initial trial (shown by the curve 721 in FIG. 7C) the user may let the robotic device to navigate the trajectory without assistance for a period 728. Upon determining a robot's performance, the user may provide control input of amplitude 720 and duration 729. During one or more subsequent trials, the user may delay assistance onset (e.g., increase the time interval 728), and increase duration of the assistance (e.g., increase the time interval 729).

Figure 7D:
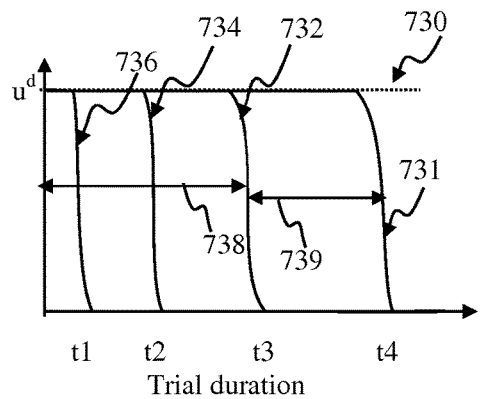
FIG. 7D is a plot depicting ramp-down modulated user input provided to a robotic device during one or more training trials for use, for example, with the target approach training of FIG. 6B, according to one or more implementations.

FIG. 7D illustrates ramp-down modulated user input provided to a robotic device during one or more training trials for use, for example, with the target approach training of FIG. 6B, according to one or more implementations. Individual curves 731, 732, 733, 734, 736 may depict user input during individual trials (e.g., 620, 624, 626, in FIG. 6B). By way of non-limiting illustration, the waveforms of FIG. 7D may be utilized as follows: at an initial trial (shown by the curve 731 in FIG. 7D) the user may guide the robotic device to navigate the trajectory assistance for a period 738 by providing control input 731 of amplitude 730. Upon determining robot's performance, the user may withdraw input for duration 739. During one or more subsequent trials, the user may decrease duration of the assistance (e.g., decrease the time interval 738).

Figure 7E:
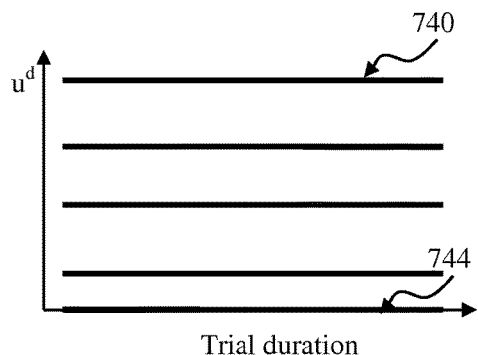
FIG. 7E is a plot depicting user input, integrated over a trial duration, provided to a robotic device during one or more training trials for use, for example, with the target approach training of FIG. 6B, according to one or more implementations.

FIG. 7E illustrates user input, integrated over a trial duration, provided to a robotic device during one or more training trials for use, for example, with the target approach training of FIG. 6B, according to one or more implementations. As shown in FIG. 7E, a magnitude of the user input may decrease from initial input 740 of maximum magnitude to the final input 744 of lowest magnitude.

Figure 7F:
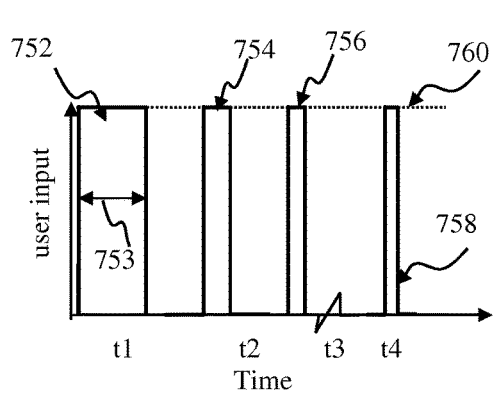
FIG. 7F is a plot depicting pulse width modulated user input of constant magnitude provided to a robotic device during one or more training trials for use, for example, with the target approach training of FIG. 6B, according to one or more implementations.

FIG. 7F illustrates pulse width/frequency modulated user input of constant magnitude provided to a robotic device during one/or more training trials for use, for example, with the target approach training of FIG. 6B, according to one or more implementations. At an initial trial (shown by the pulse 752 in FIG. 7F) the user may assist a robotic device to navigate the trajectory for a period 753. In some implementations, individual pulses (e.g., 752, 754, 756) may correspond to the user activating a control element (e.g., a holding down pedal, a joystick, a button, and/or other element). Upon determining a robot's performance, the user may provide control input of reduced duration (e.g., the duration of pulses 754, 756, 756) during one or more subsequent trials.

Figure 7G:
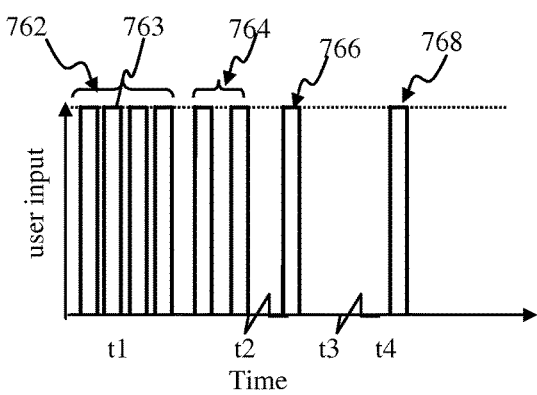
FIG. 7G is a plot depicting pulse frequency modulated user input provided to a robotic device during one or more training trials for use, for example, with the target approach training of FIG. 6B, according to one or more implementations.

FIG. 7G illustrates pulse frequency modulated user input provided to a robotic device during one or more training trials for use, for example, with the target approach training of FIG. 6B, according to one or more implementations. At an initial trial (shown by the pulse group 762 in FIG. 7F) the user may assist a robotic device to navigate the trajectory using plurality of pulses within the pulse group 762. In some implementations, individual pulses (e.g., pulse 763 in the pulse group 762) may correspond to the user activating a control element (e.g., tapping a pedal, engaging a joystick, clicking a button, and/or using other control element). Upon determining a robot's performance, the user may provide control input of reduced frequency (e.g., reducing number of pulses in pulse groups 764, 766, 768 compared to the number of pulses in the pulse group 762) during one or more subsequent trials.

It may be appreciated by those skilled in the art that the user input signal waveforms illustrated in FIGS. 7A-7G represent some implementations of the disclosure and other signals (e.g., bi-polar, inverted polarity, frequency modulated, phase modulated, code modulated, spike-encoding, audio, visual, and/or other signals) may be utilized for providing user input to a robot during training.

Figure 8:
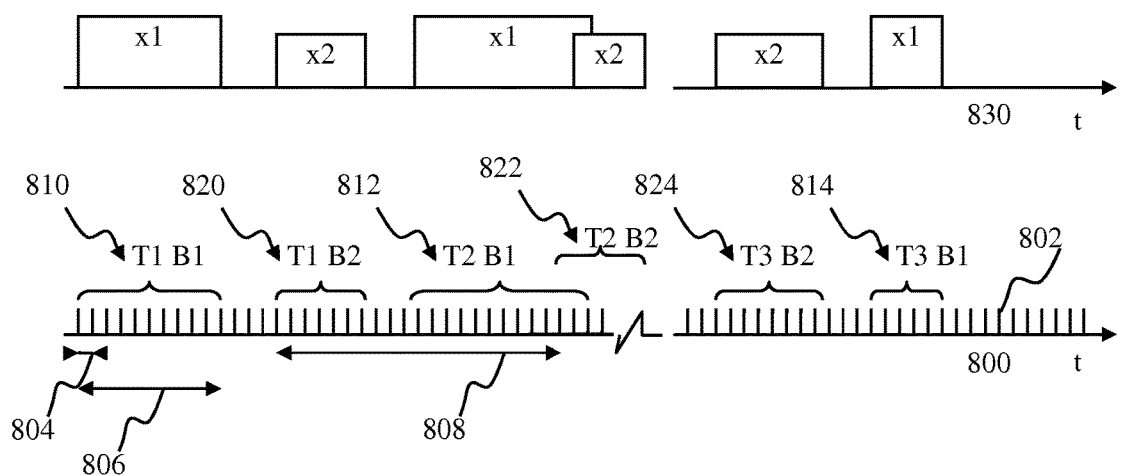
FIG. 8 is a graphical illustration of learning a plurality of behaviors over multiple trials by an adaptive controller, e.g., of FIG. 2A, in accordance with one or more implementations.

FIG. 8 illustrates learning a plurality of behaviors over multiple trials by an adaptive controller, e.g., of FIG. 2A, in accordance with one or more implementations. The plurality of vertical marks 802 on trace 800 denotes control update events (e.g., time grid where control commands may be issued to motor controller). In some implementations (not shown) the control events (e.g., 802 in FIG. 8) may be spaced at non-regular intervals. The arrow denoted 804 may refer to the control time scale.

The time intervals denoted by brackets 810, 812, 814 may refer to individual training trials (e.g., trials T1, T2, T3 described above with respect to Table 3). The arrow denoted 806 may refer to a trial duration being associated with, for example, a behavioral time scale.

The arrow denoted 808 may refer to inter-trial intervals and describe training time scale.

In some implementations, shown and described with respect to FIG. 8, a robotic device may be configured to learn two or more behaviors within a given time span. By way of illustration, a mechanized robotic arm may be trained to grasp an object (e.g., cup). The cup grasping may be characterized by two or more behaviors, e.g., B1 approach and B2 grasp. Training for individual behaviors B1, B2 is illustrated in FIG. 8 by trials denoted as (810, 812, 814), and (820, 822, 824) respectively.

Sensory input associated with the training configuration of trace 800 is depicted by rectangles on trace 830 in FIG. 8. Individual sensory states (e.g., a particular object and or a feature present in the sensory input) are denoted as x1, x2 in FIG. 8. The cup may be present in the sensory input associated with the trial T1, denoted 810 in FIG. 8. Such predictor sensory input state may be denoted as x1. The robotic device may attempt to learn to approach (behavior B1) the cup at trial 810. The cup may be absent in the sensory input subsequent to trial 810. The robotic device may be engaged in learning other behaviors triggered by other sensory stimuli. A different object (e.g., a bottle) denoted as x2 in FIG. 8 may be visible in the sensory input. The robotic device may attempt to learn to grasp (behavior B2) the bottle at trial 812. At a subsequent time, the cup may again be present in the sensory input. The robotic device may attempt to continue learning to approach (behavior B1) the cup at trials 812, 814.

Whenever the bottle may be visible in the sensory input, the robotic device may continue learning grasping behavior (B2) trials 822, 824. In some realizations, learning trials of two or more behaviors may overlap in time (e.g., 812, 822 in FIG. 8). The robotic device may be configured to execute given actions (e.g., learn a behavior) in response to a particular input stimuli rather than based on a particular time.

Operation of the control entity 212 (e.g., 212 in FIG. 2A) and/or the predictor (e.g., 222 in FIG. 2A) may be based on the input 206 (e.g., sensory context). As applied to the above illustration of training a rover to turn in response to, e.g., detecting an obstacle, as the rover executes the turn, the sensory input (e.g., the obstacle position with respect to the rover) may change. Predictor training wherein the sensory input may change is described below with respect to data summarized in Table 4, in accordance with one or more implementations.

Responsive to the control entity (e.g., a user) detecting an obstacle (sensory input state x1), the control signal (e.g., 208 in FIG. 2A) may comprise commands to execute a 45° turn. In some implementations, (e.g., described with respect to Table 1 supra) the turn maneuver may comprise a sudden turn (e.g., executed in a single command, e.g., Turn=45°). In some implementations, (e.g., described with respect to Table 2) the turn maneuver may comprise a gradual turn effectuated by two or more turn increments (e.g., executed in five commands, Turn=9°).

As shown in Table 4 during Trial 1, the control signal is configured at 9° throughout the training. The sensory, associated with the turning rover, is considered as changing for individual turn steps. Individual turn steps (e.g., 1 through 5 in Table 2) are characterized by different sensory input (state and/or context x1 through x5).

At presented in Table 4, during Trial 1, the predictor may be unable to adequately predict controller actions due to, at least in part, different input being associated with individual turn steps. The rover operation during Trial 1 may be referred to as the controller controlled with the controller performing 100% of the control.

TABLE 4

| Step # | State | Trial 1 | | | Trial 2 | | | Trial 3 | | |
|---|---|---|---|---|---|---|---|---|---|---|
| | | u° | $u^{P°}$ | û° | u° | $u^{P°}$ | û° | u° | $u^{P°}$ | û° |
| 1 | x1 | 9 | 0 | 9 | 9 | 3 | 12 | 5 | 6 | 11 |
| 2 | x2 | 9 | 0 | 9 | 8 | 3 | 11 | 2 | 6 | 8 |
| 3 | x3 | 9 | 0 | 9 | 7 | 3 | 10 | 3 | 5 | 8 |
| 4 | x4 | 9 | 0 | 9 | 9 | 3 | 12 | 9 | 6 | 15 |
| 5 | x5 | 9 | 0 | 9 | 3 | 3 | 6 | 1 | 5 | 6 |
| Total | | 45 | 0 | 45 | 36 | 15 | 51 | 20 | 28 | 48 |

The Trial 2, summarized in Table 4, may correspond to another occurrence of the object previously present in the sensory input processes at Trial 1. At step 1 of Trial 2, the control signal may comprise a command to turn 9° based on appearance of the obstacle (e.g., x1) in the sensory input. Based on prior experience (e.g., associated with sensory states x1 through x5 of Trail 1), the predictor may generate predicted output $u^P$=3° at steps 1 through 5 of Trial 2, as shown in Table 4. In accordance with sensory input and/or plant feedback, the controller may vary control signal u at steps 2 through 5. Overall, during Trial 2, the predictor is able to contribute about 29% (e.g., 15° out of 51°) to the overall control signal u. The rover operation during Trial 2 may be referred to as jointly controlled by the control entity (e.g., a human user) and the predictor. It is noteworthy, neither the predictor nor the controller are capable of individually providing target control signal of 45° during Trial 2.

The Trial 3, summarized in Table 4, may correspond to another occurrence of the object previously present in the sensory input processes at Trials 1 and 2. At step 1 of Trial 3, the control signal may reduce control signal 3° turn based on the appearance of the obstacle (e.g., x1) in the sensory input and/or prior experience during Trial 2, wherein the combined output u1' was in excess of the target 9°. Based on the prior experience (e.g., associated with sensory states x1 through x5 of Trails 1 and 2), the predictor may generate predicted output $u^P$=5°, 6° at steps 1 through 5 of Trial 3, as shown in Table 4. Variations in the predictor output $u^P$ during Trial 3 may be based on the respective variations of the control signal. In accordance with sensory input and/or plant feedback, the controller may vary control signal u at steps 2 through 5. Overall, during Trial 3, the predictor is able to contribute about 58% (e.g., 28° out of 48°) to the overall control signal û. The combined control signal during Trial 3 is closer to the target output of 48°, compared to the combined output (51°) achieved at Trial 2. The rover operation during Trial 2 may be referred to as jointly controlled by the control entity and the predictor. It is noteworthy, the neither the predictor nor the controller are capable of individually providing target control signal of 45° during Trial 3.

At a subsequent trial (not shown) the control signal may be reduced to zero while the predictor output may be increased to provide the target cumulative turn (e.g., 45°).

Training results shown and described with respect to Table 3-Table 4 are characterized by different sensory context (e.g., states x1 through x5) corresponding to individual training steps. Step-to-step sensory novelty may prevent the predictor from learning control signal during the duration of the trial, as illustrated by constant predictor output $u^P$ in the data of Table 3-Table 4.

Table 5 presents training results for an adaptive predictor apparatus (e.g., 222 of FIG. 2A) wherein a given state of the sensory may persist for two or more steps during a trial, in accordance with one or more implementations. Persistence of the sensory input may enable the predictor to learn control signal during the duration of the trial.

TABLE 5

| Step # | State | u° | $u^{P°}$ | û° |
|---|---|---|---|---|
| 1 | x1 | 9 | 0 | 9 |
| 2 | x1 | 9 | 3 | 12 |
| 3 | x1 | 7 | 6 | 13 |
| 4 | x2 | 9 | 0 | 9 |
| 5 | x2 | 2 | 3 | 5 |
| Total | | 36 | 12 | 48 |

As shown in Table 5, sensory state x1 may persist throughout the training steps 1 through 3 corresponding, for example, a view of a large object being present within field of view of sensor. The sensory state x2 may persist throughout the training steps 4 through 5 corresponding, for example, another view the large object being present sensed.

At steps 1, 2 of Trial of Table 5, the controller may provide control signal comprising a 9° turn control command. At step 3, the predictor may increase its output to 3°, based on a learned association between the control signal u and the sensory state x1.

At step 3 of Trial of Table 5, the controller may reduce its output u to 7° based on the combined output u2'=12° of the prior step exceeding the target output of 9°. The predictor may increase its output based on determining a discrepancy between the sensory state x1 and its prior output (3°).

At step 4 of Trial of Table 5, the sensory state (context) may change, due to for example a different portion of the object becoming visible. The predictor output may be reduced to zero as the new context x2 may not have been previously observed.

At step 5 of Trial of Table 5, the controller may reduce its output u to 2° based on determining amount of cumulative control signal (e.g., cumulative turn) achieved at steps 1 through 4. The predictor may increase its output from zero to 3° based on determining a discrepancy between the sensory state x2 and its prior output $u4^{P}=0°$. Overall, during the Trial illustrated in Table 5, the predictor is able to contribute about 25% (e.g., 5° out of 48°) to the overall control signal û.

Figure 9:
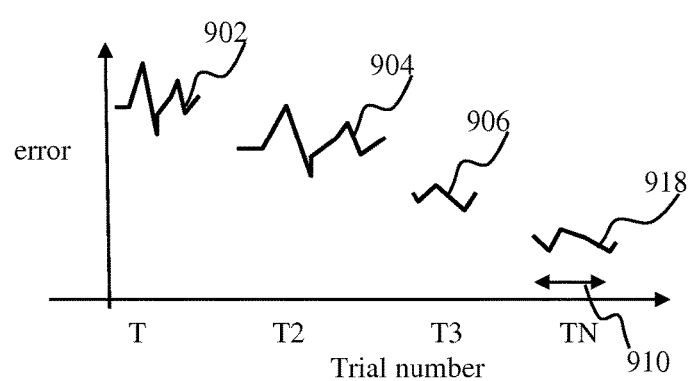
FIG. 9 is a plot illustrating performance of an adaptive robotic apparatus of, e.g., FIG. 2B, during training, in accordance with one or more implementations.

FIG. 9 illustrates training performance of an adaptive robotic apparatus of, e.g., FIG. 2B, by a user, in accordance with one or more implementations. Solid line segments 902, 904, 906, 908 denote error corresponding to a difference measure between the actual trajectory of the robot (e.g., 632, 634) versus the target trajectory (e.g., 630). Robot operation for a given trial duration (e.g., denoted by arrow 910) may be characterized by varying sensory state (e.g., states x1 through x5 described with respect to Table 2). In some implementations, the performance measure may comprise an error described as follows:

$$\epsilon(t_i)=|u^{P}(t_{i-1})-u^{d}(t_i)|. \quad \text{(Eqn. 15)}$$

In other words, the error may be determined based on (how well) the prior predictor output matches the current teaching (e.g., target) input. In one or more implementations, predictor error may comprise a root-mean-square deviation (RMSD), coefficient of variation, and/or other parameters.

As shown in FIG. 9, error diminishes as training progresses (e.g., with increasing trial number). In some implementations, the error may diminish through individual trials. The latter behavior may be related to a greater degree of sustained sensory experience by the predictor during learning responsive to consistent sensory input.

Various implementations, of methodology for training of robotic devices are now described. An exemplary training sequence of adaptive controller apparatus (e.g., 200 of FIG. 2A) may be expressed as follows:

During first trial at time T1:
 the control entity may detect sensory input (e.g., 206, 216_1 in FIG. 2A) containing x1 and may generate output u1;
 the predictor may receive the sensory input x1 (or a portion of thereof), and may be configured to generate predicted control signal (e.g., $u1^{P}=0°$);
 the combiner may produce the combined output û1=45°; this output may be provided to the predictor as the teaching (target) signal at a subsequent time instance; and
 the plant 210 may begin to turn right in accordance with the combined control signal (e.g., 220) û1=45°.

During another trial at time T2>T1:
 the control entity may detect a sensory input (e.g., 206, 216_1 in FIG. 2A) containing x1 and may generate output û2=45°;
 the predictor may receive the sensory input x1 (or a portion of thereof), and the teaching (target) signal û1=45° produced by the combiner at a prior trial (e.g., T1); the predictor may be configured to 'mimic' the combined output û; the predictor may be configured to generate predicted control signal (e.g., $û2^{P}=30°$) based on the sensory input, plant feedback and/or the teaching signal;
 the combiner may produce the combined output û2=75° (e.g., in accordance with, for example, Eqn. 7); and
 the plant 210 may increase the turn rate with the control signal û2.

During another trial at time T3>T2:
 the control entity may determine that the rate of turn is in excess of the target turn of 45°, and may generate control signal û3=0°;
 the predictor may receive the sensory input x (or a portion of thereof), and the teaching (target) signal û2=75° produced by the combiner at a prior trial (e.g., T2); the predictor may be configured to generate predicted control signal (e.g., û3P=50°) based on the sensory input, plant feedback and/or the teaching signal;
 the combiner may produce the combined output û3=50° (e.g., in accordance with, for example, Eqn. 7); and
 the plant 210 may execute the turn in accordance with the control signal û3.

Subsequently, at times T4, T5, TM>T2 the predictor output to the combiner 234 may result in the control signal 220 to turn the plant by 45° and the control signal 208 may be reduced to zero. In some implementations, the outcome of the above operational sequence may be referred to as (gradual) transfer of the control signal to the predictor output. When the predictor is capable to producing the target output, the control signal (e.g., 208 in FIGS. 2A-2B) may be withdrawn (removed). The output of the combiner (e.g., 214, 234) may comprise the predictor output in accordance with, for example, Eqn. 3.

In one or more implementations comprising spiking control and/or predictor signals (e.g., 208, 218, 248, 220, 240 in FIG. 2A-2B), the withdrawal of the control signal may correspond to the controller 208 generating spike output at a base (background) rate. By way of illustration, spike output at a (background) rate of 2 Hz may correspond to 'maintain course' control signal; output above 2 Hz may indicate a turn command. The turn rate may be encoded as spike rate, number of spikes, and/or spike latency in various implementations. In some implementations, zero signal (e.g., control signal 208, predicted control signal 218, and/or combiner output 220) may comprise a pre-defined signal, a constant (e.g., a dc offset or a bias), spiking activity at a mean-firing rate, and/or other zero signal.

Figure 10A:
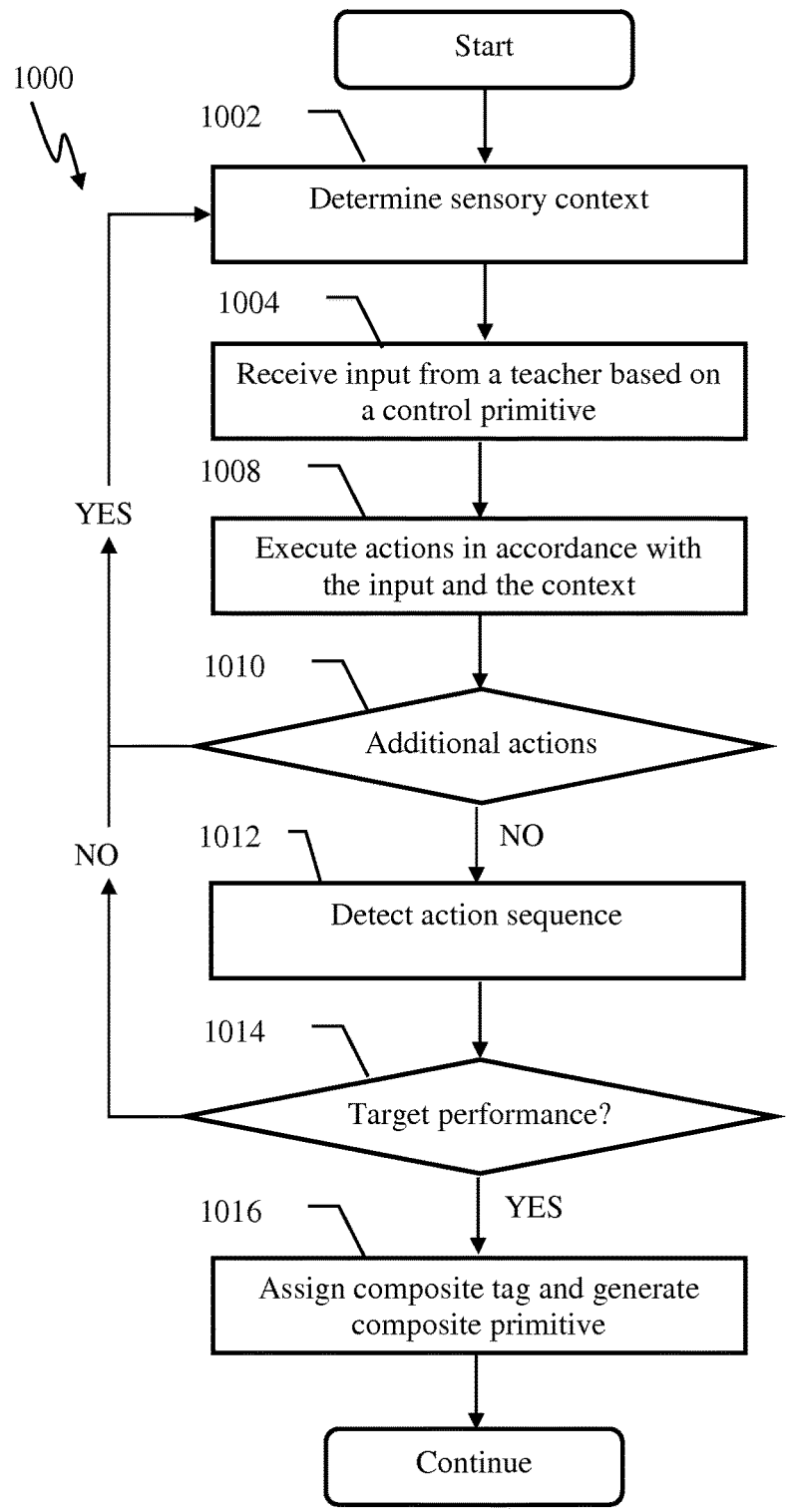
FIG. 10A is a logical flow diagram illustrating a method of generating a composite action primitive based on a detection of action sequence, in accordance with one or more implementations.
Figure 10B:
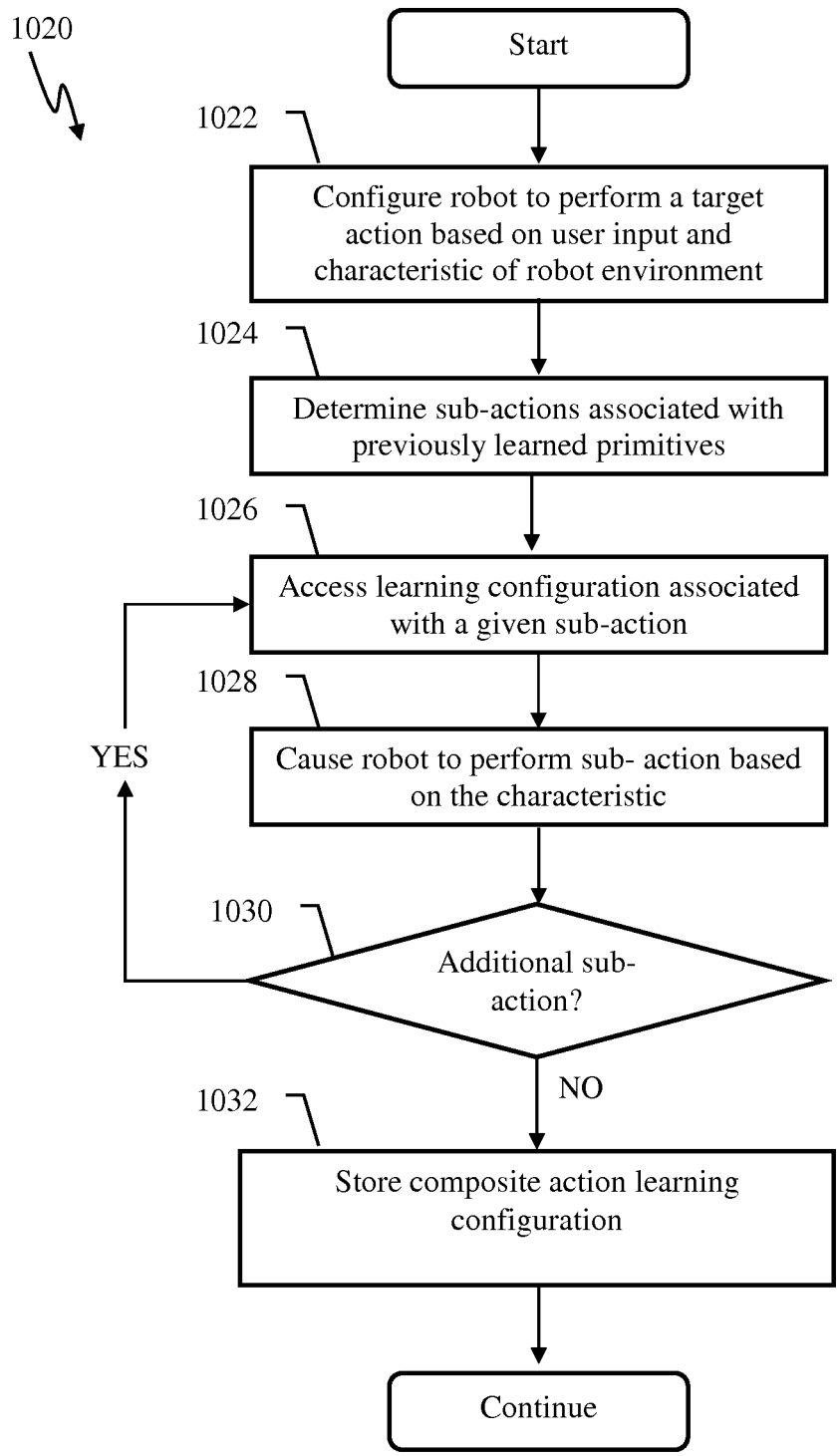
FIG. 10B is a logical flow diagram illustrating a method of configuring a composite action primitive based on previously learned sub-action primitives, in accordance with one or more implementations.
Figure 10C:
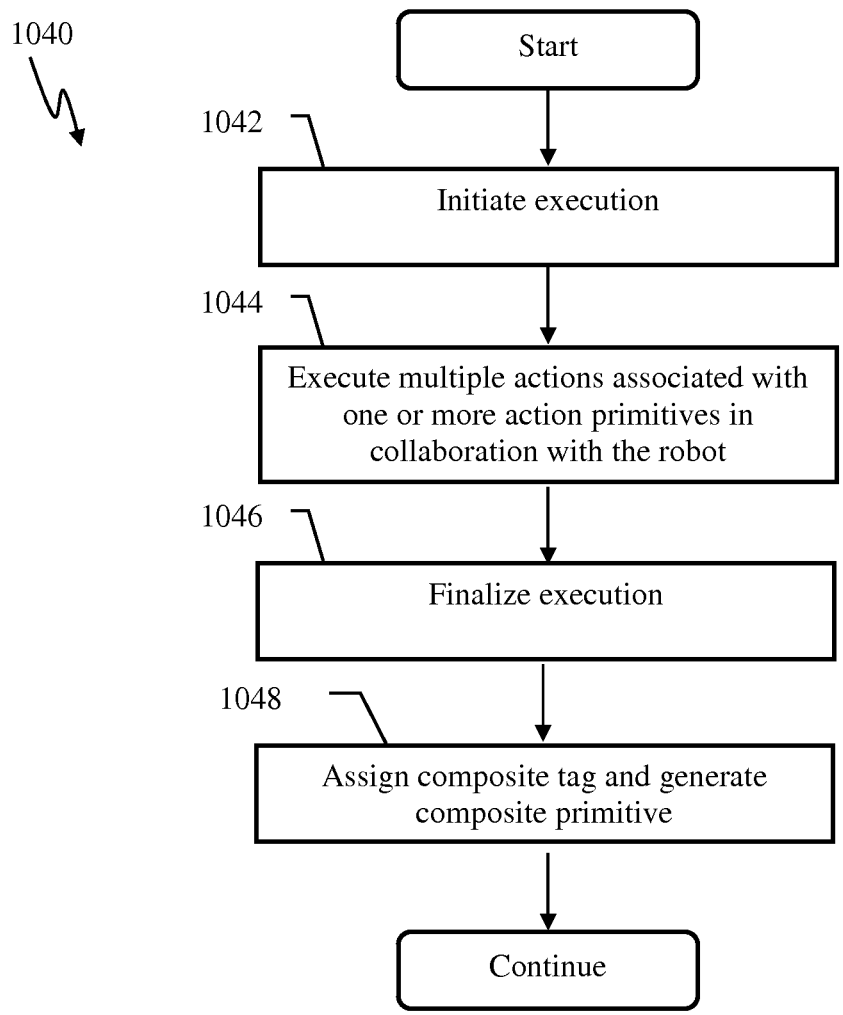
FIG. 10C is a logical flow diagram illustrating a method assigning execution multiple actions into a single control primitive, in accordance with one or more implementations.

FIGS. 10A-10C illustrate methods of training an adaptive apparatus of the disclosure in accordance with one or more implementations. The operations of methods 1000, 1020, 1040 presented below are intended to be illustrative. In some implementations, methods 1000, 1020, 1040 may be accomplished with one or more additional operations not described, and/or without one or more of the operations discussed. Additionally, the order in which the operations of methods 1000, 1020, 1040 are illustrated in FIGS. 10A-10C described below is not intended to be limiting.

In some implementations, methods 1000, 1020, 1040 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 1000, 1020, 1040 in response to instructions stored electronically on an electronic storage medium. The one or more processing devices may include one or more devices configured through hardware, firmware, and/or software to be specifically designed for execution of one or more of the operations of methods 1000, 1020, 1040.

At operation 1002 of method 1000, illustrated in FIG. 10A sensory context may be determined. In some implementations, the context may comprise one or more spatio-temporal aspects of sensory input (e.g., 206) and/or plant feedback (216 in FIG. 2A). In one or more implementations, the sensory aspects may include an object being detected in the input, a location of the object, an object characteristic (color/shape), a sequence of movements (e.g., a turn), a characteristic of an environment (e.g., an apparent motion of a wall and/or other surroundings, turning a turn, approach, and/or other environmental characteristics) responsive to the movement. In some implementations, the sensory input may be received based on performing one or more training trials (e.g., as the trials described with respect to Table 3-Table 5 above) of a robotic apparatus.

At operation 1004, an input may be received from a trainer. In some implementations, the input may comprise a control command (e.g., rotate right/left wheel and/or other command) that is based on the sensory context (e.g., appearance of a target in field of view of the robot's camera, and/or other sensory context) and provided by a human user. In one or more implementations, the teacher input signal may comprise an action indications (e.g., proceed straight towards the target) provided by a computerized agent. The input may be provided by the teacher using one or more previously developed control elements (primitives) e.g., 542, 454, 456, 564 in FIG. 4B.

At operation 1008 of method 1000, an action may be executed in accordance with the input and the context. In one or more implementations, the action execution may be based on a combined control signal, e.g., the signal 240 generated by the combiner 214 in accordance with any of the methodologies described herein (e.g., using the transfer function of Eqn. 6). The action may comprise moving forward the platform 402 of FIG. 4A, lowering the arm 410, extending the boom 412 or another action configured to propel the attachment 415 forward.

At operation 1010 of method 1000, a determination may be made as to whether additional actions are to be performed based on additional user inputs.

Responsive to a determination that additional actions are to be performed (e.g., extend the boom 412), the method 1000 may proceed to operation 1002.

Responsive to a determination that no other additional actions are to be performed for the context of operation 1002 the method 1000 may proceed to operation 1012, wherein action sequence may be determined. In some implementations, action sequence may comprise two or more execution instances of a given action (e.g., activating forward button 1208 to move platform forward in several steps). In one or more implementations, action sequence may comprise execution of two or more individual actions (e.g., moving forward the platform 402, lowering the arm 410, extending the boom 412, and straightening the arm portion 414 of the apparatus 400 of FIG. 4A).

At operation 1014, a target performance associated with executing the actions at operation 1008 may be determined. In one or more implementations, the performance may be determined based on a deviation between the target trajectory (e.g., 630 in FIG. 6B) and the actual trajectory accomplished during execution of the action at operation 1008. In one or more implementations, the performance may be determined based on an error measure of Eqn. 15. A control process update may comprise adaptation of weights of a computerized neuron network configured to implement the learning process. In some implementations, the learning process update may comprise an update of a look-up table.

Responsive to a determination that the performance is lower than the target level, the method 1000 may proceed to operation 1002 to continue training.

Responsive to a determination that the performance matches or exceeds the target level, the method 1000 may proceed to operation 1016 wherein a composite control element primitive may be generated. In some implementations, the composite primitive of operation 1016 may correspond to the composite controls 1214 1224, 1222 of FIG. 12. A tag may be associated with the composite control primitive produced at operation 1016. In one or more implementations, the tag may comprise an audio command (e.g., 'forward', 'reach', for commanding the robot to move forward) and/or other applicable means available to communicate with the robotic device (e.g., via a brain machine interface. In some implementations, the robot may comprise an audio processing block configured to store a characteristic (e.g., a spectrogram) associated with the command tag (e.g., the word 'fetch').

FIG. 10B illustrates a method of configuring a composite action primitive based on previously learned sub-action primitives, in accordance with one or more implementations. In some implementations, the training process illustrated in FIG. 10B may comprise a plurality of trials wherein during a given trial, the adaptive robotic device may attempt to follow a target trajectory.

At operation 1022 of method 1020, a robot may be configured to perform a target action based on user input and characteristic of robot environment. In some implementations, the environment characteristic may comprise a relative positioning of the robot (e.g., 622, in FIG. 6B) and a target (e.g., 642, in FIG. 6B). The target action may comprise following a target trajectory (e.g., 630 in FIG. 6B). In one or more implementations, a human trainer may utilize a control interface (e.g., joystick, buttons) in order to guide the robot along the trajectory.

At operation 1024, learning process of the robotic may be configured to determine if the target action of operation 1022 may be decomposed into two or more sub-actions associated with previously learned primitives. By way of an illustration, a target action comprising reaching for an object with the attachment 415 of FIG. 4A may be decomposed into sub-actions, including, for example moving forward the platform 402, lowering the arm 410, extending the boom 412, and straightening the arm portion 414 of the apparatus 400 of FIG. 4A.

At operation 1026, learning configuration associated with a sub-action may be accessed. In some implementations, the learning configuration may update look-up table entries and/or weights of a neuron network.

At operation 1028 of method 1020, the robot may perform an action based on the user input, sensory context and the learning configuration associated with the subtask.

At operation 1030, a determination may be made as to whether additional subtasks are to be performed. Responsive to a determination that additional subtask are to be performed, the method 1020 may proceed to operation 1026.

Responsive to a determination that no additional subtasks are to be performed, the method 1020 may proceed to operation 1032 wherein composite action learning configuration may be stored. In one or more implementations, the composite action configuration may comprise pointers to configurations associated with sub-actions and/or order of their execution.

FIG. 10C illustrates a method of combining execution multiple actions into a single higher level control element, in accordance with one or more implementations. In some implementations, the process illustrated in FIG. 10C may correspond to a user teaching a robot to perform a composite action (e.g., approach an object, pick up the object, and bring back the object) using a single composite control primitive (e.g., 'fetch'). In one or more implementations, the lower level actions (sub-actions approach, pick up, and bring back) may be activated using respective lower level control primitives that have been learned previously. Learning of the primitives may be effectuated using collaborative learning methodology, for example, such as described in U.S. patent application Ser. No. 13/918,620 entitled "PREDICTIVE ROBOTIC CONTROLLER APPARATUS AND METHODS", incorporated supra.

At operation 1042, the action execution may commence. In some implementations, the training commencement may be based on a user instruction (e.g., voice command 'start', 'record', a button push, a gesture, and/or other user instruction) to a controller of the robot indicating to beginning of the composite action execution. Responsive to receipt of the execution start instruction, the controller may activate, e.g., a recording function configured to store a sequence of subsequent action.

At operation 1044 of method 1040, multiple actions may be executed by the robot using one or more available action primitives. In one or more implementation, the action execution of operation 1044 may be performed in collaboration with the user.

At operation 1046, the action execution may be terminated. In some implementations, the action termination may be based on a user instruction (e.g., voice command 'stop', 'enough', a button push, a gesture, and/or other indication) to the controller indicating the ending of the composite action execution. In one or more implementations, the action termination may be based on the ability of device to determine if the action has been successfully executed. By way of illustration, once a robot has acquired an object and brought it back, then it may be determined that the action of fetch has been successfully accomplished. In some implementations, the persistence of an action may be configured to decay over time. Responsive to receipt of the execution start instruction, the controller may deactivate, e.g., a recording.

At operation 1048, a composite primitive may be generated and a tag may be assigned. In one or more implementations, the tag may comprise an audio command (e.g., 'forward', 'reach'), click pattern, and/or other indication. In some implementations, the robotic apparatus may comprise an audio processing block configured to store a characteristic (e.g., a spectrogram) associated with the command tag (e.g., the word 'fetch'). In some implementations, the composite primitive generation may comprise storing pointers to configurations associated with sub-actions, order of their execution and/or other operations. The composite action generation may comprise provision of a control element (e.g., 1214, 1222, 1224) on a user interface device. The control element may be subsequently utilized for executing the composite action of the process 1040.

Figure 11:
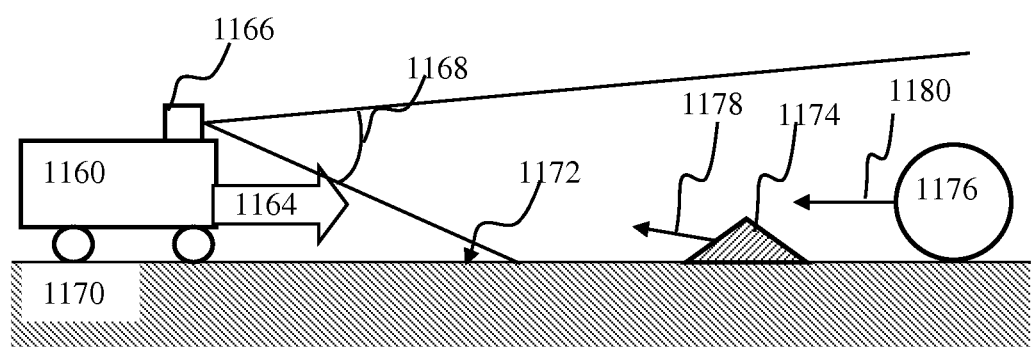
FIG. 11 is a graphical illustration depicting robotic apparatus comprising an adaptive controller apparatus of the disclosure configured for obstacle avoidance, in accordance with one or more implementations.

FIG. 11 illustrates a mobile robotic apparatus that may comprise an adaptive controller (e.g., the controller for FIG. 2A). The robotic apparatus 1160 may comprise a camera 1166. The camera 1166 may be characterized by a field of view 1168. The camera 1166 may provide information associated with objects within the field of view. In some implementations, the camera 1166 may provide frames of pixels conveying luminance, refreshed at 25 Hz frame rate.

One or more objects (e.g., an obstacle 1174, a target 1176, and/or other objects) may be present in the camera field of view. The motion of the objects may result in a displacement of pixels representing the objects within successive frames, such as described in U.S. patent application Ser. No. 13/689,717, entitled "APPARATUS AND METHODS FOR OBJECT DETECTION VIA OPTICAL FLOW CANCELLATION", filed Nov. 30, 2012, incorporated herein by reference in its entirety.

When the robotic apparatus 1160 is in motion, such as shown by arrow 1164 in FIG. 11, the optical flow estimated from the image data may comprise the self-motion component and the object motion component. By way of a non-limiting example, the optical flow measured by the rover of FIG. 11B may comprise one or more of (i) self-motion components of the stationary object 1178 and the boundary (e.g., the component 1172 associated with the floor boundary); (ii) component 1180 associated with the moving objects 116 that comprises a superposition of the optical flow components due to the object displacement and displacement of the robotic apparatus, and/or other components. In one or more implementation, the robotic apparatus 1160 may be trained to avoid obstacles (e.g., 1174) and/or approach targets (e.g., 1176) using collaborative learning methodology of, e.g., FIG. 6B Various exemplary computerized apparatus may be utilized with the robotic training methodology of the disclosure. In some implementations, the robotic apparatus may comprise one or more processors configured to execute the adaptation methodology described herein. In some implementations, an external processing entity (e.g., a cloud service, computer station and/or cluster) may be utilized in order to perform computations during training of the robot (e.g., operations of methods 1000, 1020, 1040).

Robot training methodology described herein may advantageously enable task execution by robotic devices. In some implementations, training of the robot may be based on a collaborative training approach wherein the robot and the user collaborate on performing a task.

The collaborative training approach described herein may advantageously enable users to train robots characterized by complex dynamics wherein description of the dynamic processes of the robotic platform and/or environment may not be attainable with precision that is adequate to achieve the target task (e.g., arrive to a target within given time). The collaborative training approach may enable training of robots in changing environment (e.g., train vacuum cleaner robot to avoid displaced and/or newly placed objects while cleaning newly vacant areas.

The remote controller may comprise multiple control elements (e.g., joysticks, sliders, buttons, and/or other control elements). Individual control elements (primitives) may be utilized to (i) activate respective portions of the robot platform (e.g., actuators), (ii) activate one or more actuator with different magnitude (e.g., move forward slow, move forward fast), and/or effectuate other actions.

Based on the collaborative training, the remote controller may provide composite controls configured based on operation of two or more of control primitives. Activation of a single composite control may enable the robot to perform a task that has previously utilized activation of multiple control primitives. Further training may enable development of composite controls of higher levels in a hierarchy.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A method for controlling a robot to execute a task, the method comprising:
    during a given trial of one or more training trials, based on a first indication received from a user, executing a plurality of actions, individual ones of the plurality of actions being configured based on sensory input and a given user input of a plurality of user inputs, where each one of the one or more training trials has a trial duration associated therewith, the trial duration at least being configured to separate two or more activations of at least one actuator of the robot;
    determining a performance measure associated with the executing of the plurality of actions, the performance measure being based at least in part on a difference between target actions and the plurality of actions;
    when the performance measure does not meet or exceed a target level, during a subsequent trial of the one or more training trials, executing another plurality of actions based on a second indication received from the user, and determining another performance measure associated with the executing of the other plurality of actions; and
    when the performance measure meets or exceeds the target level, based on a third indication received from a user, associating a control component with the task, the control component being configured to be activated by a presence of a user discernible representation;
    wherein:
    the execution of the plurality of actions is configured to effectuate execution of the task by the robot; and
    activation by the user of the control component using the user discernible representation is configured to cause the robot to execute the task in a sequence corresponding to the plurality of actions that were executed based on the first indication received from the user.

2. The method of claim 1, wherein the provision of the user discernible representation comprises:
    disposing an icon on a display; and
    configuring a user interface device to receive input based on the user activation configured in accordance with the icon.

3. The method of claim 1, wherein the user discernible representation comprises a voice command, an audio signal, or one or more gestures.

4. A non-transitory computer readable medium having instructions embodied thereon, the instructions configured to, when executed by a physical processor, cause the physical processor to:
    based on a detection of a sequence of discrete control actions comprising two or more activations of a robotic apparatus by a user, generate a composite control element, the composite control element being configured to execute the sequence of discrete control actions in an order of execution provided by one or more parameters associated with at least one of the sequence of discrete control actions; and
    when the execution of the sequence of discrete control actions is within an expected performance value assign the generated composite control element to a tag, the tag associated with a user interface control element;
    wherein:
    an invocation of the tag is configured to execute the sequence of discrete control actions in accordance with the determined order of execution;
    the robotic apparatus comprises a controller configured to generate a control signal, individual ones of the sequence of discrete control actions being configured based on the control signal, the generation of the control signal being effectuated by a learning process;
    the learning process comprises execution of multiple training trials, individual ones of the multiple training trials being characterized by a trial duration;
    individual ones of the sequence of discrete control actions correspond to an execution of a given training trial of the multiple training trials; and
    the two or more activations of the robotic apparatus comprise activations of at least one actuator at two or more instances of time, the two or more instances of time being separated by a time period, the time period corresponding to the trial duration.

5. The non-transitory computer readable medium of claim 4, wherein:
the sequence is configured to cause the robotic apparatus to execute a target task;
individual ones of the two or more activations are configured to execute responsive to the user issuing two or more control commands via a remote control interface; and
the composite control element is configured to execute the target task responsive to a single activation of the composite control element by the user.

6. The non-transitory computer readable medium of claim 5, wherein individual ones of the two or more control commands comprise multiple instances of a given control operation effectuated based on multiple activations of a first control element associated with the remote control interface.

7. The non-transitory computer readable medium of claim 5, wherein:
individual ones of the two or more control commands comprise one or more instances of two or more control operation effectuated based on activations of a first control element and a second control element associated with the remote control interface; and
the single activation of the composite control element is configured to obviate the activations of the first control element and the second control element by the user.

8. The non-transitory computer readable medium of claim 5, wherein:
the user comprises a human; and
detection is configured based on a request by the user.

9. The non-transitory computer readable medium of claim 4, wherein:
the learning process comprises adjusting a learning parameter based on a performance measure, the performance measure being configured based on individual ones of the sequence of discrete control actions and a target action; and
the detection is effectuated based on an indication provided by the learning process absent user request.

10. The non-transitory computer readable medium of claim 4, wherein:
the robotic apparatus comprises two or more individually controllable actuators; and
the two or more activations of the robotic apparatus comprise activations of individual ones of the two or more actuators.

11. A remote control apparatus of a robot, the remote control apparatus comprising:
a physical processor configured to operate a learning process;
a sensor coupled to the physical processor;
a user interface configured to present one or more human perceptible control elements; and
a remote communications interface configured to communicate to the robot a plurality of control commands configured by the learning process based on an association between a sensor input and individual ones of a plurality of user inputs provided via one or more of the one or more human perceptible control elements;
wherein:
the communication to the robot of the plurality of control commands is configured to cause the robot to execute a plurality of actions;
the learning process is configured based on a performance measure between a target action and individual ones of the plurality of actions;
the association between the sensor input and the individual ones of the plurality of user inputs is configured to cause generation of one or more of control primitives, individual ones of the one or more of control primitives being configured to cause execution of a respective action of the plurality of actions;
the learning process is configured to generate a composite control;
the composite control is configured to actuate the plurality of actions that result in an execution of the target action responsive to a single activation of the composite control by a user, the single activation by the user being configured to cause the execution of the plurality of actions in an order determined according to the plurality of user inputs;
the single activation of the composite control is configured based on a detection, by the remote control apparatus, of a presence of the one or more human perceptible control elements;
the generation of the composite control comprises a presentation of the one or more human perceptible control elements, the one or more human perceptible control elements being configured to cause activation of the composite control by the user; and
the activation of the composite control is configured based on a detection of one or more of: an audio signal, a touch signal, and an electrical signal by the user interface, where the user interface comprises a camera, and the electrical signal is configured based on a captured representation of the user by the camera.

12. The apparatus of claim 11, wherein:
the learning process is configured to generate the composite control based on a detection, by the remote control apparatus, of the individual ones of the plurality of user inputs provided via the one or more of the one or more human perceptible control elements; and
an individual action of the plurality of actions corresponds to execution of a task.

13. The apparatus of claim 11, wherein:
the learning process is configured to generate the composite control based on a request by the user.

14. The apparatus of claim 11, wherein the learning process is configured based on a supervised learning process, the supervised learning process being configured based on a sensory context and a combination of a control signal and the individual ones of the plurality of user inputs.

15. The apparatus of claim 11, wherein:
the provision of individual ones of the plurality of user inputs is configured based on an audible tag or a touch indication of the user interface.

16. The apparatus of claim 11, wherein:
the user interface comprises a touch sensitive interface; and
the touch signal is configured based on a pattern provided by the user via the touch interface.

* * * * *